(12) United States Patent
Itoh et al.

(10) Patent No.: US 8,048,496 B2
(45) Date of Patent: Nov. 1, 2011

(54) POLYMERIZABLE LIQUID CRYSTAL COMPOUND, LIQUID CRYSTAL COMPOSITION AND POLYMER

(75) Inventors: Maiko Itoh, Chiba (JP); Yoshiharu Hirai, Chiba (JP); Junichi Inagaki, Chiba (JP); Daisuke Ootsuki, Chiba (JP)

(73) Assignee: JNC Corporation, Tokyo (JP)

( * ) Notice: Subject to any disclaimer, the term of this patent is extended or adjusted under 35 U.S.C. 154(b) by 160 days.

(21) Appl. No.: 12/585,822

(22) Filed: Sep. 25, 2009

(65) Prior Publication Data

US 2010/0096591 A1    Apr. 22, 2010

(30) Foreign Application Priority Data

Sep. 25, 2008    (JP) ................. 2008-245450

(51) Int. Cl.
*C09K 19/34* (2006.01)
*C09K 19/32* (2006.01)
*C09K 19/30* (2006.01)
*C09K 19/20* (2006.01)
*C09K 19/38* (2006.01)
*C07D 311/96* (2006.01)
*C07C 69/76* (2006.01)
*C08F 22/10* (2006.01)

(52) U.S. Cl. ............... 428/1.1; 252/299.61; 252/299.62; 252/299.63; 252/299.67; 560/56; 560/80; 560/139; 549/331; 549/343; 549/344; 526/321

(58) Field of Classification Search ............ 252/299.01, 252/299.61, 299.63, 299.67, 299.62; 428/1.1; 560/56, 80, 139; 526/321; 549/331, 343, 549/344

See application file for complete search history.

(56) References Cited

U.S. PATENT DOCUMENTS 6,080,833 A * 6/2000 Otsuji et al. ................. 528/201

(Continued)

FOREIGN PATENT DOCUMENTS

JP           11-29526       2/1999

(Continued)

OTHER PUBLICATIONS

English abstract of JP 2005-060373 published Mar. 10, 2005.

(Continued)

*Primary Examiner* — Shean Wu

(74) *Attorney, Agent, or Firm* — Wenderoth, Lind & Ponack, L.L.P.

(57) ABSTRACT

The purpose the invention is to provide a polymerizable liquid crystal compound which has an excellent solubility with other compounds, a high homeotropic property, and a spiro-biindan-backbone, and a liquid crystal composition comprising this compound.

The purpose is attained with a polymerizable liquid crystal compound represented by Formula (1). A polymer which is excellent in many characteristics can be obtained from this compound and a formed body having optical anisotropy, produced from this polymer can be obtained. In Formula (1), G is a single bond or oxygen; R is hydrogen, methyl (Me) or a group represented by Formula (a), wherein at least two of R are groups represented by Formula (a); P is a polymerizable group represented by any of Formula (P1) to Formula (P8). In Formula (a), a desirable A is 1,4-cyclohexylene or 1,4-phenylene; Z is a bonding group; m is an integer of 0 to 3; $X^0$ is a single bond or alkylene; $Z^0$ is a single bond, —O—, —OCO—, or —OCOO—; X is a single bond or alkylene.

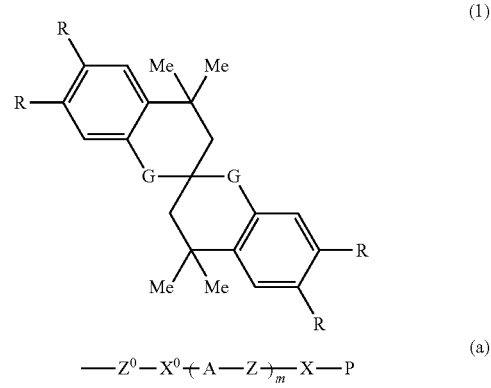

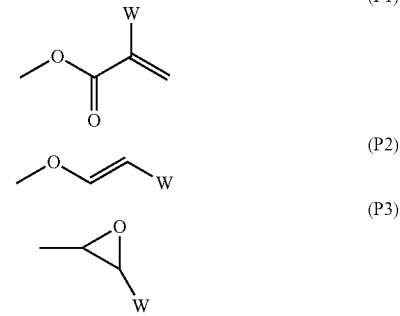

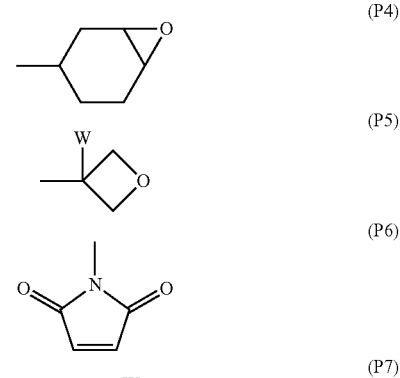

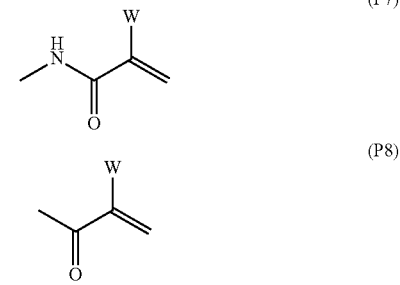

26 Claims, 1 Drawing Sheet

U.S. PATENT DOCUMENTS

2005/0031801 A1   2/2005   Shundo et al.

FOREIGN PATENT DOCUMENTS

| JP | 2001-55573 | 2/2001 |
| JP | 2001-154019 | 6/2001 |
| JP | 2002-241348 | 8/2002 |

OTHER PUBLICATIONS

Kricheldorf et al., "New Polymer Syntheses. XCVI. Star-Shaped LC-Polyesters Derived from β- (4-Hydroxyphenyl) propionic Acid and 4-Hydroxybenzoic Acid", Journal of Polymer Science: Part A: Polymer Chemistry, 1998, vol. 36 (9), pp. 1387-1395.

* cited by examiner

POLYMERIZABLE LIQUID CRYSTAL COMPOUND, LIQUID CRYSTAL COMPOSITION AND POLYMER

FIELD OF THE INVENTION

The invention relates mainly to a polymerizable liquid crystal compound having a spirobiindan-backbone.

BACKGROUND OF THE INVENTION

It is known that a polymer having optical anisotropy is obtained by polymerizing a polymerizable compound when the compound has liquid crystallinity (patent reference No. 1). This is because the alignment of liquid crystal molecules is fixed by means of polymerization. A liquid crystal compound having —O—CO—CH=$CH_2$ has been used as an example of such a compound (patent reference No. 2). A compound which is polymerizable in air on irradiation with ultraviolet radiation is also known (patent reference No. 3). Such a polymerizable liquid crystal compound can be copolymerized with a polymerizable compound having no liquid crystallinity. At this point, this non-liquid crystal compound plays a role in controlling characteristics of the resultant polymer. Thus, the development of a polymerizable non-liquid crystal compound is important in order to obtain a polymer having a suitable optical anisotropy.

An optical component composed of a polymerizable compound or a polymer having a spirobiindan-skeleton is known to have an excellent transparency, mechanical strength and heat resistance, and a low birefringence (patent reference Nos. 4 and 5). Polyester compounds having no polymerizable groups, which are derived from spirobiindans and benzoic acid or the like, are known to exhibit liquid crystal phases (non-patent reference No. 1). However, usefulness caused by the addition of these compounds to a liquid crystal composition has not been described.

Patent document No. 1: JP 2001-055573 A,
Patent document No. 2: JP 2001-154019 A,
Patent document No. 3: JP 2005-060373 A,
Patent document No. 4: JP H11-29526 A (1999),
Patent document No. 5: JP 2002-241348 A, and
Non-patent document No. 1: Kricheldorf, Hans R. et al, Journal of Polymer Science, Part A: Polymer Chemistry (1998), 36(9), 1387-1395.

SUMMARY OF THE INVENTION

The first purpose of the invention is to provide a polymerizable liquid crystal compound in which its solubility with other liquid crystal compounds is excellent, the alignment of liquid crystal composition containing this compound is stabilized, and a polymer with a high density of a bridged structure can be obtained. The second purpose is to provide a polymer which is excellent in many characteristics such as transparency, mechanical strength, applicability, solubility, degree of crystallinity, shrinkage, water permeability, water absorptivity, gas-permeability, melting points, glass transition temperature, clearing points, thermal resistance, and chemical resistance, and a formed body having optical anisotropy which is produced from the polymer. The third purpose is to provide a polarizing plate, an optical compensator, an alignment film, a liquid crystal display device, a non-linear optical device and so forth in which the polymer is comprised.

As the results of studies for achieving the purpose described above, the inventors have found that a polymerizable liquid crystal compound with a spirobiindan-backbone has an excellent solubility with other liquid crystal compounds and a high degree of a homeotropic alignment, and a liquid crystal composition comprising the compound has a wide liquid crystal phase. The inventors have also found that a liquid crystal composition comprising the compound of the invention and the polymer of the composition are excellent as an optical compensation film and so forth, and thus the invention has been completed.

The polymerizable liquid crystal compound of the invention is represented by Formula (1):

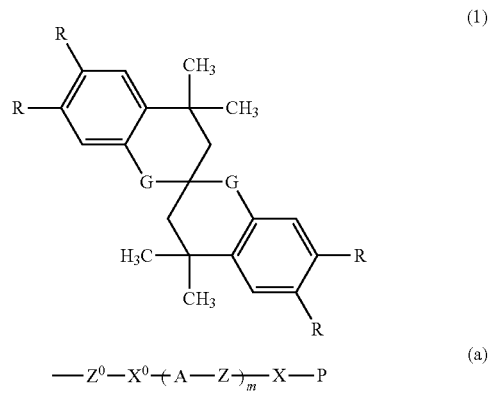

$$—Z^0—X^0—(A—Z)_m—X—P \quad (a)$$

wherein G is a single bond or —O—, and at least two of R are groups represented by Formula (a). In Formula (a), $Z^0$ is a single bond, —O—, —OCO—, or —OCOO—; $X^0$ is a single bond or alkylene having 1 to 20 carbon atoms; A is a cyclic-structure group; Z is a single bond, —COO—, —OCO—, —OCOO—, —$CH_2CH_2$—, —$CH_2O$—, —$OCH_2$— or the like; m is an integer of 0 to 3; X is a single bond or alkylene having 1 to 20 carbon atoms; and P is a polymerizable group.

DETAILED DESCRIPTION OF THE INVENTION

Figure 1:
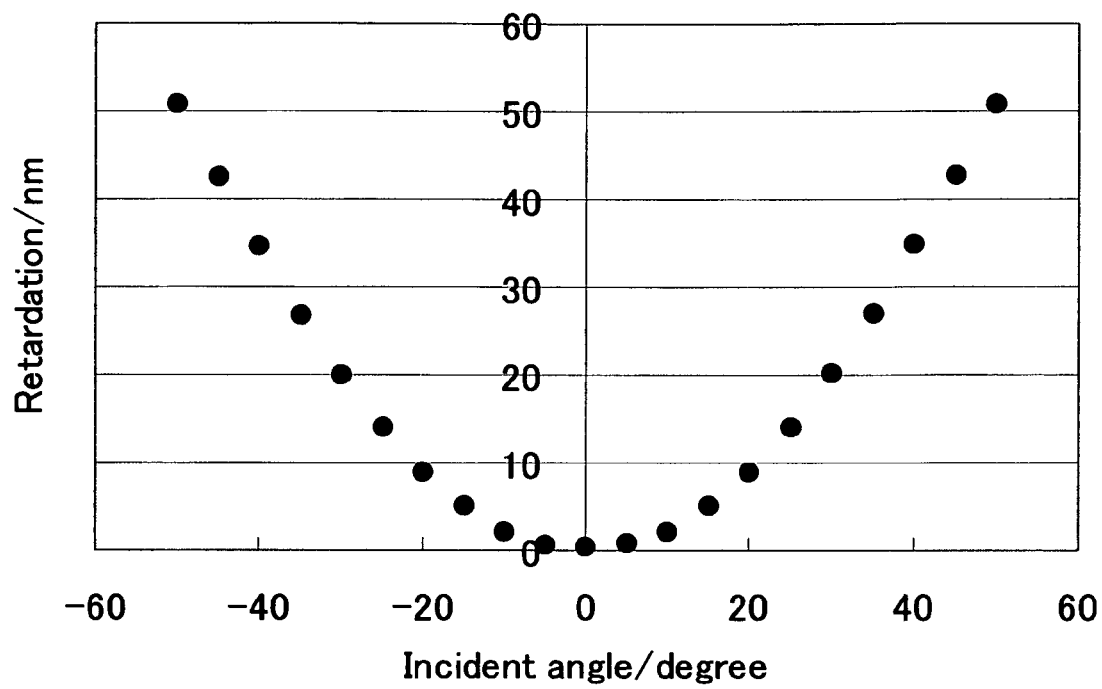
FIG. 1: Results of the measurement of retardation on the optical thin film (C-1) formed in Example 2.

Usage of the terms in this specification is as follows.

The term "liquid crystal compound" is a generic name of a compound having a liquid crystal phase and a compound which has no liquid crystal phases but useful as a component for a crystal composition. The terms "liquid crystal compound", "liquid crystal composition", and "liquid crystal display device" may be abbreviated to a compound, a composition, and a device, respectively.

The compound represented by Formula (1) may be abbreviated to the compound (1) or the compound of Formula (1). Other formulas may be abbreviated in a similar manner.

(Meth)acrylates may be used as a generic name of acrylates and methacrylates.

The symbol in which a letter (for example, A) in chemical formulas is surrounded by a hexagon indicates that it is a ring (ring A).

The term "arbitrary" used in the definition of chemical formulas means "not only a position but also a number can be selected unrestrictedly". For example, the expression "arbitrary A may be replaced by B, C, D, or E" means that one A may be replaced by any one of B, C, D, or E, and that each of a plurality of A may be replaced by any one of B, C, D, and E, and further means that at least two among A replaced by B, A replaced by C, A replaced by D, and A replaced by E may be mingled. When arbitrary —CH$_2$— may be replaced by —O—, replacement in which a bonding group —O—O— is formed is not included.

When carbon in the ring, which is bonded to a substituent, is indefinite, the substituent can be bonded to any carbon without restraint as long as the bonding position is reasonable chemically.

When the same symbols of groups are used in a plurality of formulas, these groups have the same range of the definition, which do not mean that these groups should be the same simultaneously. In such case, the same groups may be selected for a plurality of formulas and different groups may be selected for every formula.

Incidentally, the substituent, Me, means methyl in chemical formulas.

The invention is composed of the following items [1] to [19].

[1] A polymerizable liquid crystal compound represented by Formula (1):

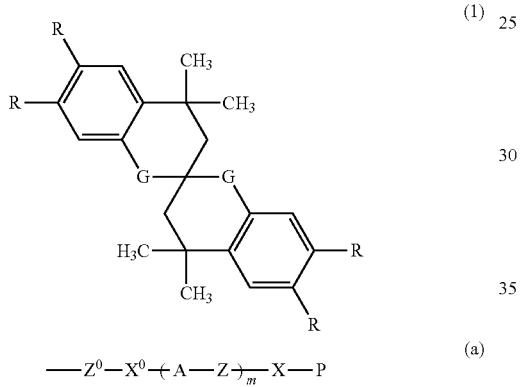

wherein

G is a single bond or —O—; R is independently hydrogen, methyl, or a group represented by Formula (a), wherein at least two of R are groups represented by Formula (a); in Formula (a), A is 1,4-cyclohexylene, 1,4-phenylene, 1,3-phenylene, 1,4-cyclohexenylene, pyridine-2,5-diyl, pyridazine-3,6-diyl, pyrimidine-2,5-diyl, bicyclo[2.2.2]octane-1,4-diyl, naphthalene-2,6-diyl, tetrahydronaphthalene-2,6-diyl, fluorene-2,7-diyl, or 1,3-dioxane-2,5-diyl, and in these rings, arbitrary hydrogen may be replaced by halogen, alkyl having 1 to 3 carbon atoms, or fluoroalkyl having 1 to 3 carbon atoms;

Z is a single bond, —COO—, —OCO—, —OCOO—, —CH$_2$CH$_2$—, —CH$_2$O—, —OCH$_2$—, —CF$_2$CF$_2$—, —CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO—, or —OCOC≡C—;

m is an integer of 0 to 3; when m is 2 or 3, a plurality of A may be all the same rings or may be composed of at least two different rings, and a plurality of Z may be all the same groups or may be composed of at least two different groups;

X$^0$ is a single bond or alkylene having 1 to 20 carbon atoms; and in this alkylene, arbitrary —CH$_2$— may be replaced by —O—, —S—, or —CH=CH— and arbitrary hydrogen may be replaced by fluorine;

Z$^0$ is a single bond, —O—, —OCO—, or —OCOO—;

X is a single bond or alkylene having 1 to 20 carbon atoms; and in this alkylene, arbitrary —CH$_2$— may be replaced by —O—, —S—, —COO—, —OCO—, or —OCOO— and arbitrary hydrogen may be replaced by fluorine; and P is a polymerizable group represented by any one of Formula (P1) to Formula (P8):

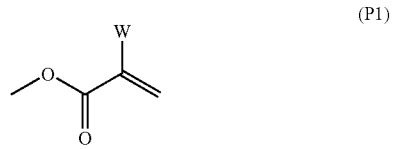

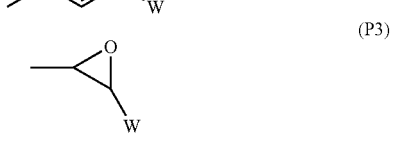

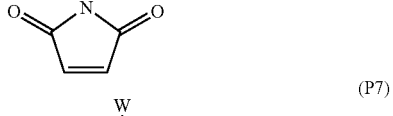

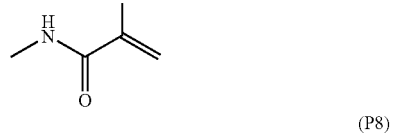

(in these formulas, W is hydrogen, halogen, alkyl having 1 to 3 carbon atoms, or fluoroalkyl having 1 to 3 carbon atoms.)

with the provisos that m is not 0 when P is a group represented by Formula (P1) and all of Z$^0$, X$^0$, and X are single bonds; and that m is not 0 also when P is a group represented by Formula (P3), Z$^0$ is —O—, X$^0$ is a single bond, and X is —CH$_2$—.

[2] The polymerizable liquid crystal compound according to the item [1], wherein A is 1,4-cyclohehexylene or 1,4-phenylene, and in these rings, arbitrary hydrogen may be replaced by halogen, alkyl having 1 to 3 carbon atoms, or fluoroalkyl having 1 to 3 carbon atoms;

Z is a single bond, —COO—, —OCO—, —OCOO—, —CH$_2$CH$_2$—, —CH$_2$O—, —OCH$_2$—, —CH=CH—, —C≡C—, —CH$_2$CH$_2$COO—, —OCOCH$_2$CH$_2$—, —CH=CHCOO—, —OCOCH=CH—, —C≡CCOO—, or —OCOC≡C—;

Z$^0$ is —O—, —OCO—, or —OCOO—; and

P is a group represented by Formula (P1), Formula (P6), Formula (P7), or Formula (P8).

[3] The polymerizable liquid crystal compound according to the item [1], wherein A is 1,4-cyclohexylene or 1,4-phenylene, and in these rings, arbitrary hydrogen may be replaced by halogen, alkyl having 1 to 3 carbon atoms, or fluoroalkyl having 1 to 3 carbon atoms;

Z is a single bond, —COO—, —OCO—, —OCOO—, —CH₂CH₂—, —CH₂O—, —OCH₂—, —CH═CH—, —C≡C—, —CH₂CH₂COO—, —OCOCH₂CH₂—, —CH═CHCOO—, —OCOCH═CH—, —C≡CCOO—, or —OCOC≡C—;

Z⁰ is —O—, —OCO—, or —OCOO—; and

P is a group represented by Formula (P3), Formula (P4), or Formula (P5).

[4] The polymerizable liquid crystal compound according to the item [1], wherein G is a single bond;

R is a group represented by Formula (a);

A is 1,4-cyclohexylene or 1,4-phenylene, and in these rings, arbitrary hydrogen may be replaced by fluorine, chlorine, methyl, or trifluoromethyl;

Z is a single bond, —COO—, —OCO—, —OCOO—, —CH₂CH₂—, —CH═CH—, —CH₂CH₂COO—, —OCOCH₂CH₂—, —CH═CHCOO—, or —OCOCH═CH—;

X⁰ is a single bond or alkylene having 1 to 10 carbon atoms; and in this alkylene, arbitrary —CH₂— may be replaced by —O— and arbitrary hydrogen may be replaced by fluorine;

Z⁰ is —O— or —OCO—;

X is a single bond or alkylene having 1 to 10 carbon atoms; and in this alkylene, arbitrary —CH₂— may be replaced by —O—, —COO—, or —OCO— and arbitrary hydrogen may be replaced by fluorine;

P is a group represented by Formula (P1), Formula (P3), or Formula (P5), wherein W is hydrogen, fluorine, chlorine, methyl, ethyl, or trifluoromethyl.

[5] The polymerizable liquid crystal compound according to the item [1], wherein G is a single bond;

R is a group represented by Formula (a);

A is 1,4-phenylene, and in this ring, arbitrary hydrogen may be replaced by fluorine;

Z is a single bond or —OCOO—;

X⁰ is a single bond;

Z⁰ is —OCO—;

m is 1;

X is a single bond or alkylene having 1 to 10 carbon atoms; and in this alkylene, arbitrary —CH₂— may be replaced by —O—; and P is a group represented by Formula (P1), Formula (P3), or Formula (P5), wherein W is hydrogen, methyl, or ethyl.

[6] A liquid crystal composition, comprising at least one of compounds represented by Formula (1) according to any one of the items [1] to [5], and composed of at least two compounds.

[7] The liquid crystal composition according to the item [6], wherein all of the components are polymerizable compounds.

[8] A liquid crystal composition comprising at least one compound represented by Formula (1) according to any one of the items [1] to [5] and at least one compound selected from the group of compounds represented by Formula (M1), and Formula (M2a) to Formula (M2e), wherein the compound represented by Formula (1) is in the range of 1% to 50% by weight, and the compound selected from the group of compounds represented by Formula (M1), and Formula (M2a) to Formula (M2e) is in the range of 50% to 99% by weight at the rate based on the total amount of the compound represented by Formula (1) and the compound selected from the group of compounds represented by Formula (M1), and Formula (M2a) to Formula (M2e):

(M1)

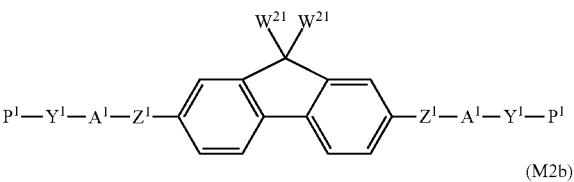
(M2a)

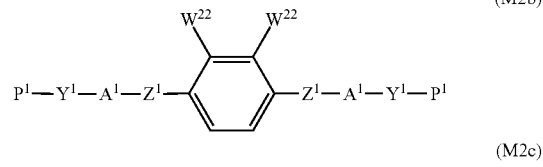
(M2b)

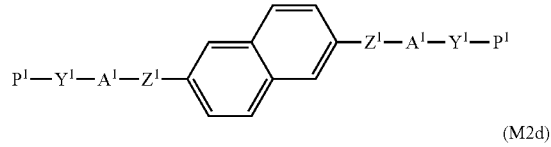
(M2c)

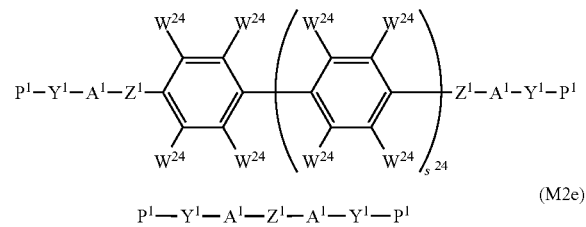
(M2d)

P¹—Y¹—A¹—Z¹—A¹—Y¹—P¹
(M2e)

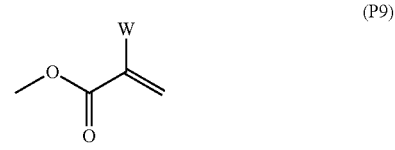
(P9)

(P10)

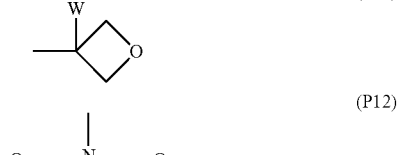
(P11)

(P12)

wherein P¹ is independently a polymerizable group represented by any one of Formula (P9) to Formula (P12), wherein W is hydrogen, halogen, alkyl having 1 to 3 carbon atoms, or fluoroalkyl having 1 to 3 carbon atoms;

R¹ is hydrogen, fluorine, chlorine, cyano, or alkyl having 1 to 20 carbon atoms; and in this alkyl having 1 to 20 carbon atoms, arbitrary —CH₂— may be replaced by —O—, —COO—, —OCO—, or —OCOO— and arbitrary hydrogen may be replaced by halogen;

A¹ is independently 1,4-cyclohexylene, 1,4-phenylene, 1,3-phenylene, pyridine-2,5-diyl, pyrimidine-2,5-diyl, or naphthalene-2,6-diyl, and in these rings, arbitrary hydrogen may be replaced by halogen;

Y¹ is independently a single bond or alkylene having 1 to 20 carbon atoms, and in this alkylene, arbitrary —CH$_2$— may be replaced by —O—, —COO—, —OCO—, or —OCOO—;

Z¹ is independently a single bond, —COO—, —OCO—, —OCOO—, —CH$_2$CH$_2$—, —CH=CH—, —C≡C—, —CH$_2$O—, —OCH$_2$—, —CF$_2$O—, —OCF$_2$—, —CH=CHCOO—, —OCOCH=CH—, —(CH$_2$)$_2$COO—, or —OCO(CH$_2$)$_2$—;

W$^{21}$ is independently hydrogen, halogen, or alkyl having 1 to 3 carbon atoms;

W$^{22}$ is independently hydrogen, halogen, cyano, alkyl having 1 to 5 carbon atoms, or halogenated alkyl having 1 to 5 carbon atoms;

W$^{24}$ is independently hydrogen, halogen, alkyl having 1 to 5 carbon atoms, or halogenated alkyl having 1 to 5 carbon atoms;

s$^{11}$ is 1 or 2; when s$^{11}$ is 2, two of A¹ may be the same rings or different rings and two of Z¹ may also be the same groups or different groups; and s$^{24}$ is 1 or 2; when s$^{24}$ is 2, the substituents of two rings may be the same or different.

[9] The liquid crystal composition according to the item [8], wherein R¹ is fluorine, cyano, alkyl having 2 to 12 carbon atoms, or alkoxy having 2 to 12 carbon atoms; and in these alkyl and alkoxy, arbitrary hydrogen may be replaced by fluorine;

A¹ is independently 1,4-cyclohexylene, 1,4-phenylene, or 1,3-phenylene, wherein in these rings, arbitrary hydrogen may be replaced by fluorine;

Y¹ is independently alkylene having 2 to 12 carbon atoms, alkyleneoxy having 2 to 12 carbon atoms, or oxyalkylene having 2 to 12 carbon atoms;

Z¹ is independently a single bond, —COO—, —OCO—, —CH=CHCOO—, —OCOCH=CH—, —(CH$_2$)$_2$COO—, or —OCO(CH$_2$)$_2$—;

W$^{21}$ is independently hydrogen, fluorine, or methyl;

W$^{22}$ is independently hydrogen, fluorine, cyano, methyl, isopropyl, tertiary-butyl, or trifluoromethyl;

W$^{24}$ is independently hydrogen, fluorine, methyl, or methoxy.

[10] The liquid crystal composition according to the item [8] or [9], further comprising a non-liquid crystal polymerizable compound.

[11] The liquid crystal composition according to any one of the items [8] to [10], further comprising an optically active compound.

[12] A polymer obtained by polymerizing the compound according to any one of the items [1] to [5].

[13] A polymer obtained by polymerizing the composition according to any one of the items [6] to [11].

[14] A formed body having optical anisotropy, wherein at least one compound according to any one of the items [1] to [5] or the composition according to any one of the items [6] to [11] is aligned, and then the alignment of molecules in a liquid crystal phase is fixed by polymerizing the compound or the composition on irradiation with electromagnetic waves.

[15] The formed body according to the item [14], wherein a fixed alignment of molecules is a homeotropic alignment.

[16] An optical device composed of the formed body according to the item [14] or [15].

[17] A liquid crystal display device comprising the compound according to one of the items [1] to [5] and/or the optical device according to the item [16].

[18] A liquid crystal display device comprising the composition according to one of the items [6] to [11] and/or the optical device according to the item [16].

[19] A film composed of the polymer according to the item [12] or [13].

The compound of the invention is represented by Formula (1).

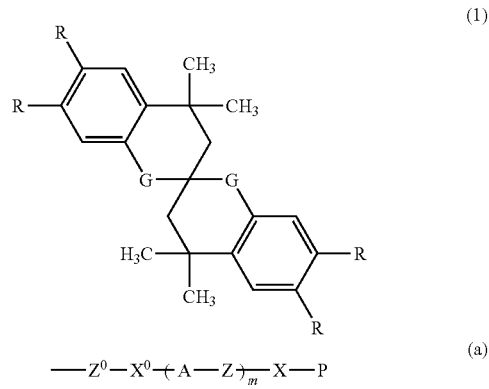

(1)

(a) —Z⁰—X⁰—(A—Z)$_m$—X—P

In Formula (1), G is a single bond or —O—, and preferably a single bond. R is independently hydrogen, methyl, or a group represented by Formula (a), and at least two of R are groups represented by Formula (a).

In Formula (a), A is a divalent group having a ring structure. A is independently 1,4-cyclohexylene, 1,4-phenylene, 1,3-phenylene, 1,4-cyclohexenylene, pyridine-2,5-diyl, pyridazine-3,6-diyl, pyrimidine-2,5-diyl, bicyclo[2.2.2]octane-1,4-diyl, naphthalene-2,6-diyl, tetrahydronaphthalene-2,6-diyl, fluorene-2,7-diyl, or 1,3-dioxane-2,5-diyl, and a desirable A is 1,4-cyclohexylene or 1,4-phenylene. In these rings, arbitrary hydrogen may be replaced by halogen, alkyl having 1 to 3 carbon atoms, or fluoroalkyl having 1 to 3 carbon atoms.

Especially desirable A are 1,4-cyclohexylene, 1,4-phenylene, and 1,4-phenylene in which arbitrary hydrogen in the group has been replaced by fluorine, chlorine, methyl, or trifluoromethyl. Specific examples are as follows.

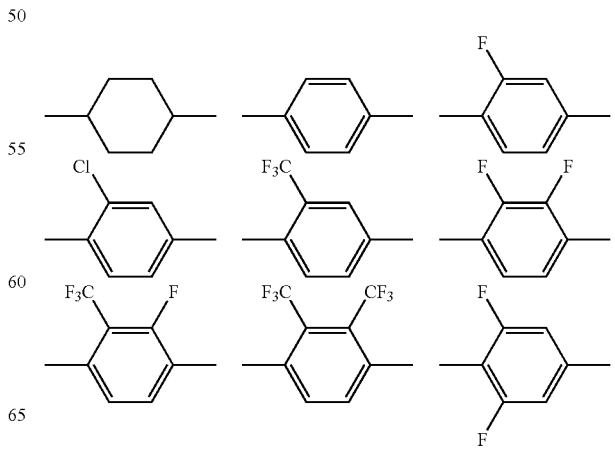

-continued

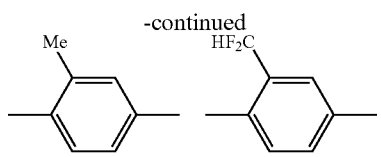

These rings in Formula (a) may be bonded in the left-right reverse direction. Configuration of 1,4-cyclohexylene and 1,3-dioxane-2,5-diyl is preferably a trans-form. The compound of the invention has no large difference on its physical properties even if it contains an isotope in a larger amount than that of the natural abundance.

Z in Formula (a) is a bonding group. Z is a single bond, —COO—, —OCO—, —OCOO—, —CH₂CH₂—, —CH₂O—, —OCH₂—, —CF₂CF₂—, —CH═CH—, —CF═CF—, —C≡C—, —CF₂O—, —OCF₂—, —CH₂CH₂CF₂O—, —OCF₂CH₂CH₂—, —CH₂CH₂COO—, —OCOCH₂CH₂—, —CH═CHCOO—, —OCOCH═CH—, —C≡CCOO—, or —OCOC≡C—. Each of a single bond, —COO—, —OCO—, —CH₂CH₂—, —CH₂O—, —(CH₂)₃O—, —O(CH₂)₃—, CH═CH—, —CH═CHCH₂—, —CH₂CH₂COO—, OCOCH₂CH₂—, —CH═CHCOO—, and —OCOCH═CH— tends to increase liquid crystallinity. Each of —CF₂CF₂—, —CF₂O—, —OCF₂—, —CH₂CH₂CF₂O—, and —OCF₂CH₂CH₂—, which have fluorine, tends to decrease optical anisotropy or increase dielectric anisotropy. Each of —C≡C—, —C≡CCOO—, and —OCOC≡C—, which have a triple bond, tends to induce a large optical anisotropy. Desirable Z are a single bond, —COO—, —OCO—, —OCOO—, —CH₂CH₂—, —CH₂O—, —OCH₂—, —C≡C—, —CH═CHCOO—, and —OCOCH═CH—. Especially desirable Z are a single bond, —COO—, —OCO—, —OCOO—, —CH₂CH₂—, —C≡C—, —CH₂CH₂COO—, —OCOCH₂CH₂—, —CH═CHCOO—, and —OCOCH═CH—.

m is an integer of 0 to 3. A desirable m is an integer of 0 to 2, and an especially desirable m is 0 or 1. When m is 2 or 3, a plurality of A may be all the same rings or may be composed of at least two different rings, and a plurality of Z may be all the same groups or may be composed of at least two different groups.

$Z^0$ in Formula (a) is a single bond, —O—, —OCO—, or —OCOO—. A desirable $Z^0$ is —O— or —OCO—, and especially desirable $Z^0$ is —OCO—.

$X^0$ in Formula (a) is a single bond or alkylene having 1 to 20 carbon atoms. In this alkylene, arbitrary —CH₂— may be replaced by —O—, —S—, or —CH═CH— and arbitrary hydrogen may be replaced by fluorine. A desirable $X^0$ is a single bond or alkylene having 1 to 10 carbon atoms. In this alkylene having 1 to 10 carbon atoms, arbitrary —CH₂— may be replaced by —O— and arbitrary hydrogen may be replaced by fluorine.

X in Formula (a) is a single bond or alkylene having 1 to 20 carbon atoms, and in this alkylene, arbitrary —CH₂— may be replaced by —O—, —S—, —COO—, or —OCO—. Desirable X are a single bond, —COO—, —OCO—, —OCOO—, and alkylene having 1 to 20 carbon atoms in which arbitrary —CH₂— may be replaced by —O—. Especially desirable X are a single bond, —COO—, —OCO—, —OCOO—, and alkylene having 1 to 10 carbon atoms in which arbitrary —CH₂— may be replaced by —O—. X may have a branched structure. In this X, arbitrary hydrogen may be replaced by fluorine. X may be a racemic modification or an optically active modification when it has an asymmetric carbon.

P in Formula (a) is a polymerizable group represented by any one of Formula (P1) to Formula (P8).

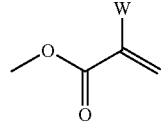
(P1)

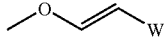
(P2)

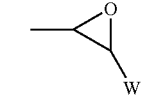
(P3)

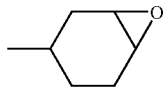
(P4)

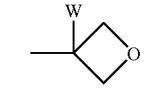
(P5)

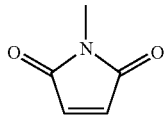
(P6)

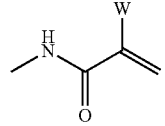
(P7)

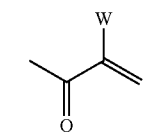
(P8)

In these formulas, W is hydrogen, halogen, alkyl having 1 to 3 carbon atoms, or fluoroalkyl having 1 to 3 carbon atoms. Desirable W are hydrogen, fluorine, chlorine, methyl, ethyl, and trifluoromethyl.

A polymerizable group represented by Formula (P1), Formula (P2), Formula (P6), Formula (P7), or Formula (P8) is suitable for radical polymerization. A polymerizable group represented by Formula (P3), Formula (P4), or Formula (P5) is suitable for cationic polymerization. These polymerizable groups can be promptly polymerized by the addition of a polymerization initiator. More desirable P is a polymerizable group represented by Formula (P1), Formula (P3), Formula (P5), or Formula (P6), and W is hydrogen, fluorine, chlorine, methyl, ethyl, or trifluoromethyl. Especially desirable P is a polymerizable group represented by Formula (P1), Formula (P3), or Formula (P5), and W is hydrogen, methyl, or ethyl. There are also cases where optimization of reaction temperature is effective in increasing the rates of polymerization on these polymerizable groups.

Methods for preparing the compound (1) will be explained. A polymerizable group represented by Formula (P1) or Formula (P7) can be introduced by the action of acrylic acid chlorides on a liquid crystal moiety having a hydroxy group or an amino group, respectively. A polymerizable group represented by Formula (P2) can be introduced by the action of butyl vinyl ether on a liquid crystal moiety having a hydroxy group and then by the ether-exchange reaction A polymerizable group represented by Formula (P3) or Formula (P4) can be introduced by oxidation of a liquid crystal moiety having an unsaturated bond. Well-known intermediates having an oxyrane-ring and a cyclohexeneoxide-ring may be used. A polymerizable group of Formula (P5) can be introduced by using well-known intermediates including an oxetane-ring, for example, industrially available 3-alkyloxetane-3-yl-methanol and so forth. A polymerizable group represented by Formula (P6) can be introduced by the action of maleic anhydride on a liquid crystal moiety having a hydroxy group. A polymerizable group represented by Formula (P8) can be introduced by the action of β-chloropropionic acid chloride or the like on a liquid crystal moiety having halogen, and then by the dehydrochlorination. Incidentally, a liquid crystal moiety means a remaining group in which the terminal group P is removed from Formula (a).

The structure of compound (1) except a polymerizable group can be produced by a proper combination of methods in synthetic organic chemistry described in Houben-Wyle, Methoden der Organische Chemie (Georg-Thieme Verlag, Stuttgart), Organic synthesis (John & Wily & Sons, Inc.), Organic Reactions (John & Wily & Sons, Inc.), Comprehensive Organic Synthesis (Pergamon Press) and so forth. Specifically, the structures can be constructed by bonding organic moieties having six-membered structures. Next, the bonding method will be explained. Hereinafter, $MG^1$ and $MG^2$ are mono-valent organic moieties having at least one of six-membered ring structure, and may be the same or different each other.

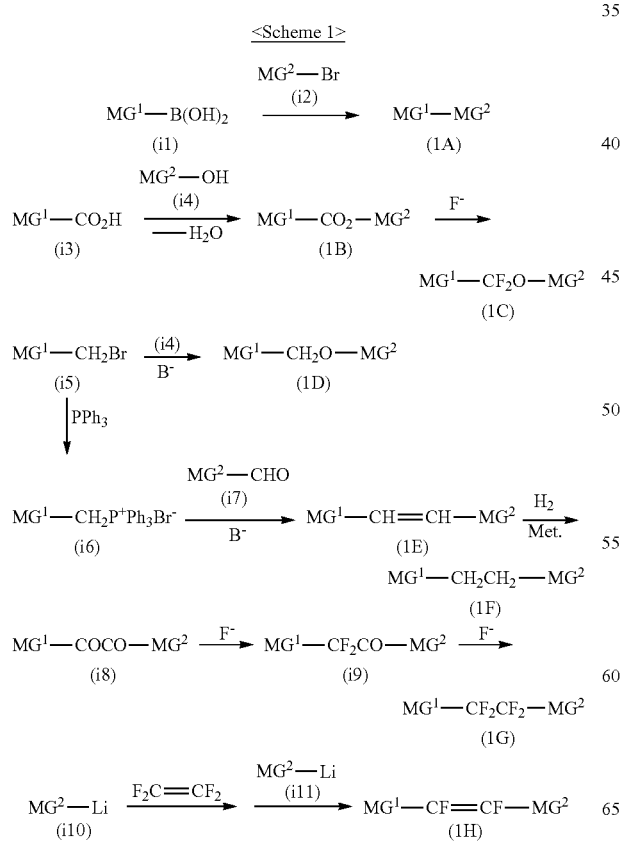

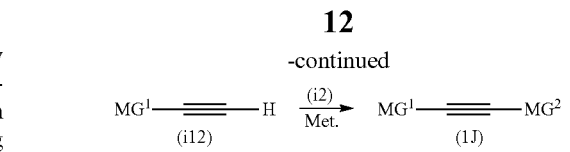

Scheme 1 will be explained. The compound (1A) in which Z is a single bond can be synthesized by the cross-coupling reaction of boronic acid (i1) with the bromide (i2). The compound (1B) in which a bonding group is —COO— can be synthesized by dehydrating condensation of the carboxylic acid (i3) with the compound (i4) having a hydroxy group, and the compound (1C) in which the bonding group is —CF$_2$O— can be synthesized by fluorination of the carbonyl group with fluorine anions. The compound (1D) in which a bonding group is —CH$_2$O— can be synthesized from the bromide (i5), the compound (i4), and a base (B$^-$). The compound (1E) in which a bonding group is —CH=CH— can be synthesized by carrying out the Wittig reaction in which the aldehyde (i7) acts on the ylide prepared from the phosphonium salt (i6) and a base. The salt (i6) can be synthesized by the action of PPh$_3$ on the bromide (i5). The compound (1F) in which a bonding group is —CH$_2$CH$_2$— is synthesized by reduction of the compound (1E). The compound (1G) in which a bonding group is —CF$_2$CF$_2$— can be synthesized by fluorination of the diketone (i8) with fluorine anions. Since the reaction proceeds in two steps, the compound (i9) in which a bonding group is —CF$_2$CO— can be isolated by controlling potency of the fluorine anions. The compound (1H) in which a bonding group is —CF=CF— can be synthesized by the action of the lithiate (i10) and then the lithiate (i11) on tetrafluoroethylene. The compound (1J) in which a bonding group is —C≡C— can be synthesized by the cross-coupling reaction of alkyne (i12) with the bromide (i12) in the presence of a transition metal catalyst.

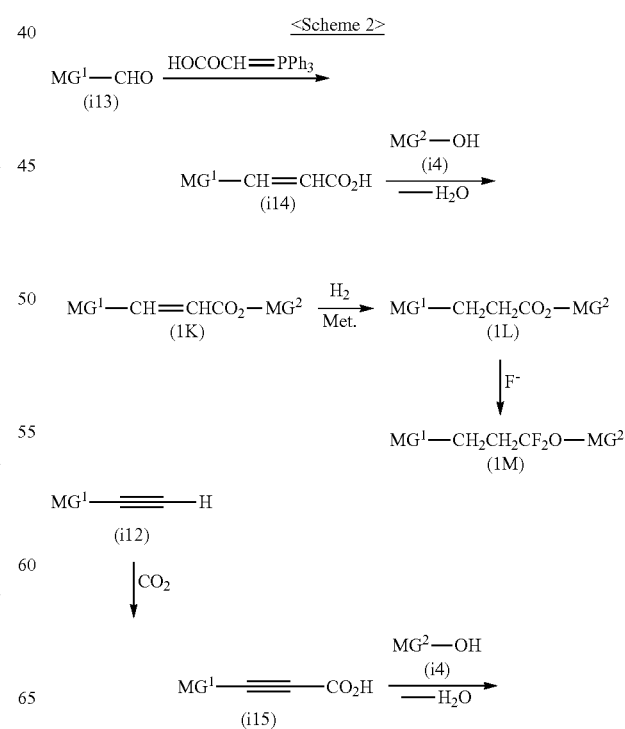

-continued

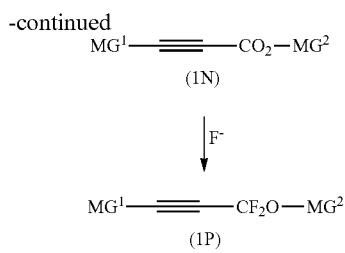

Scheme 2 will be explained. The compound (1K) in which a bonding group is —CH═CHCOO— can be synthesized by dehydrating condensation of the carboxylic acid (i14) with the compound (i4). The carboxylic acid (i14) can be synthesized by the Wittig reaction of the aldehyde (i13). The compound (1L) in which a bonding group is —CH$_2$CH$_2$COO— can be synthesized by reduction of the compound (1K), and then the compound (1M) in which a bonding group is —CH$_2$CH$_2$CF$_2$O— can be synthesized by fluorination of the carbonyl group with fluorine anions. The compound (1N) in which a bonding group is —C≡CCOO— can be synthesized by dehydrating condensation of the carboxylic acid (i15) with the compound (i4). Then, the compound (1P) in which a bonding group is —C≡CCF$_2$O— can be synthesized by fluorination of the carbonyl group with fluorine anions. The carboxylic acid (i15) can be synthesized by lithiation of the alkyne (i12) and then by the action of CO$_2$

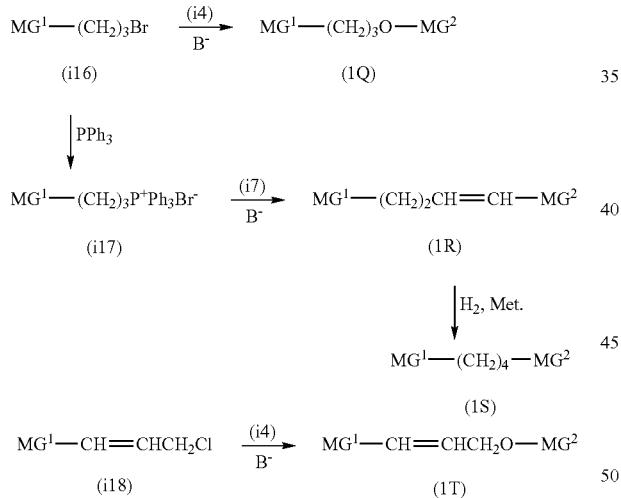

Scheme 3 will be explained. The compound (1Q) having a —(CH$_2$)$_3$O— group can be synthesized from the bromide (i16), the compound (i4), and a base. The compound (1R) in which a bonding group is —(CH$_2$)$_2$CH═CH— can be synthesized by the Wittig reaction in which the aldehyde (i7) acts on the ylide prepared from the phosphonium salt (i17) and a base. The compound (1S) in which a bonding group is —(CH$_2$)$_4$— can be synthesized by reduction of the compound (1R). The salt (i17) can be synthesized by the action of PPh$_3$ on the bromide (i16). The compound (1T) having a —CH═CHCH$_2$O— group can be synthesized from the chloride (i18), the compound (i4), and a base.

Examples of desirable compound (1) which can be synthesized by the method described above are the compound (1-1) to the compound (1-5), wherein R is a group represented by Formula (a), and specific examples of Formula (a) are Formula (R-1-1) to Formula (R-1-14), Formula (R-2-1) to Formula (R-2-14), Formula (R-3-1) to Formula (R-3-12), and Formula (R-4-1) to Formula (R-4-14). In these compounds, hydrogen of a benzene-ring or a cyclohexane-ring may be replaced by halogen, alkyl, or fluoroalkyl having 1 to 3 carbon atoms, and r is an integer of 1 to 20. W has the meanings identical to those indicated in the item [1] described above.

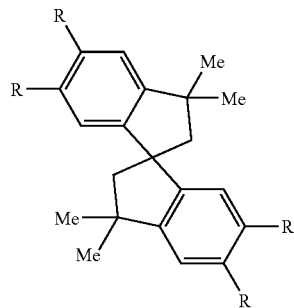

(1-1)

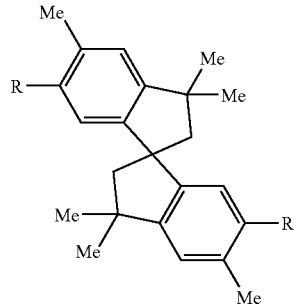

(1-2)

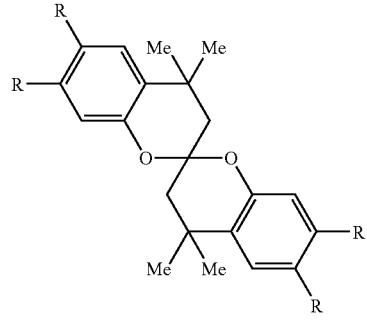

(1-3)

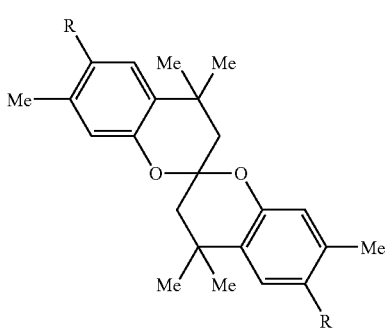

(1-4)

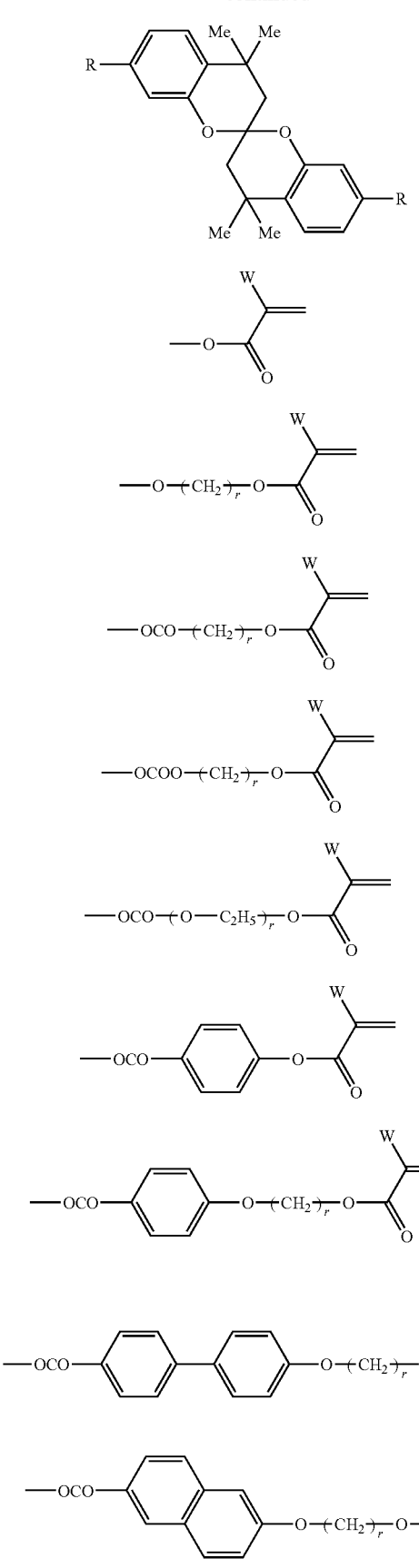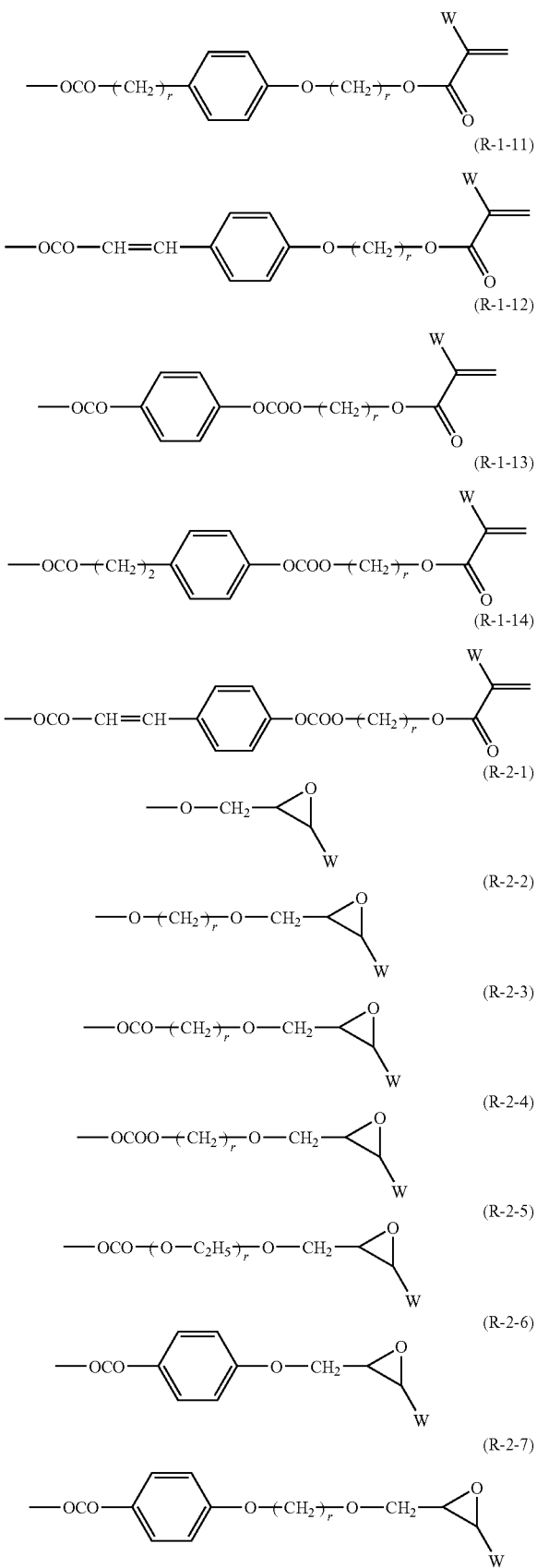

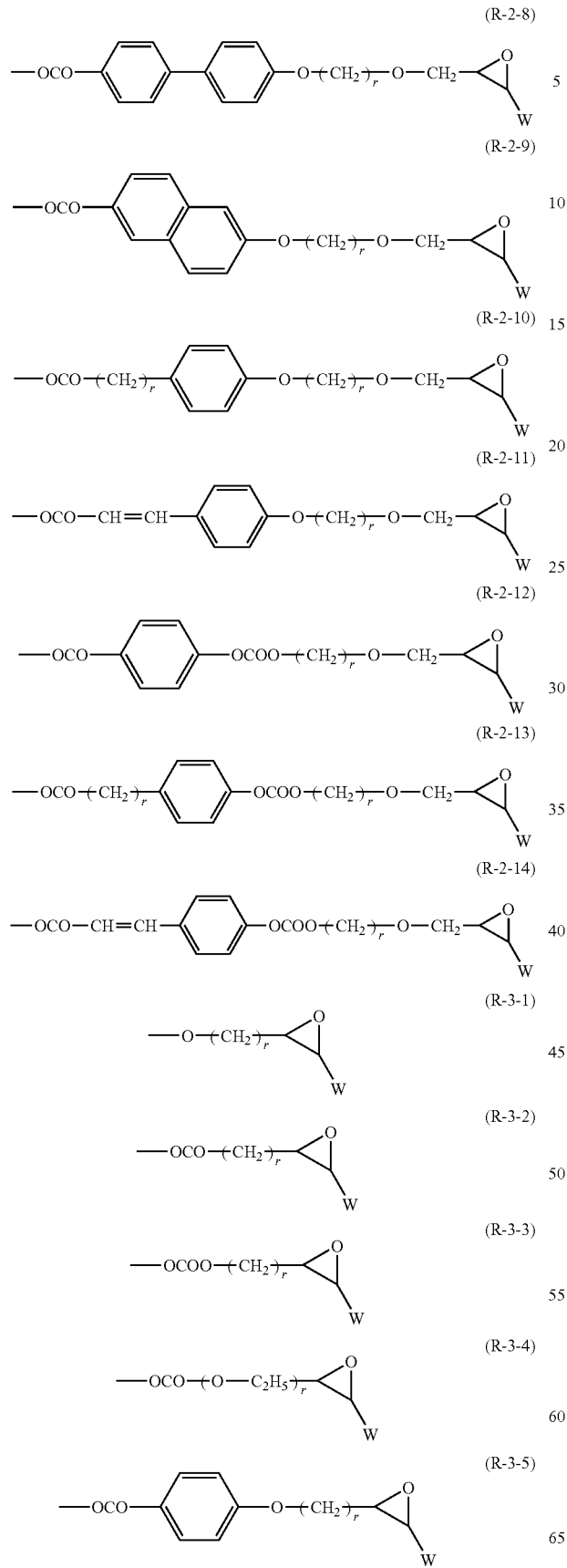
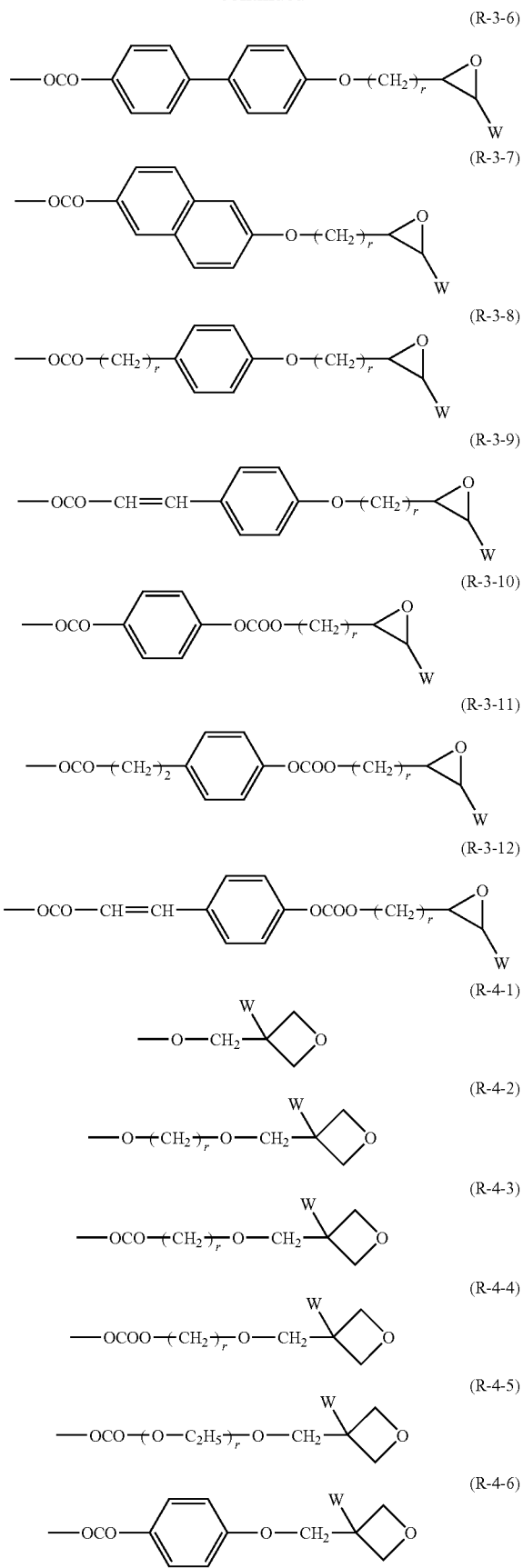

(R-4-7)
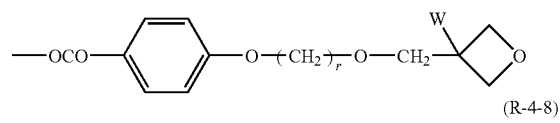
(R-4-8)
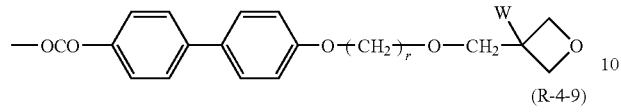
(R-4-9)
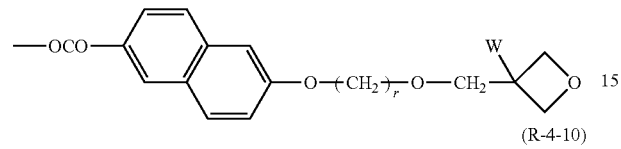
(R-4-10)
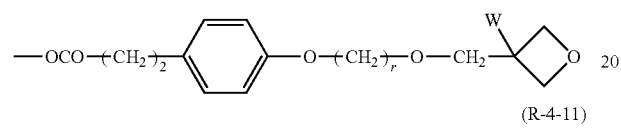
(R-4-11)
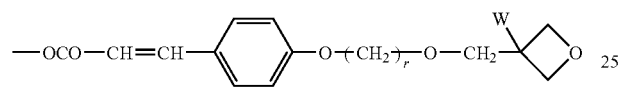
(R-4-12)
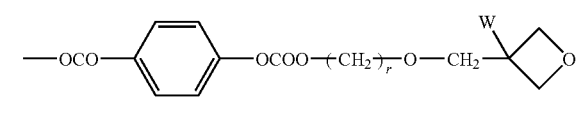
(R-4-13)
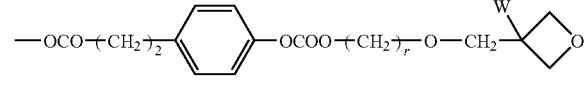
(R-4-14)
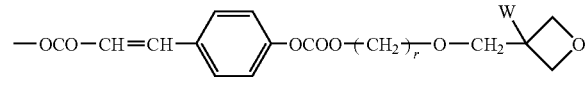
In Formula (1-1) to Formula (1-5), specific examples in the case where P is a group represented by Formula (P1) and W is hydrogen in Formula (P1) are as follows. In the following specific examples, n is an integer of 2 to 12
(1-1-1)
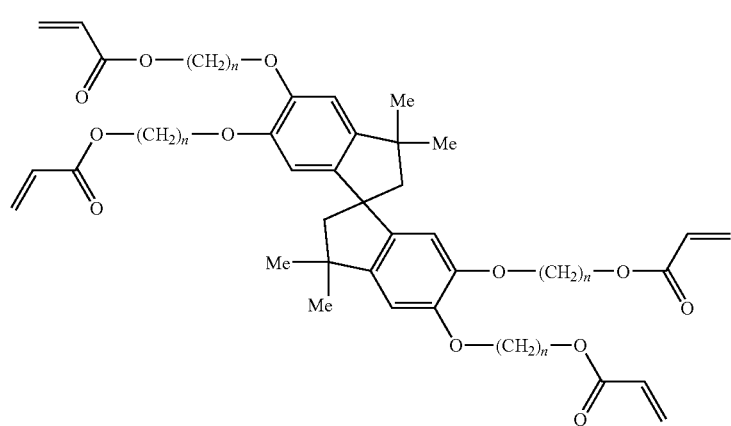
(1-1-2)
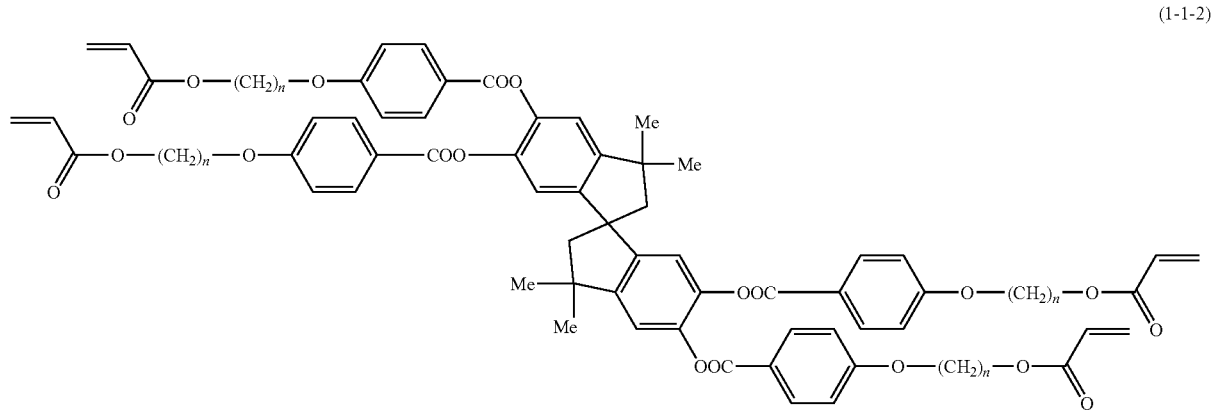

(1-1-3)
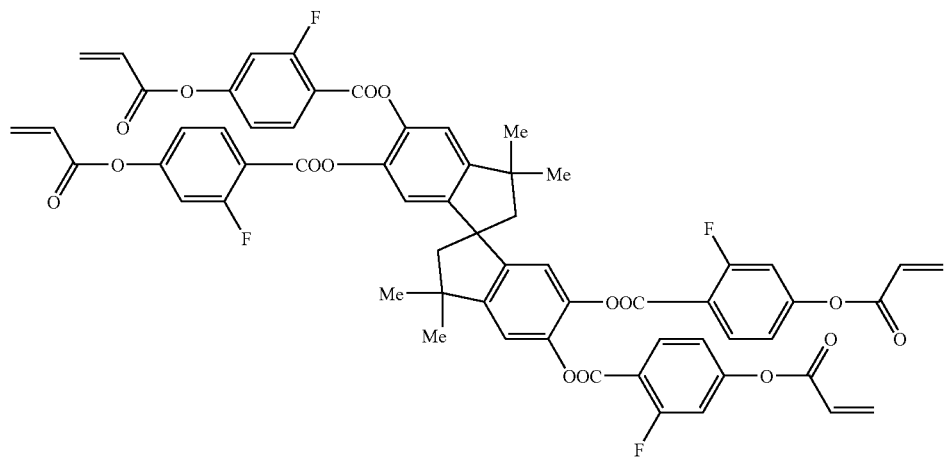
(1-1-4)
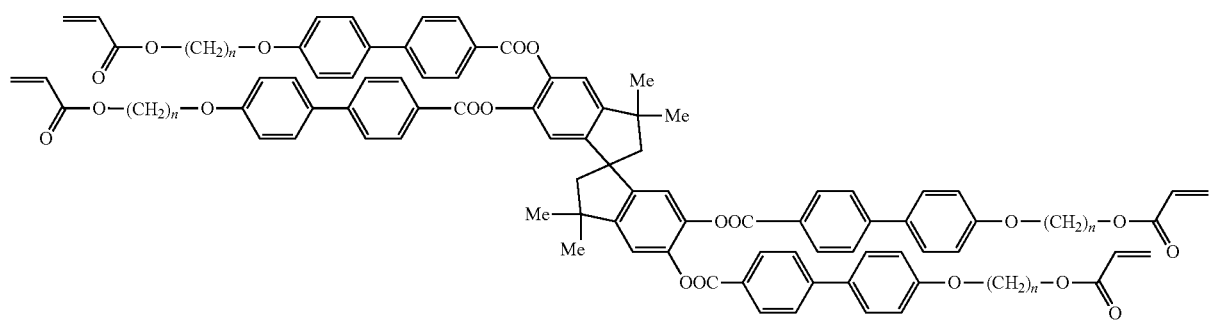
(1-1-5)
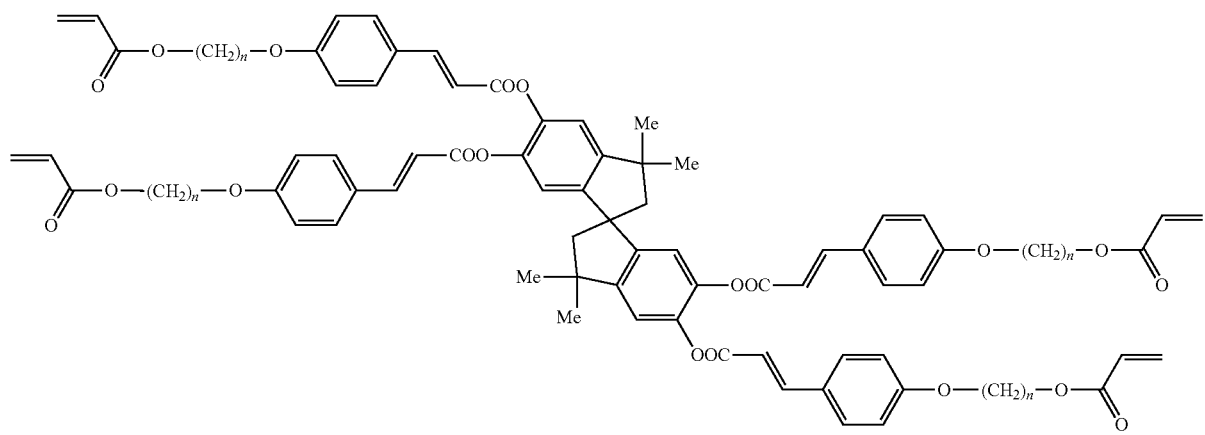
(1-2-1)
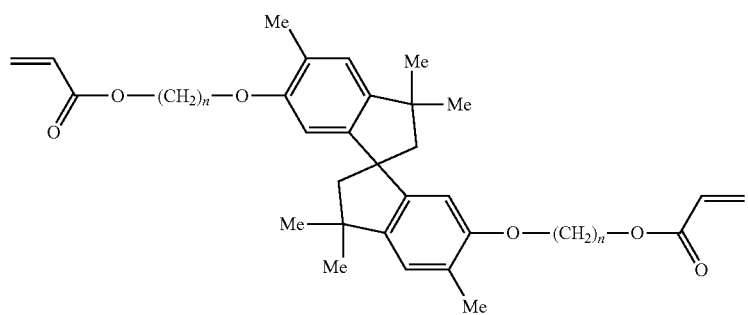

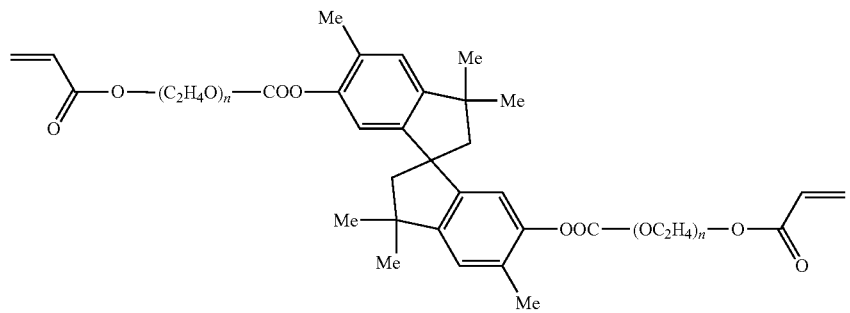
(1-2-2)
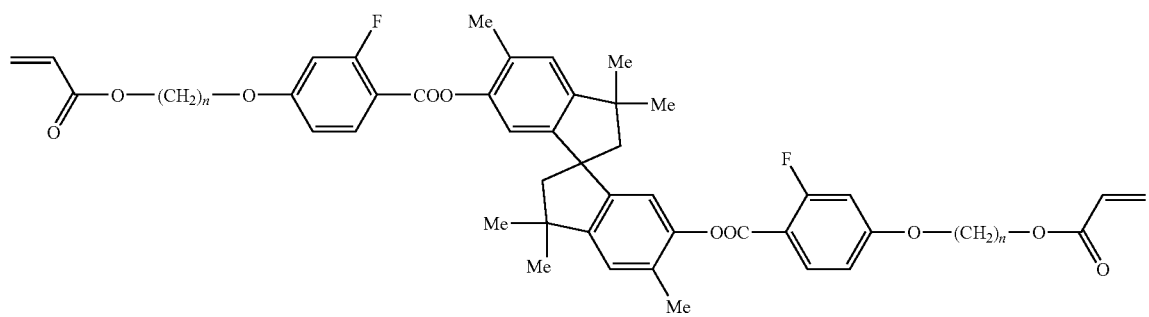
(1-2-3)
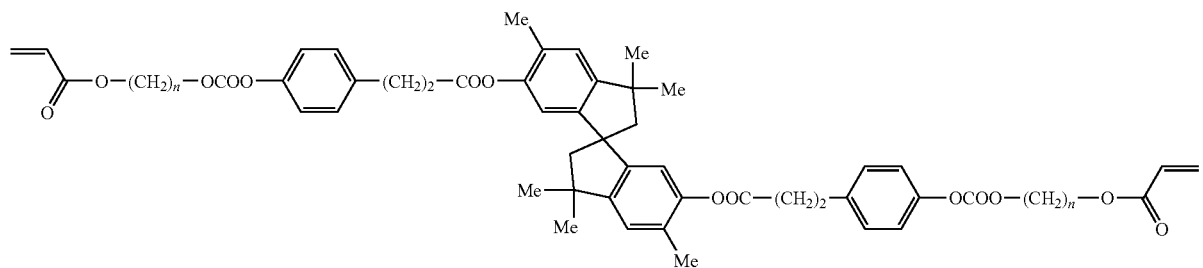
(1-2-4)
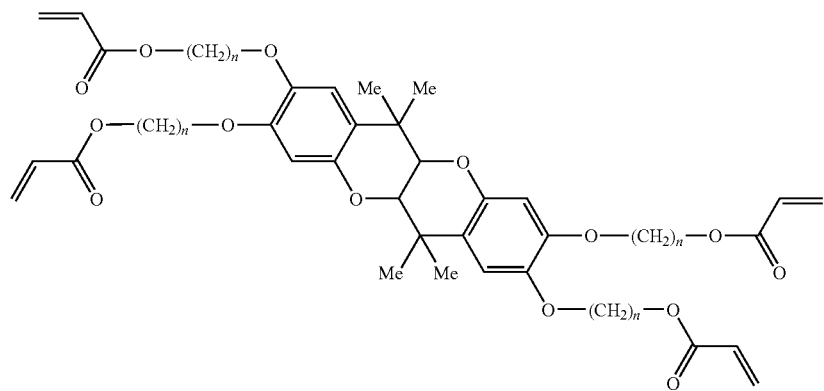
(1-3-1)

-continued
(1-3-2)
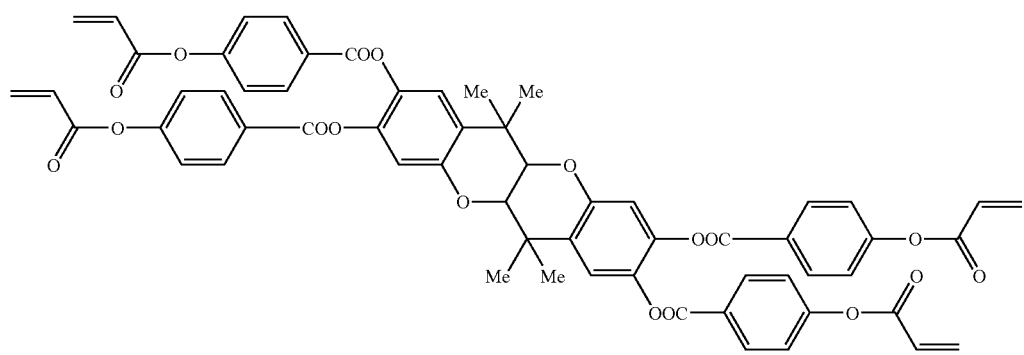
(1-3-3)
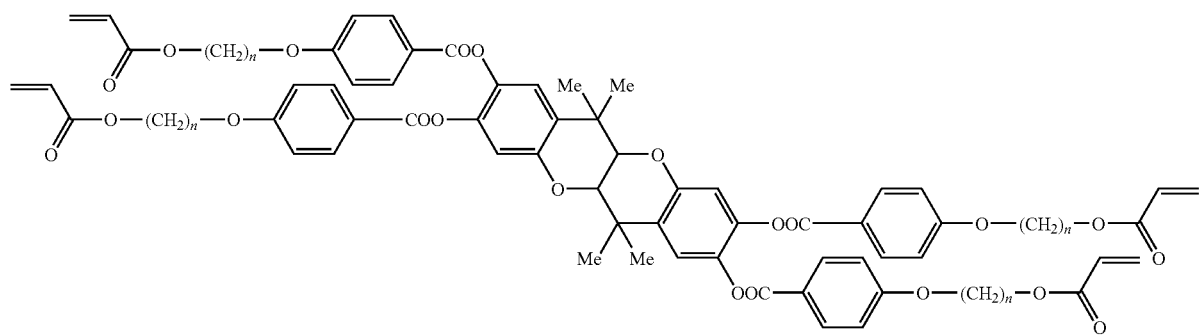
(1-3-4)
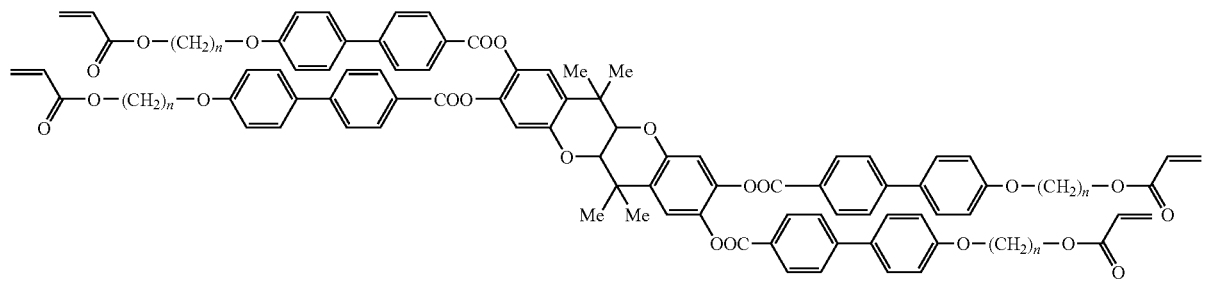
(1-3-5)
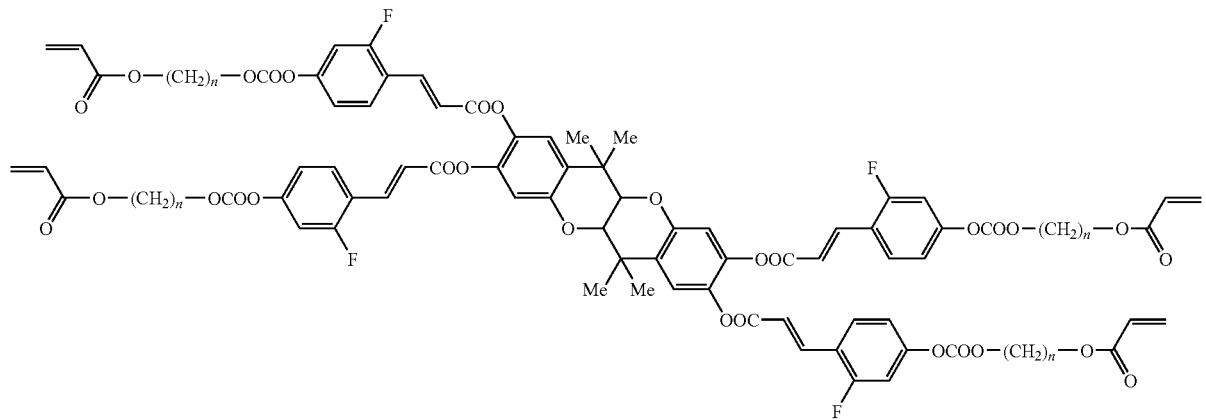

-continued
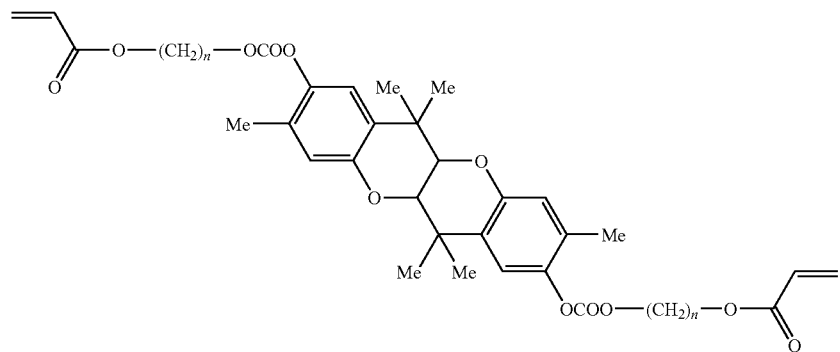
(1-4-1)
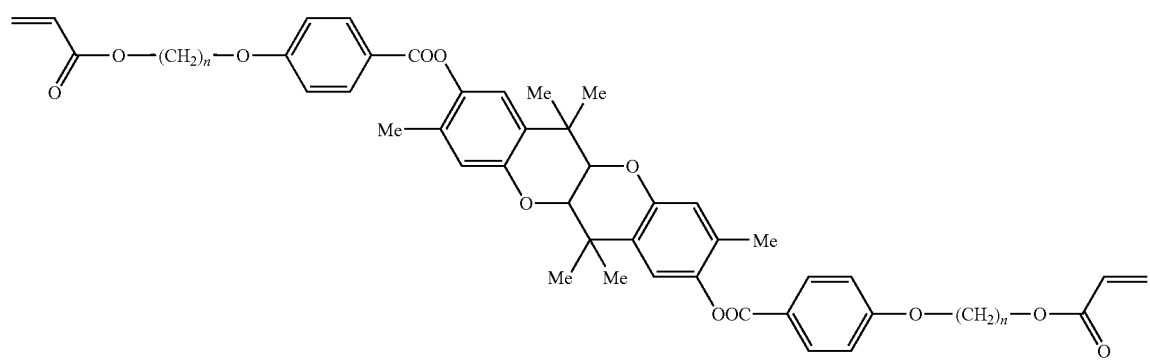
(1-4-2)
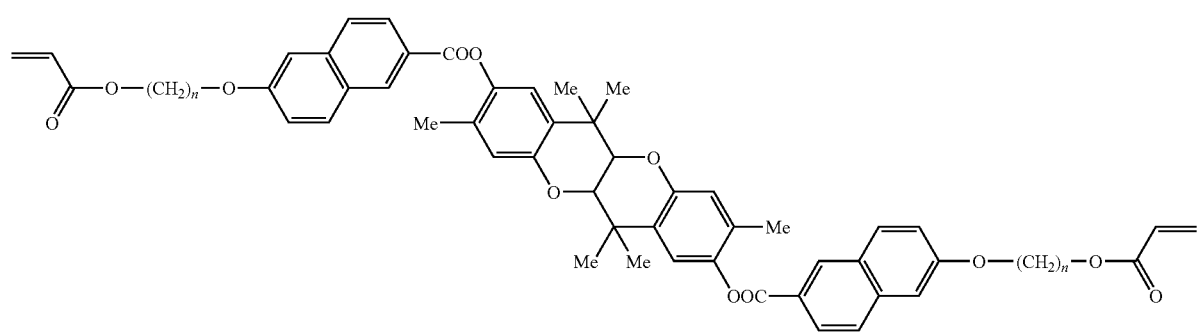
(1-4-3)
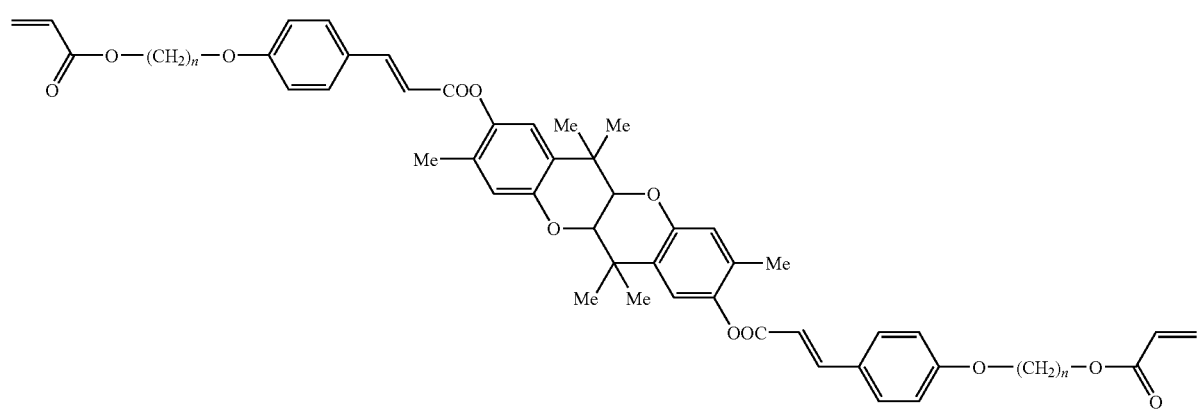
(1-4-4)

-continued
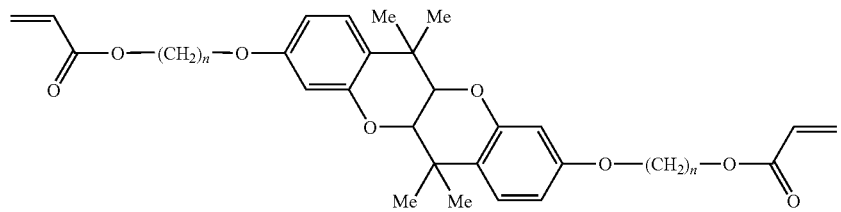
(1-5-1)
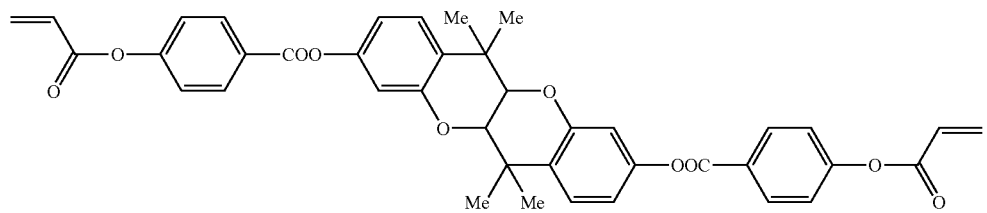
(1-5-2)
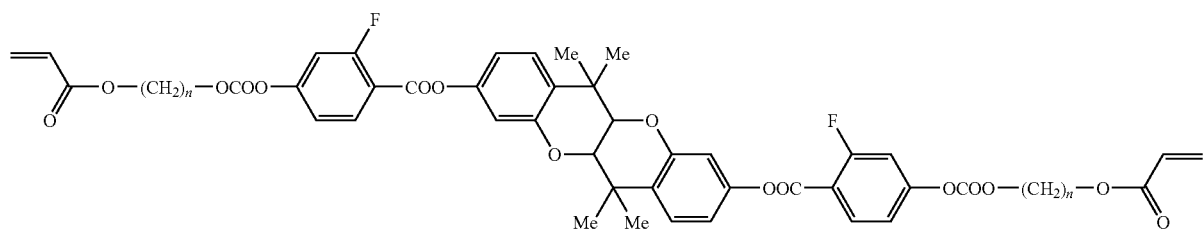
(1-5-3)
In Formula (1-1) to Formula (1-5), specific examples in the case where P is a group represented by Formula (P3) and W is hydrogen in Formula (P3) are as follows. In the following specific examples, n is an integer of 2 to 12.
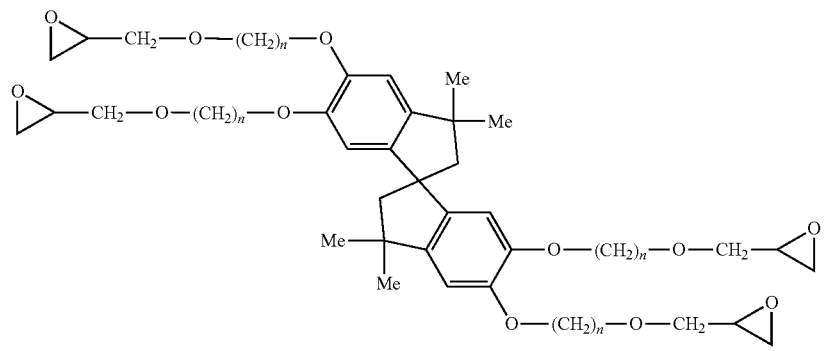
(1-1-6)
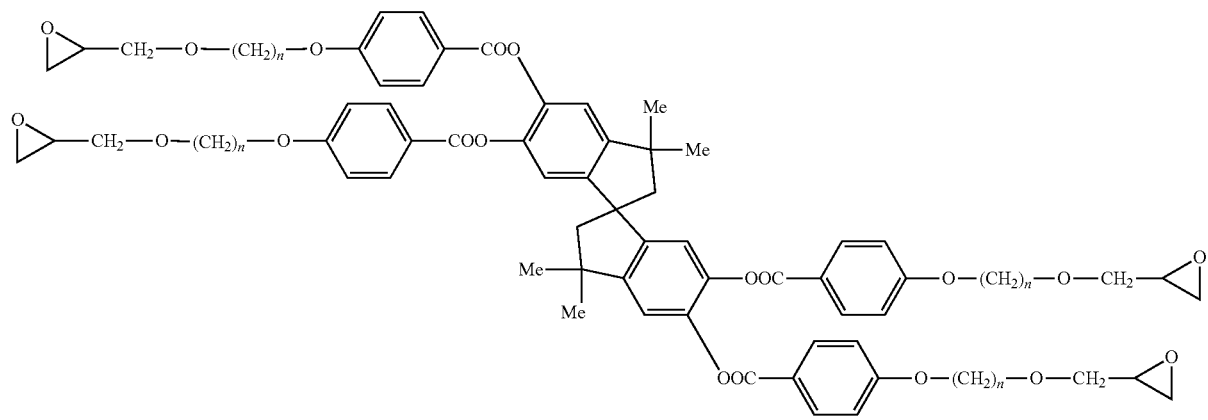
(1-1-7)

-continued
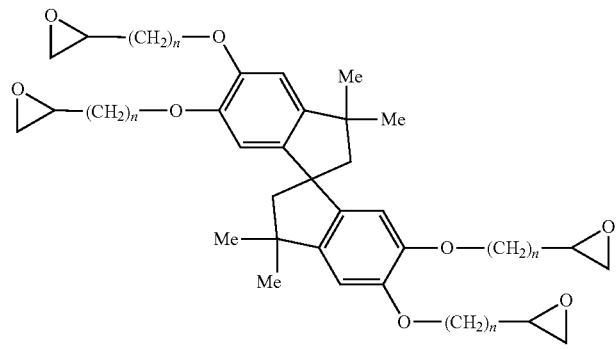
(1-1-8)
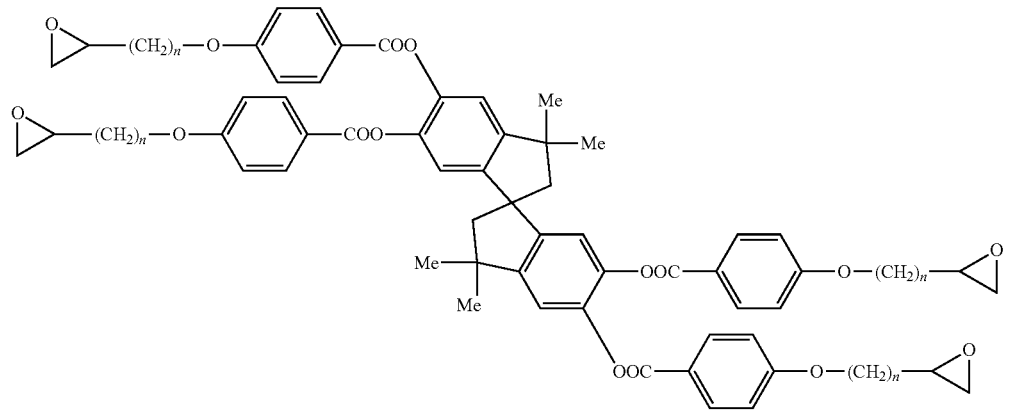
(1-1-9)
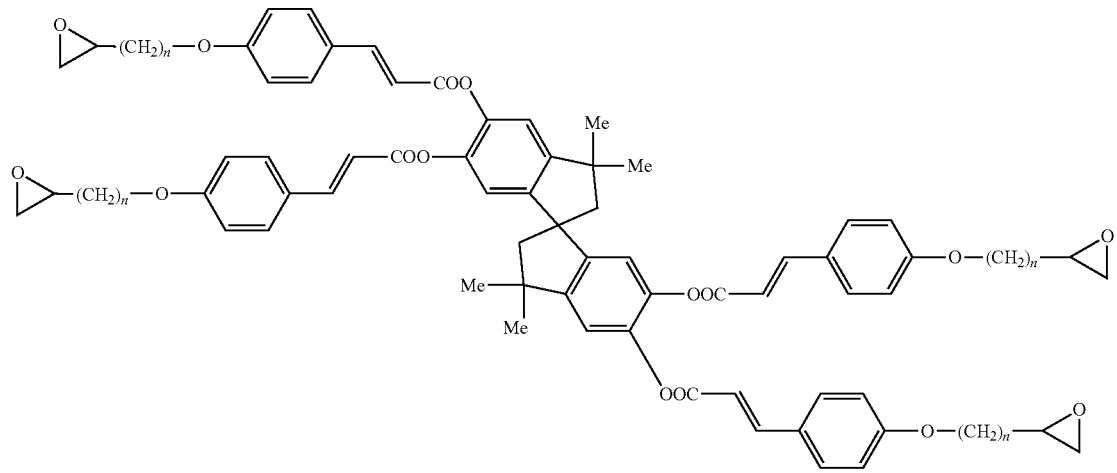
(1-1-10)
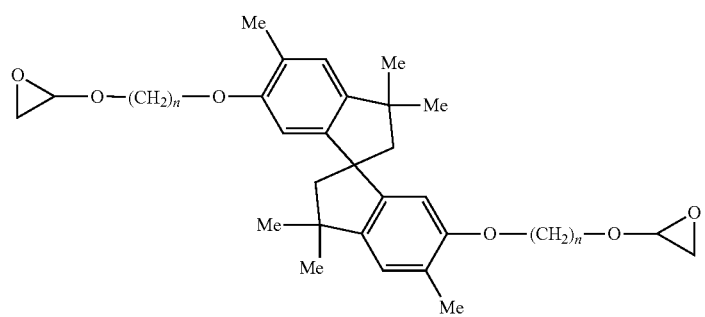
(1-2-5)

(1-2-6)
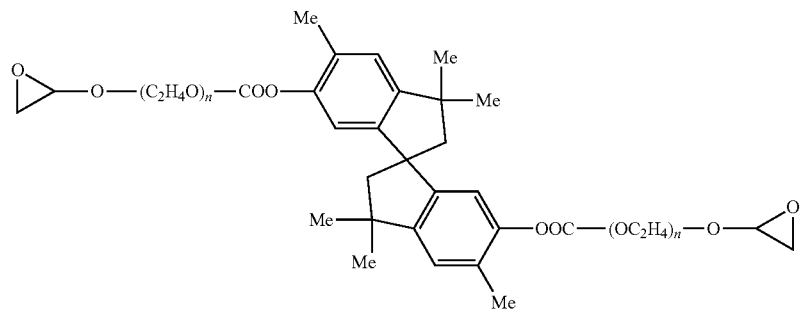
(1-2-7)
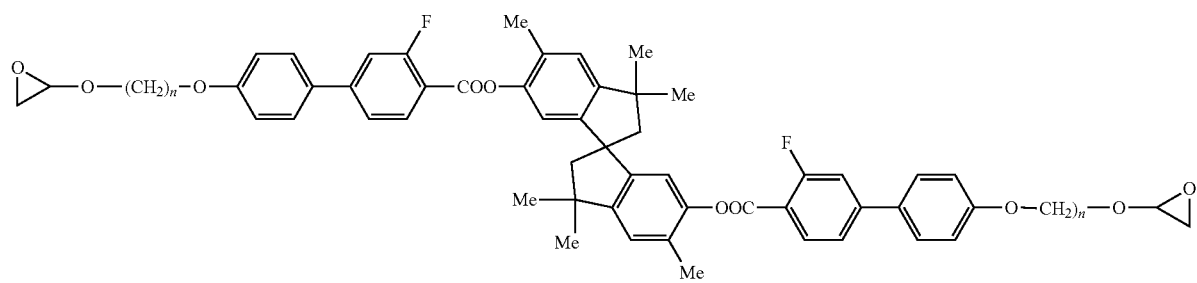
(1-2-8)
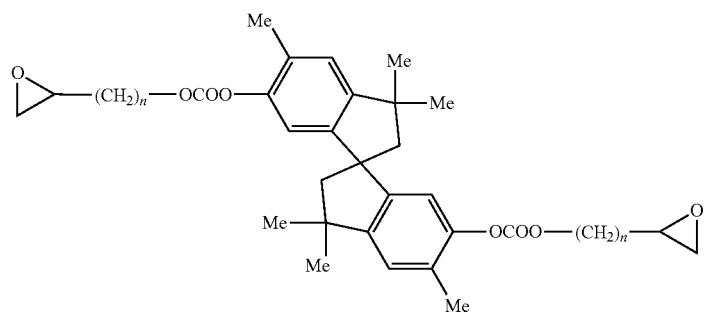
(1-2-9)
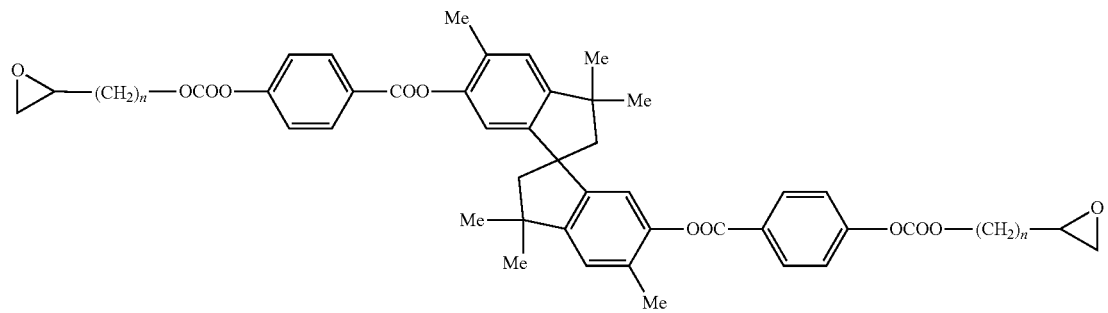
(1-3-6)
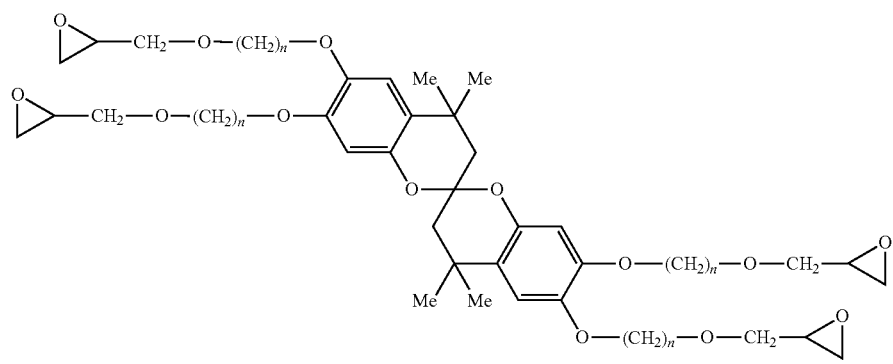

-continued
(1-3-7)
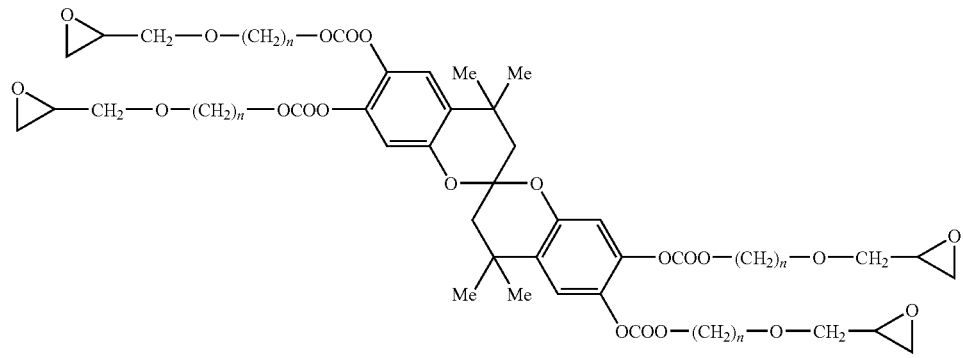
(1-3-8)
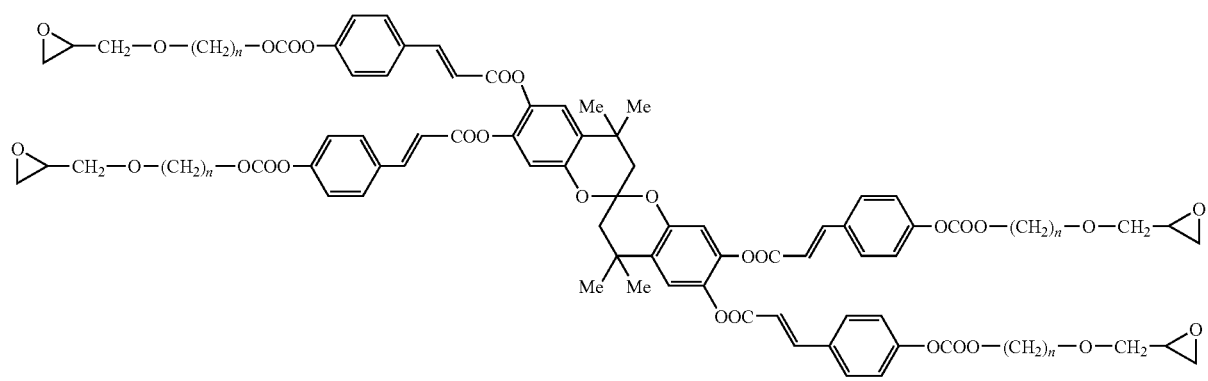
(1-3-9)
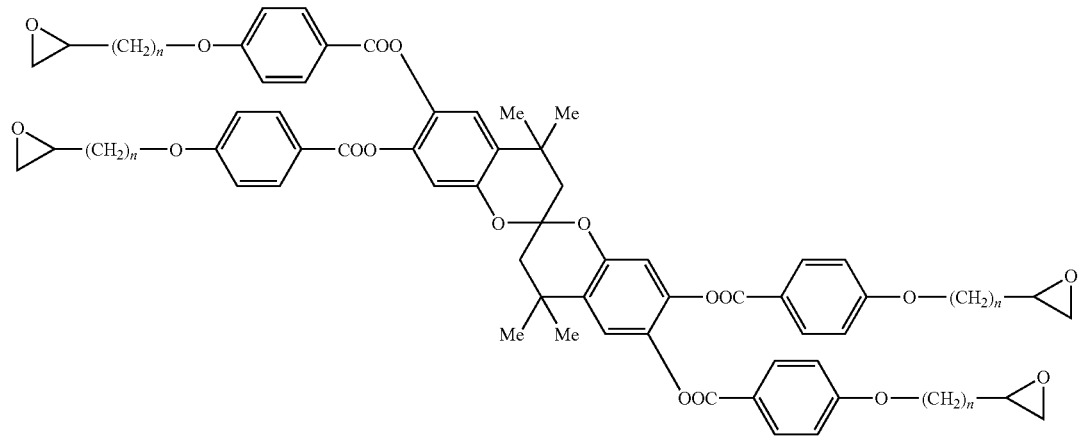
(1-3-10)
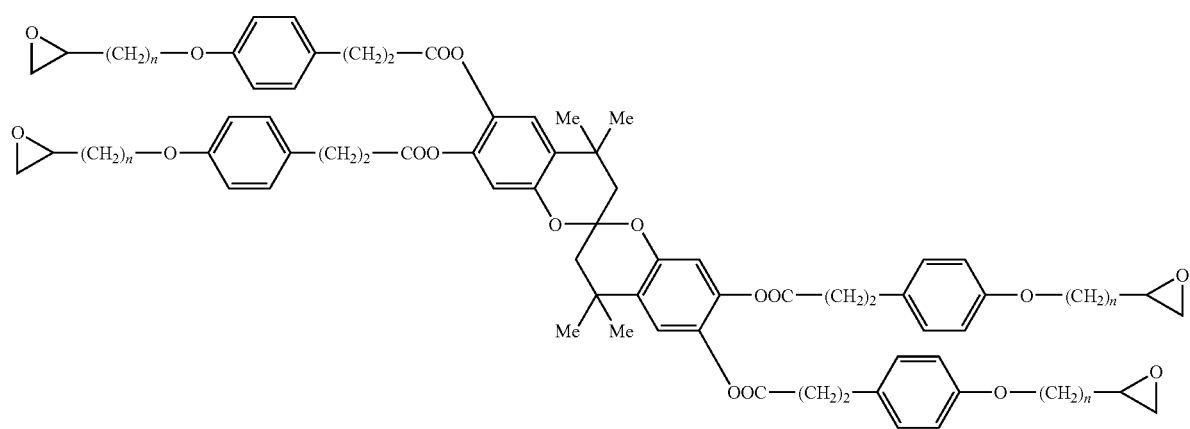

-continued
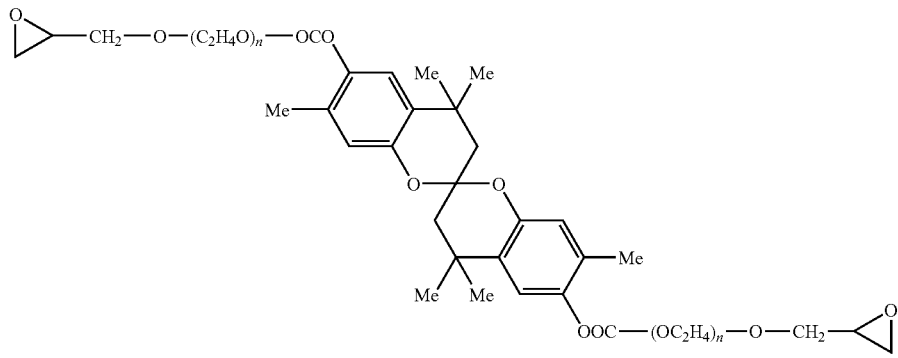
(1-4-5)
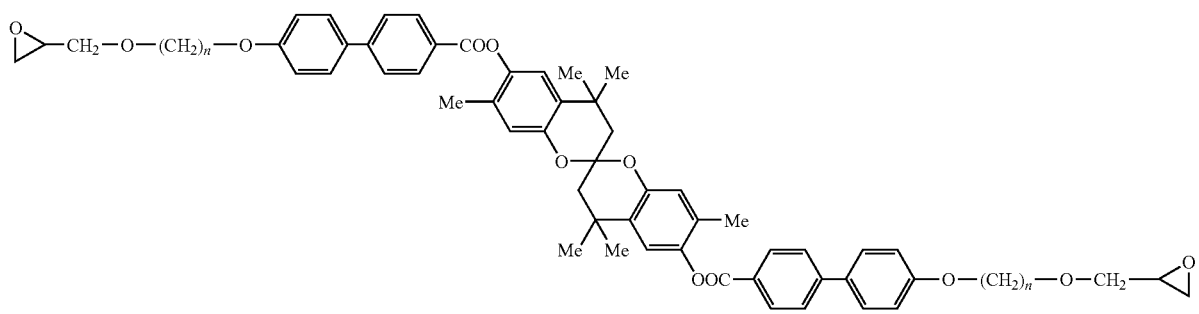
(1-4-6)
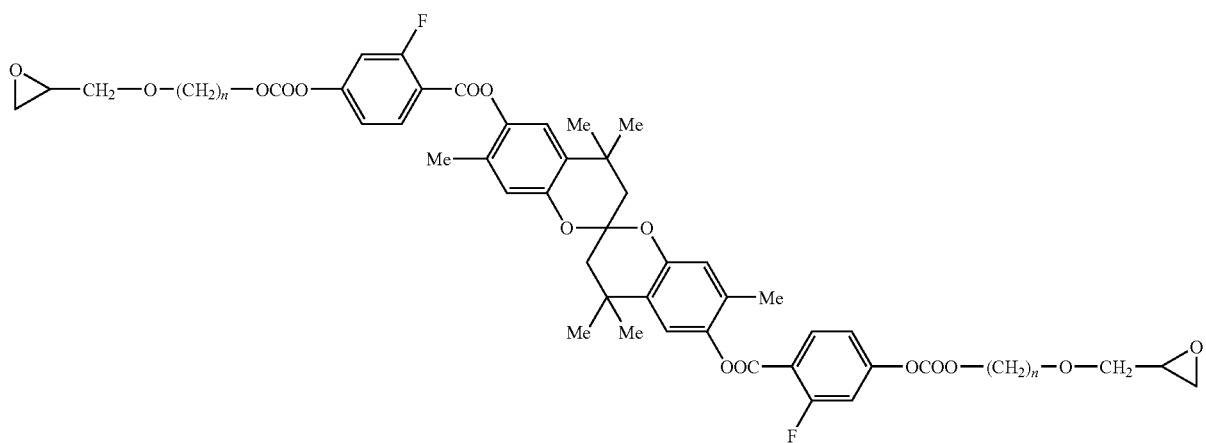
(1-4-7)
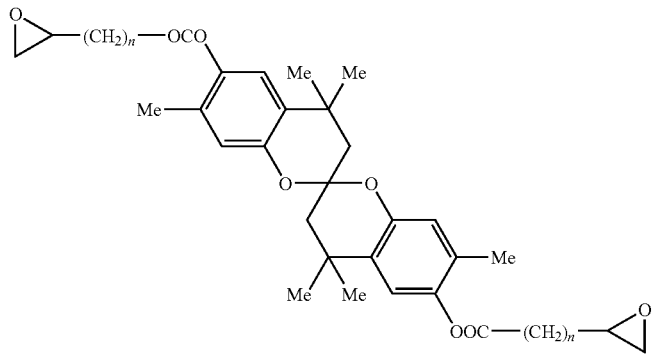
(1-4-8)

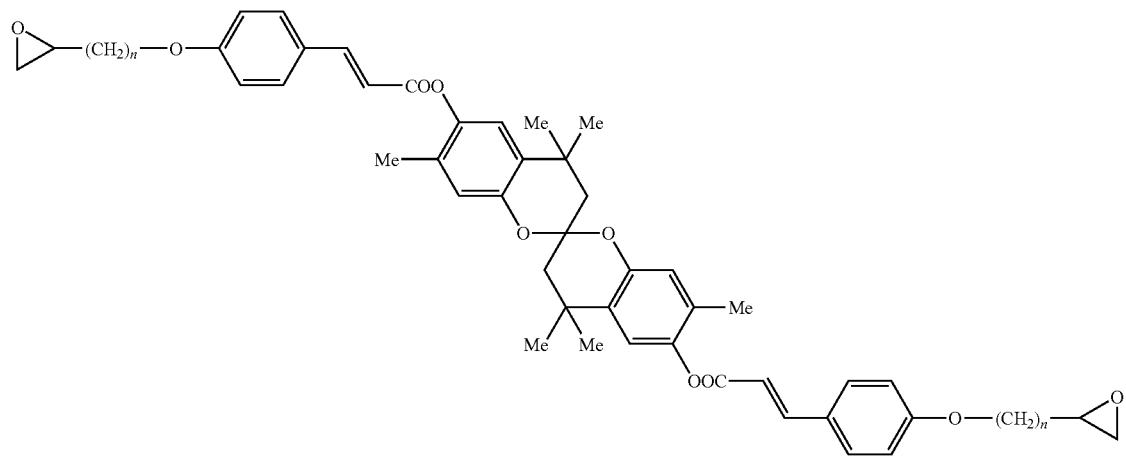
(1-4-9)
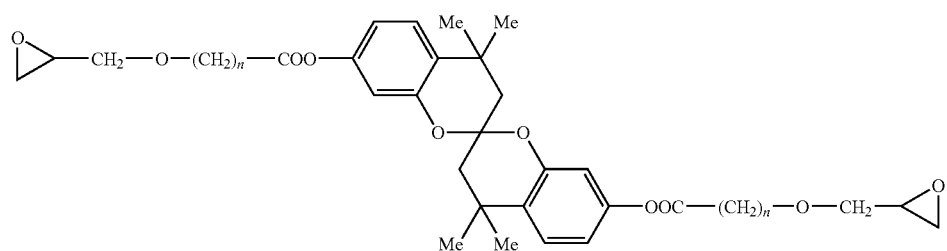
(1-5-4)
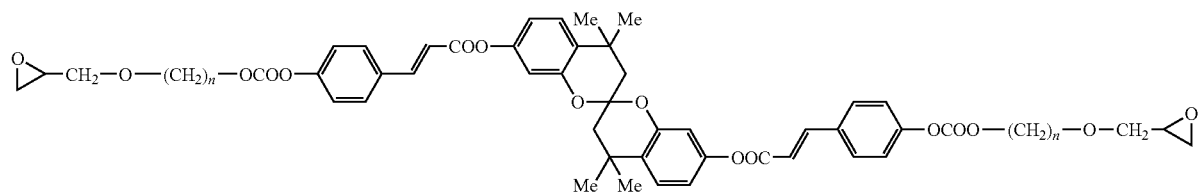
(1-5-5)
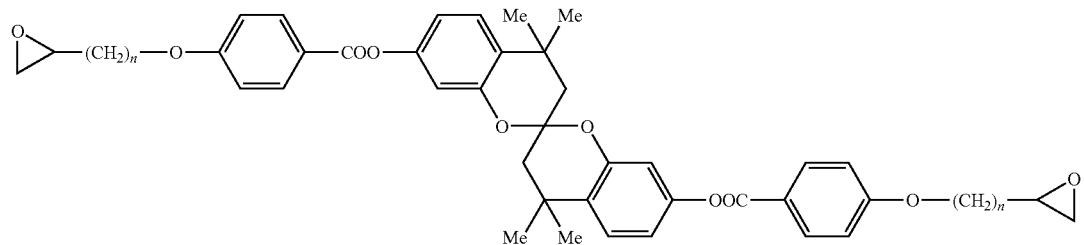
(1-5-6)
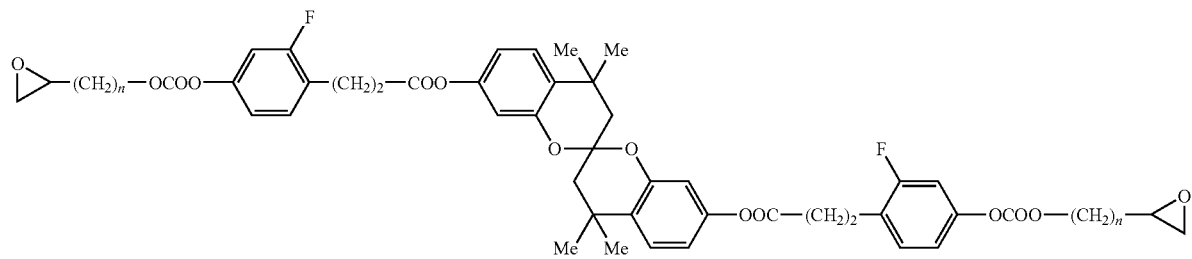
(1-5-7)

In Formula (1-1) to Formula (1-5), specific examples in the case where P is a group represented by Formula (P5) and W is methyl or ethyl in Formula (P5) are as follows. In the following specific examples, n is an integer of 2 to 12.
(1-1-11)
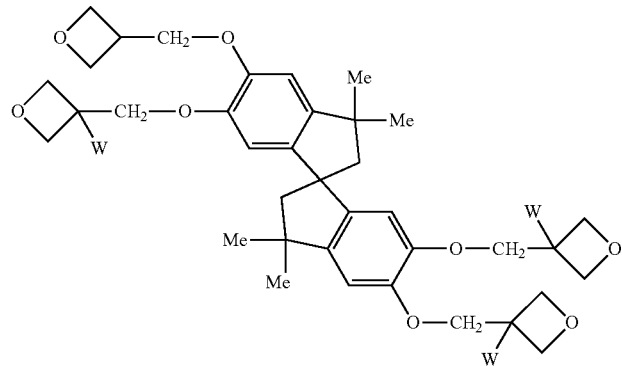
(1-1-12)
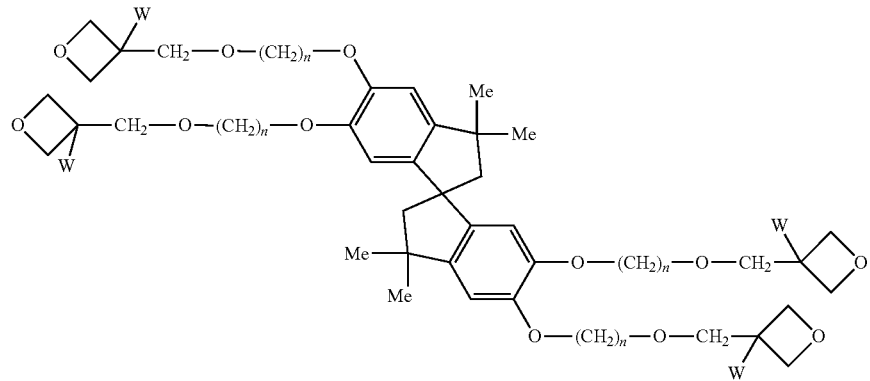
(1-1-13)
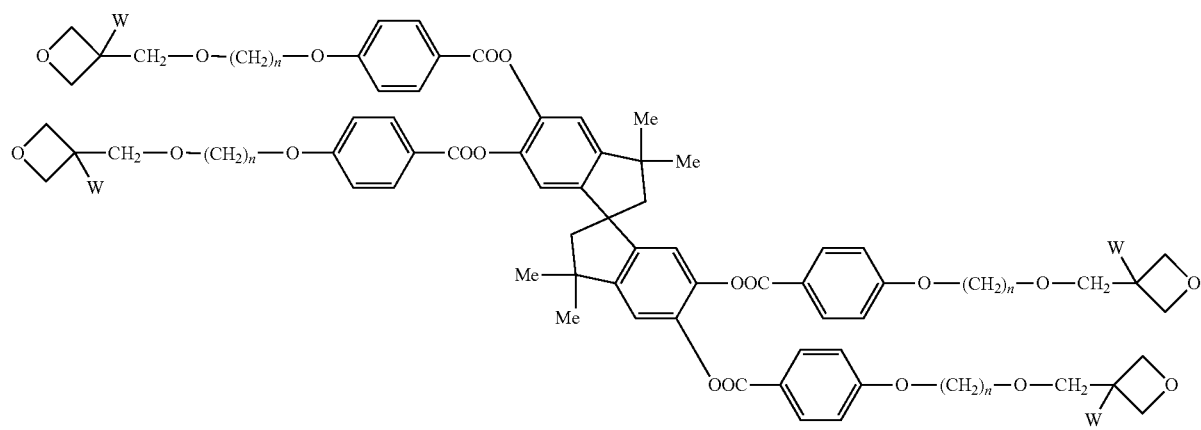

(1-1-14)
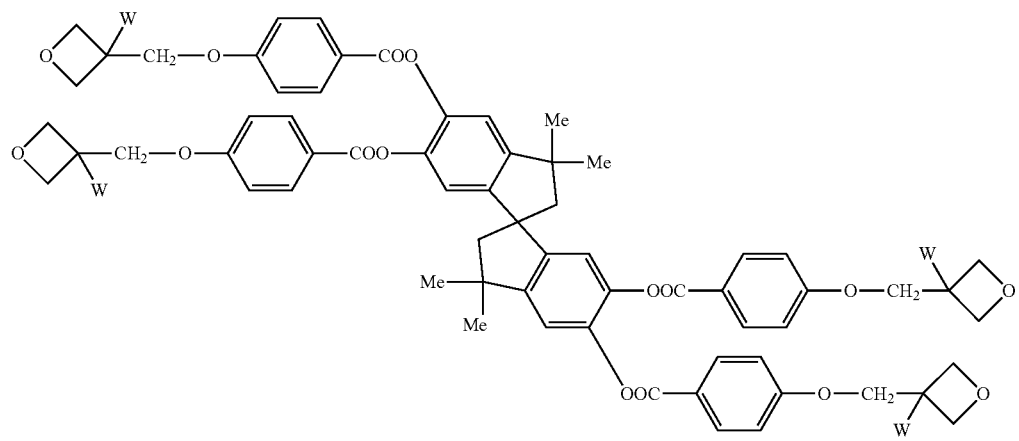
(1-1-15)
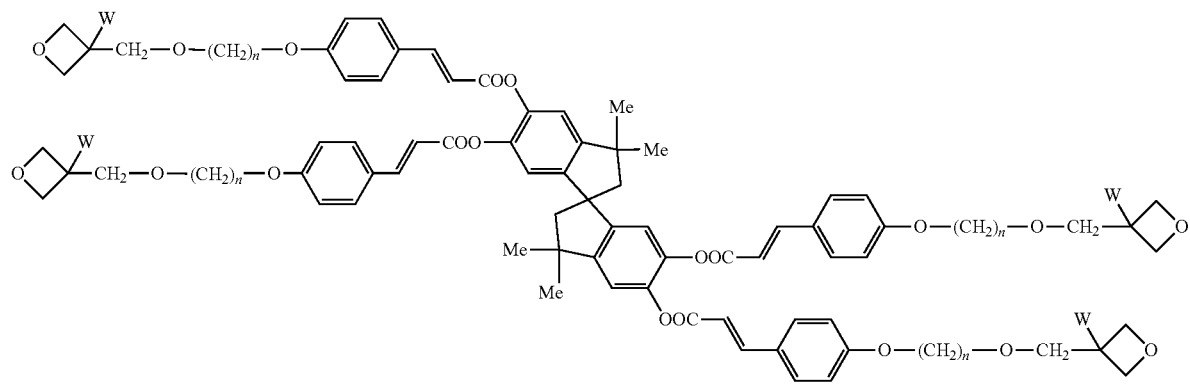
(1-2-10)
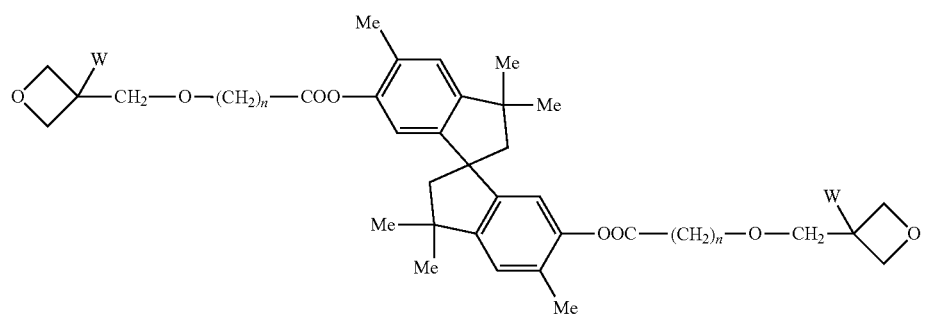
(1-2-11)
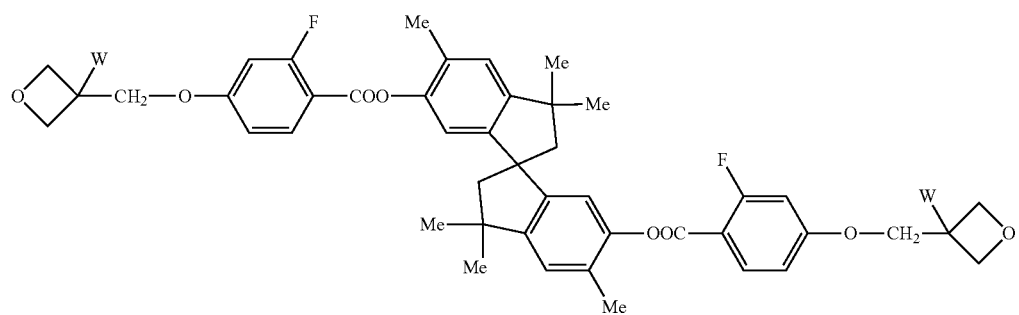

(1-2-12)
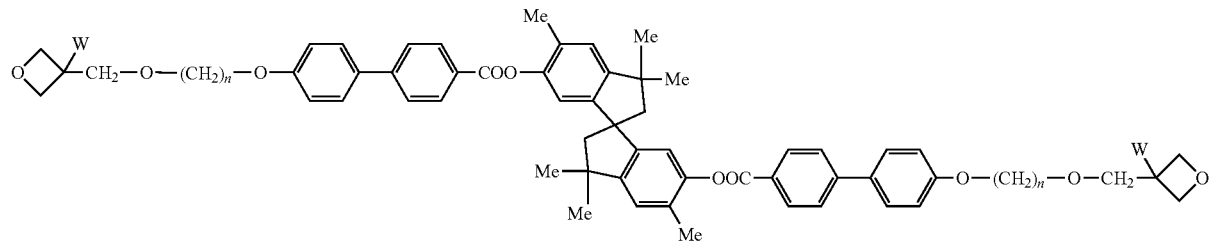
(1-2-13)
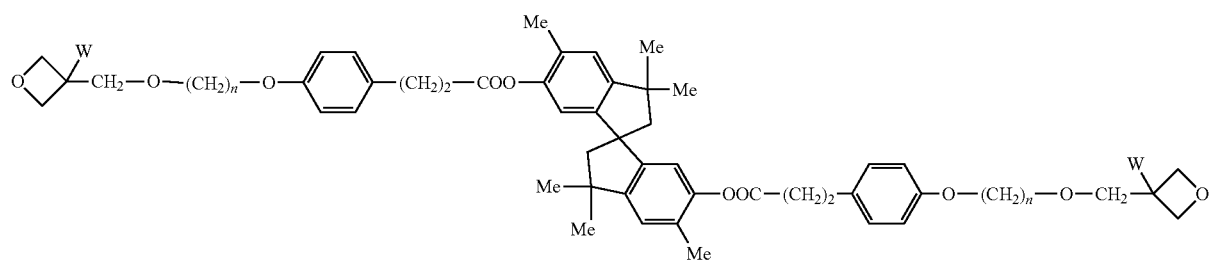
(1-3-11)
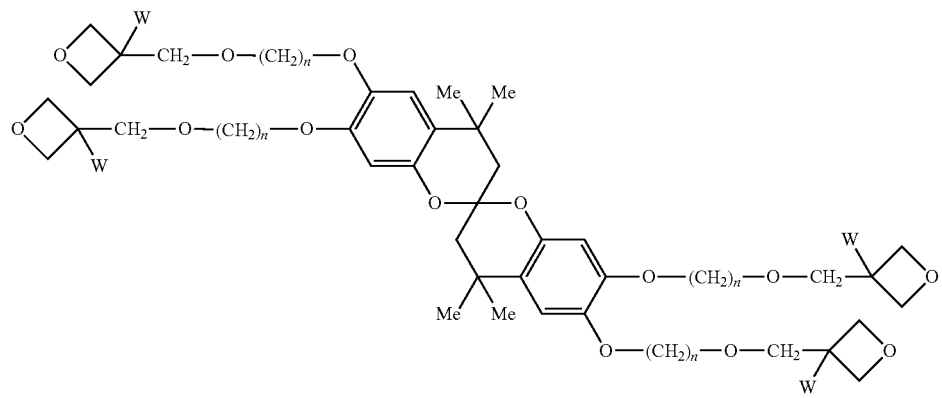
(1-3-12)
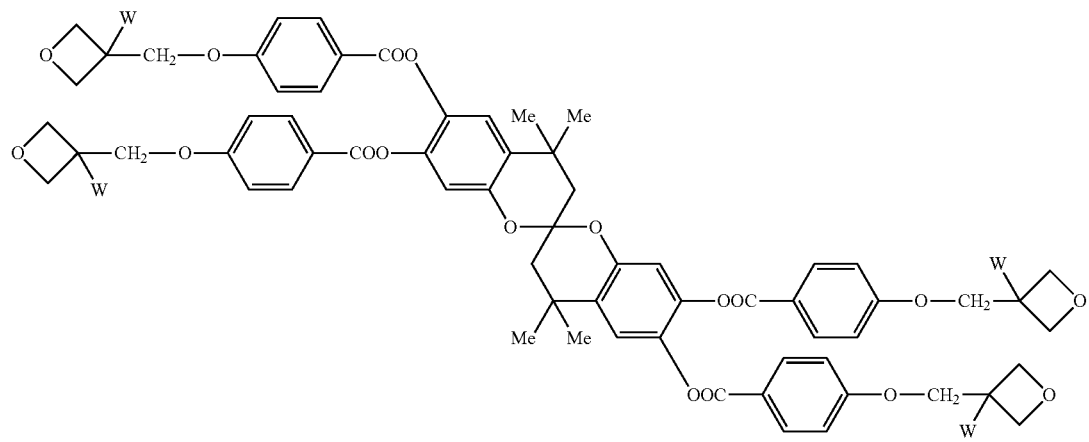

-continued
(1-3-13)
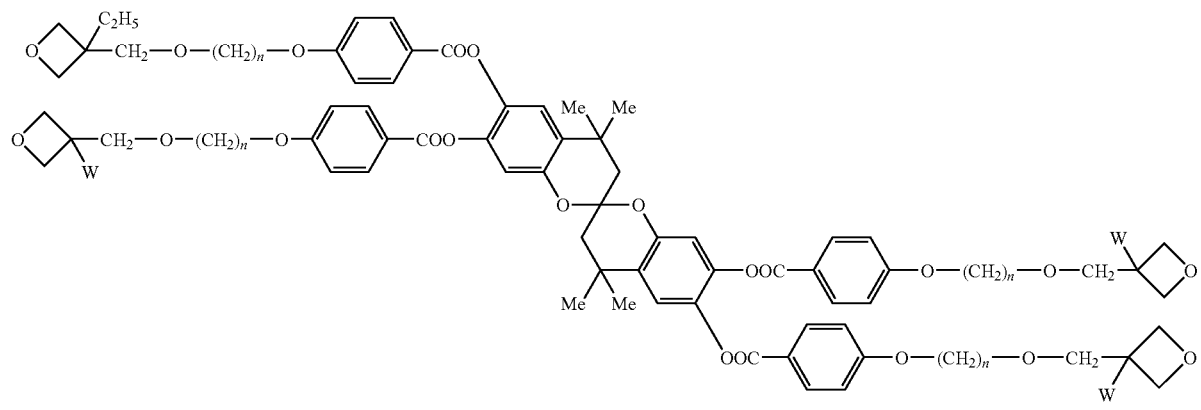
(1-3-14)
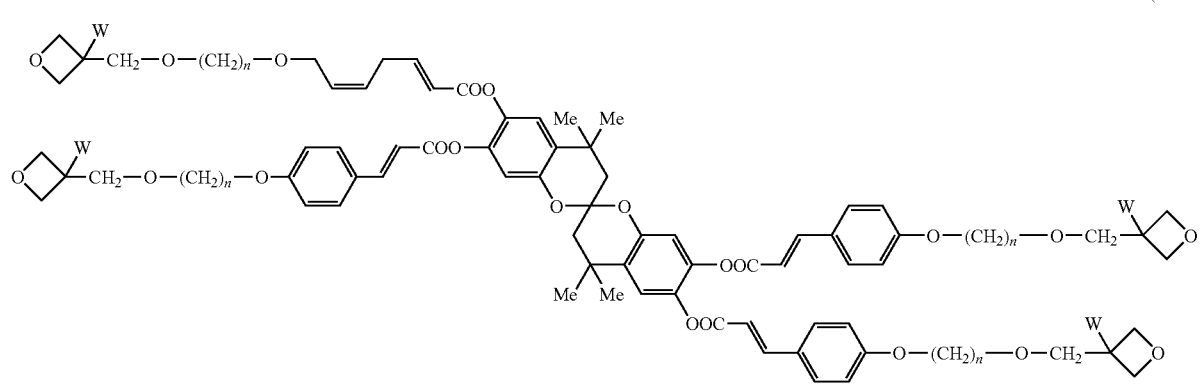
(1-4-10)
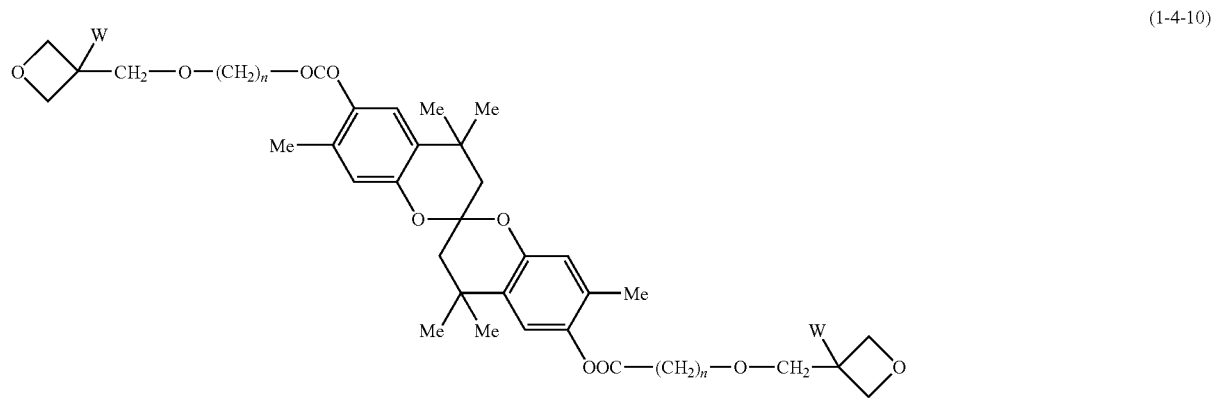
(1-4-11)
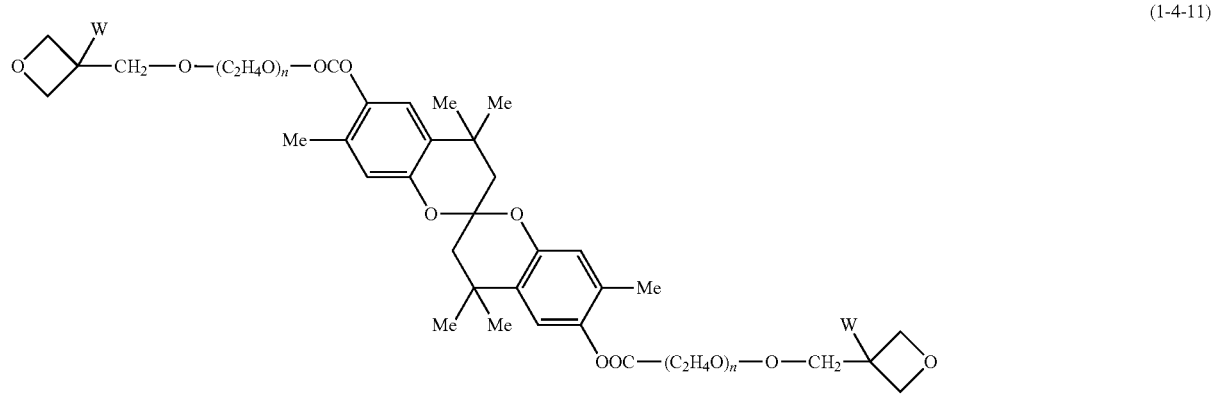

-continued
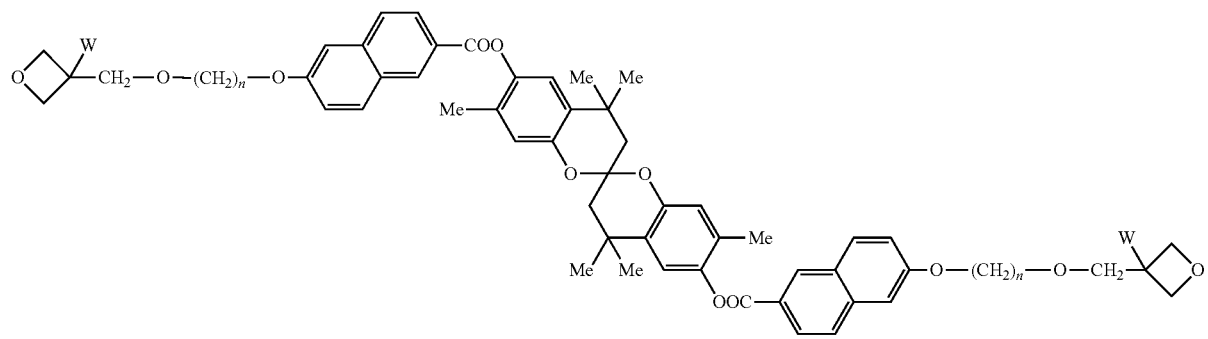
(1-4-12)
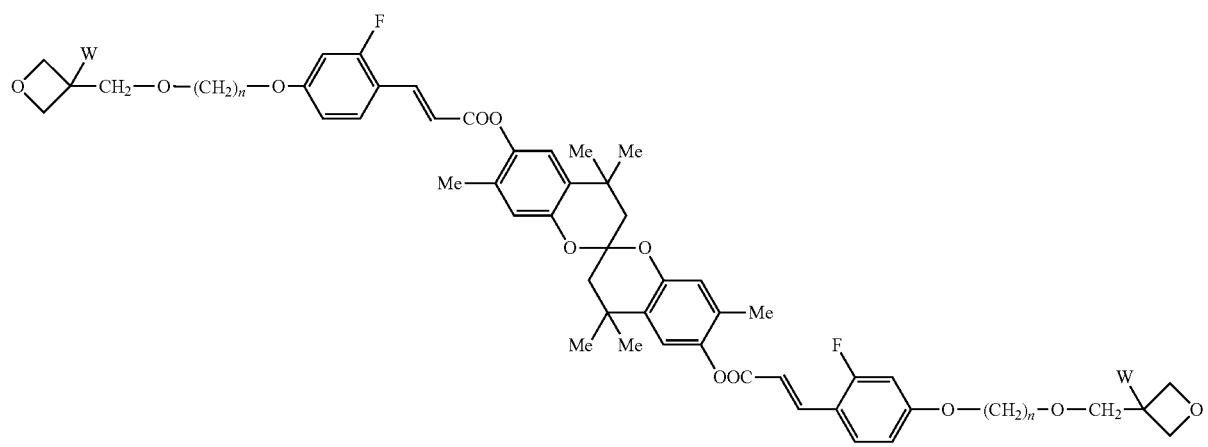
(1-4-13)
(1-4-13)
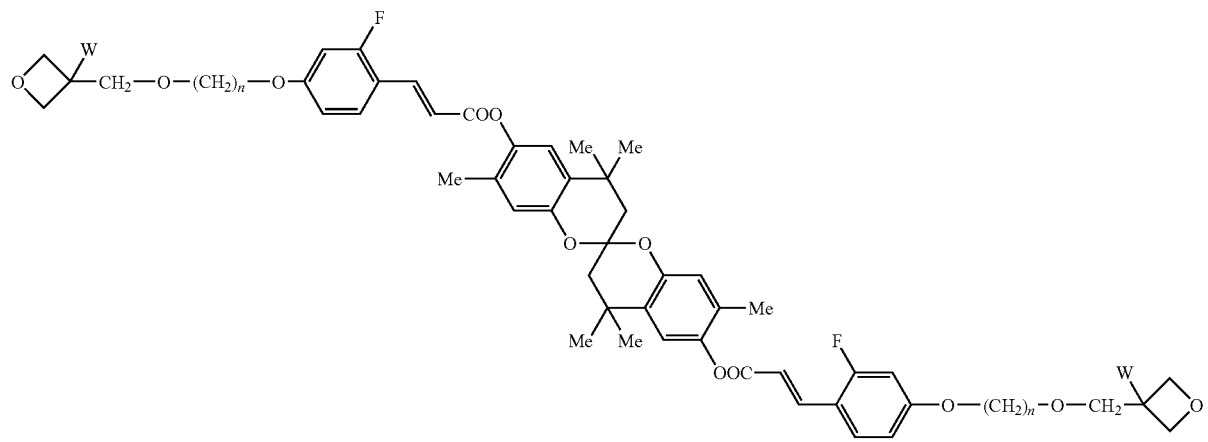
(1-5-8)
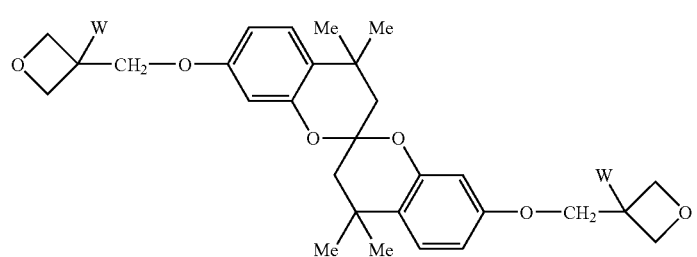

(1-5-9)

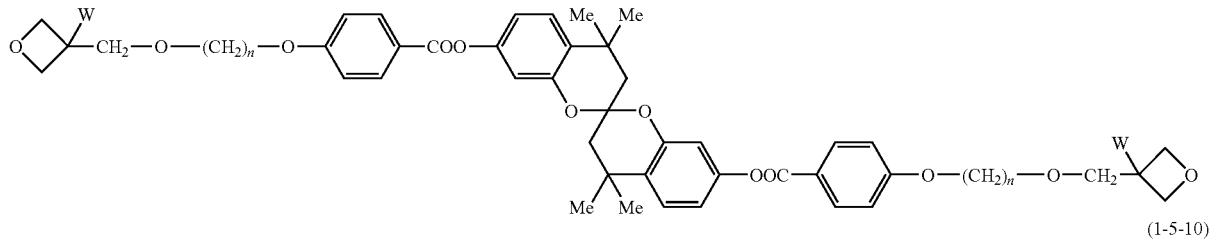

(1-5-10)

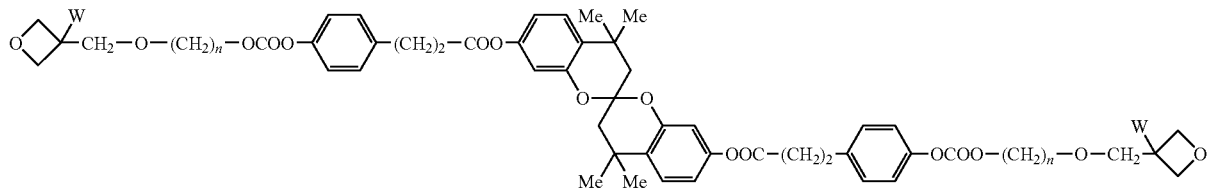

The composition of the invention is a liquid crystal composition comprising at least one of the compounds (1) and being composed of at least two compounds. All of the components are preferably polymerizable compounds. That is, a desirable composition is a polymerizable liquid crystal composition comprising at least one of the compounds (1) and at least one of compounds selected from the group of polymerizable liquid crystal compounds with mono-functionality and polymerizable liquid crystal compounds with poly-functionality. Desirable examples of the polymerizable liquid crystal compounds with mono-functionality and the polymerizable liquid crystal compounds with poly-functionality are the compound (M1), the compound (M2a), the compound (M2b), the compound (M2c), the compound (M2d), and the compound (M2e).

(M1)

$P^1-Y^1-(A^1-Z^1)_{s11}-A^1-R^1$ (M2a)

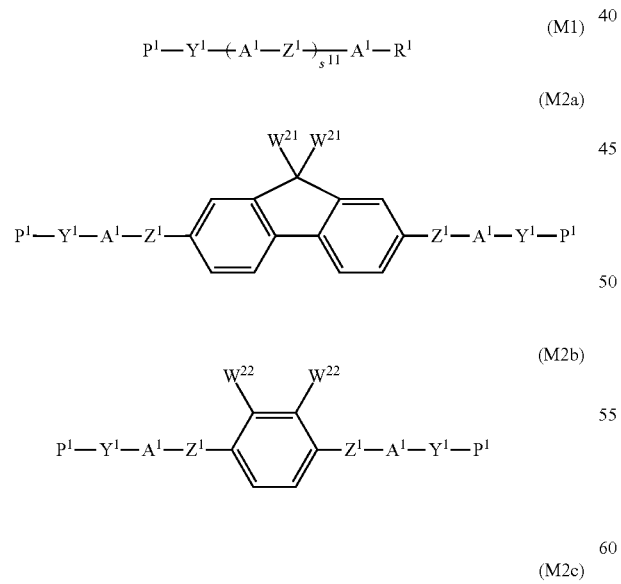

(M2d)

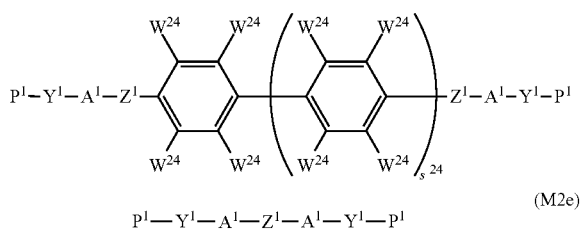

(M2e)

$P^1-Y^1-A^1-Z^1-A^1-Y^1-P^1$ (P9)

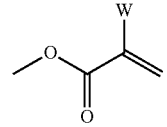

(P10)

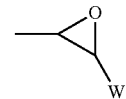

(P11)

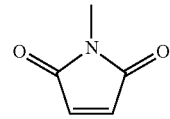

(P12)

The meanings of the symbols in Formula (M1) and Formula (M2a) to Formula (M2e) are as follows.

$P^1$ is independently a polymerizable group represented by one of Formula (P9) to Formula (P12), and in these groups, W is hydrogen, halogen, alkyl having 1 to 3 carbon atoms, or fluoroalkyl having 1 to 3 carbon atoms. Desirable examples of the halogen are fluorine and chlorine. $R^1$ is hydrogen, fluorine, chlorine, cyano, or alkyl having 1 to 20 carbon atoms, and in this alkyl having 1 to 20 carbon atoms, arbitrary —$CH_2$— may be replaced by —O—, —COO—, —OCO—, or —OCOO— and arbitrary hydrogen may be replaced by halogen. Desirable examples of $R^1$ are fluorine, cyano, alkyl having 2 to 12 carbon atoms, and alkoxy having 2 to 12 carbon atoms, and in these alkyl and alkoxy, arbitrary hydrogen may be replaced by fluorine.

$A^1$ is independently 1,4-cyclohexylene, 1,4-phenylene, 1,3-phenylene, pyridine-2,5-diyl, pyrimidine-2,5-diyl, or naphthalene-2,6-diyl, and in these rings, arbitrary hydrogen may be replaced by halogen. A desirable $A^1$ is independently 1,4-cyclohexylene, 1,4-phenylene, or 1,3-phenylene, and in these rings, arbitrary hydrogen may be replaced by fluorine.

$Y^1$ is independently a single bond or alkylene having 1 to 20 carbon atoms, and in this alkylene, arbitrary —$CH_2$— may be replaced by —O—, —COO—, —OCO—, or —OCOO—. A desirable $Y^1$ is alkylene having 2 to 12 carbon atoms, wherein in this alkylene, one or non-adjacent two —$CH_2$ may be replaced by —O—. More desirable $Y^1$ is independently alkylene having 2 to 12 carbon atoms, alkyleneoxy having 2 to 12 carbon atoms, or oxyalkylene having 2 to 12 carbon atoms.

$Z^1$ is independently a single bond, —COO—, —OCO—, —OCOO—, —$CH_2CH_2$—, —CH=CH—, —C≡C—, —$CH_2$O—, —O$CH_2$—, —$CF_2$O—, —OC$F_2$—, —$CH_2CH_2$COO—, —OCOC$H_2CH_2$—, —CH=CHCOO—, or —OCOCH=CH—. A desirable $Z^1$ is independently a single bond, —COO—, —OCO—, —$CH_2CH_2$COO—, —OCOC$H_2CH_2$—, —CH=CHCOO—, or —OCOCH=CH—.

$W^{21}$ is independently hydrogen, halogen, or alkyl having 1 to 3 carbon atoms. A desirable $W^{21}$ is independently hydrogen or methyl. $W^{22}$ is independently hydrogen, halogen, cyano, alkyl having 1 to 5 carbon atoms, or halogenated alkyl having 1 to 5 carbon atoms. A desirable $W^{22}$ is independently hydrogen, fluorine, methyl, cyano, isopropyl, tertiary-butyl, or trifluoromethyl. $W^{24}$ is independently hydrogen, halogen, alkyl having 1 to 5 carbon atoms, or halogenated alkyl having 1 to 5 carbon atoms. A desirable $W^{24}$ is independently hydrogen, fluorine, methyl, or methoxy.

$s^{11}$ is 1 or 2. When $s^{11}$ is 2, two of $A^1$ may be the same rings or may be different rings, and two of $Z^1$ may also be the same groups or may be different groups.

$s^{24}$ is 1 or 2. When $s^{24}$ is 2, substituents on two rings may be the same or may be different.

Desirable content ratios of polymerizable compounds selected from the group of the compound (M1) and the compound (M2a) to the compound (M2e) are in the range of 50% to 99% by weight, more preferably in the range of 70% to 95% by weight based on the total amount of this compound (or these compounds) and the compound (1).

Desirable examples of the expansion of Formula (M1) are as follows.

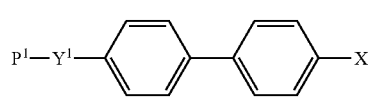
(M1-1)

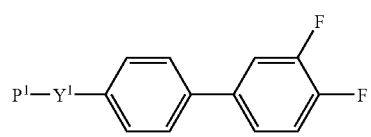
(M1-2)

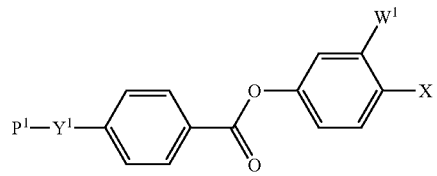
(M1-3)

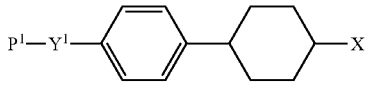
(M1-4)

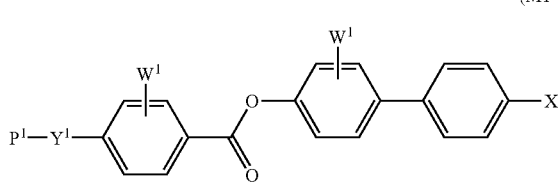
(M1-5)

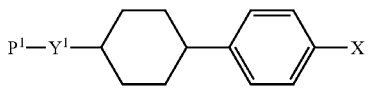
(M1-6)

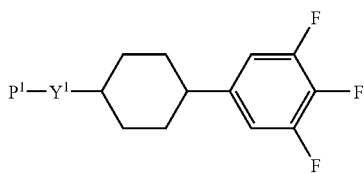
(M1-7)

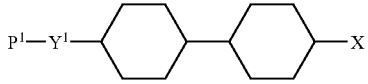
(M1-8)

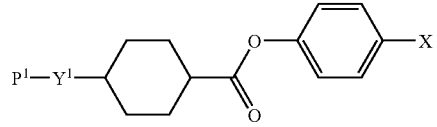
(M1-9)

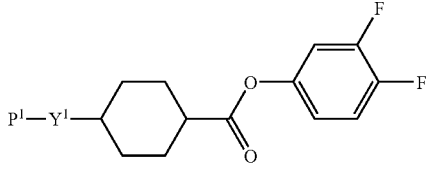
(M1-10)

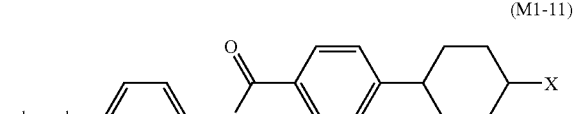
(M1-11)

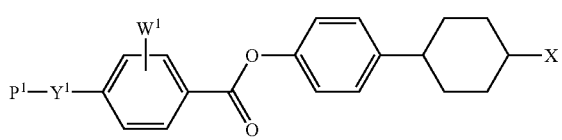
(M1-12)

(M1-13)
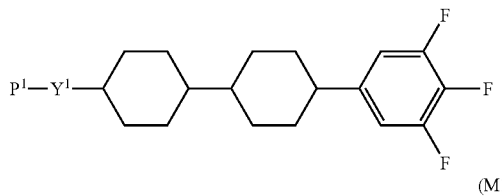

(M1-14)
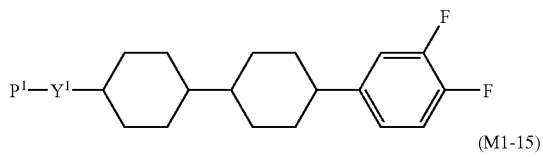

(M1-15)
(M1-16)
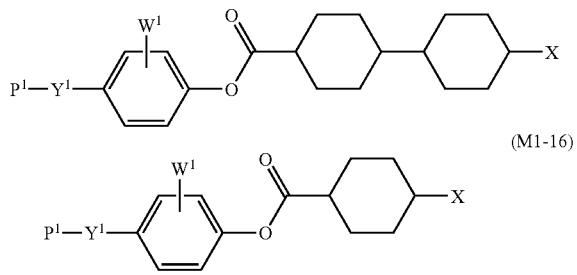

The meanings of the symbols in Formula (M1-1) to Formula (M1-16) are as follows.

X are fluorine, cyano, alkyl having 2 to 12 carbon atoms, and alkoxy having 2 to 12 carbon atoms, and in these alkyl and alkoxy, arbitrary hydrogen may be replaced by fluorine. $W^1$ is hydrogen or fluorine.

Desirable examples of $P^1$ are groups represented by Formula (P9), Formula (P10), and Formula (P11), wherein W is hydrogen in Formula (P9) and Formula (P10) and W is ethyl in Formula (P11).

$Y^1$ is alkylene having 2 to 12 carbon atoms or alkyleneoxy having 2 to 12 carbon atoms. Incidentally, more desirable examples of $P^1$ in Formula (M1-3) are groups represented by Formula (P9) and Formula (P11) described above. When $P^1$ is a group represented by Formula (P11), $Y^1$ in Formula (M1-3) is alkylene having 2 to 12 carbon atoms, and in this alkylene, one or two non-adjacent —$CH_2$— may be replaced by —O—.

In the compound (M1-1) to the compound (M1-16), specific examples in the case where $P^1$ is a group represented by Formula (P9) are as follows. In the following specific examples, n is independently an integer of 2 to 12.

(M1-1-1)
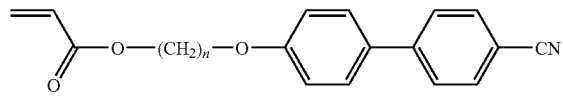

(M1-1-2)
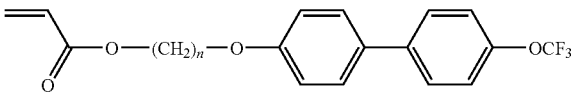

(M1-1-3)
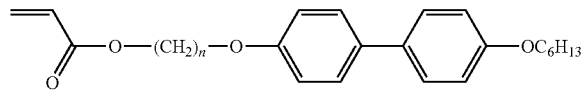

(M1-2-1)
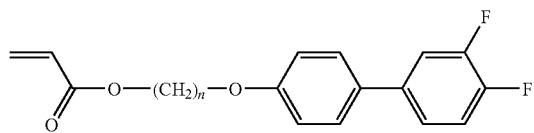

(M1-3-1)
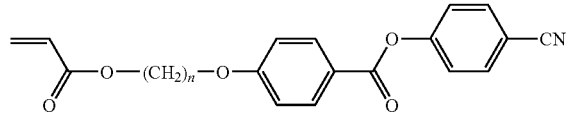

(M1-3-2)
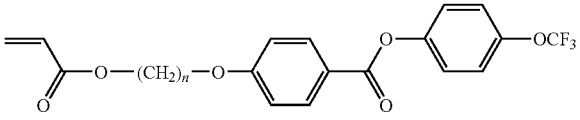

(M1-3-3)
(M1-4-1)
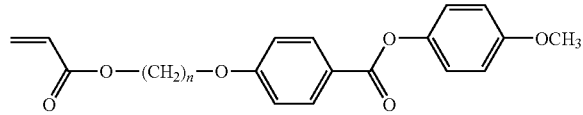

(M1-5-1)
(M1-5-2)
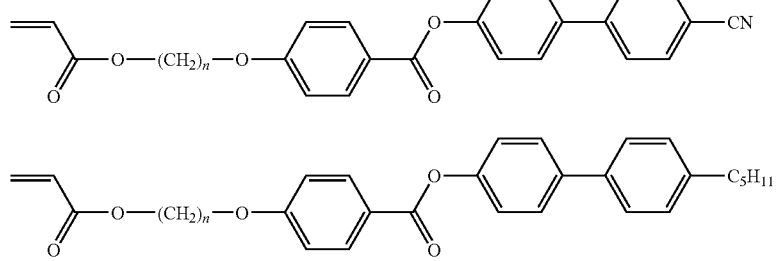

-continued (M1-5-3), (M1-5-4), (M1-6-1), (M1-7-1), (M1-8-1), (M1-9-1), (M1-10-1), (M1-11-1), (M1-12-1), (M1-13-1), (M1-14-1), (M1-15-1), (M1-15-2), (M1-15-3), (M1-15-4), (M1-16-1)

In the compound (M1-3), specific examples in the case where P¹ is a group represented by Formula (P11) and W is ethyl in Formula (P11) are as follows. In the following specific examples, n is independently an integer of 2 to 9.
(M1-3-4)
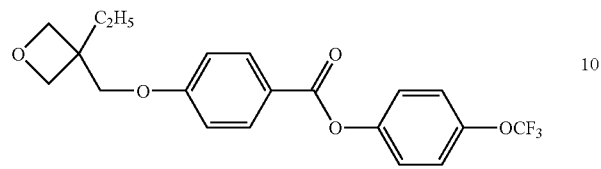
(M1-3-5)
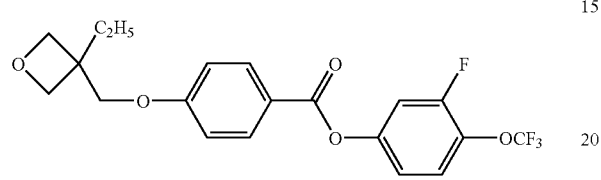
(M1-3-6)
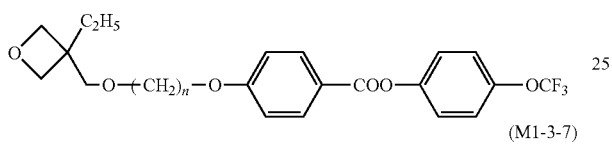
(M1-3-7)
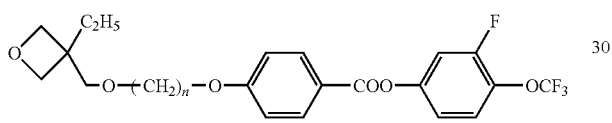
Desirable examples of the expansion of Formula (M2a) are as follows.
(M2a-1)
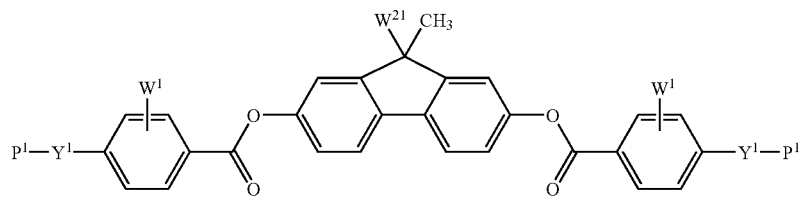
(M2a-2)
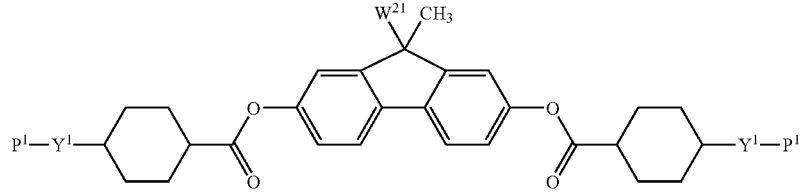
(M2a-3)
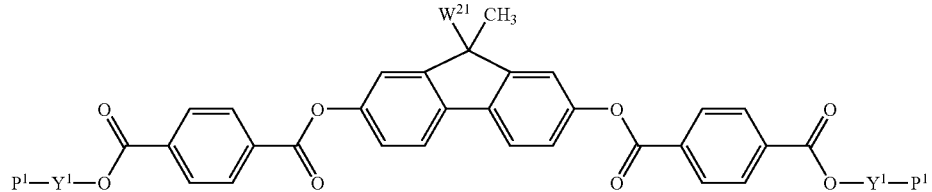

In Formula (M2a-1) to Formula (M2a-3) described above, $Y^1$ is independently alkylene having 2 to 12 carbon atoms, and in this alkylene, one or two non-adjacent —$CH_2$— may be replaced by —O— or —OCOO—, $W^1$ is hydrogen or fluorine, and $W^{21}$ is hydrogen or methyl.

Desirable examples $P^1$ are groups represented by Formula (P9), Formula (P10), and Formula (P11), wherein W is hydrogen in Formula (P9) and Formula (P10), and W is ethyl in Formula (P11).

Specific examples of the compound (M2a-1) to the compound (M2a-3) are as follows.

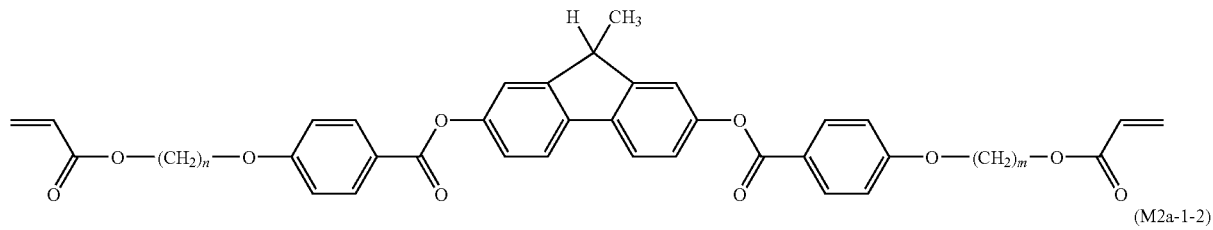

(M2a-1-1)

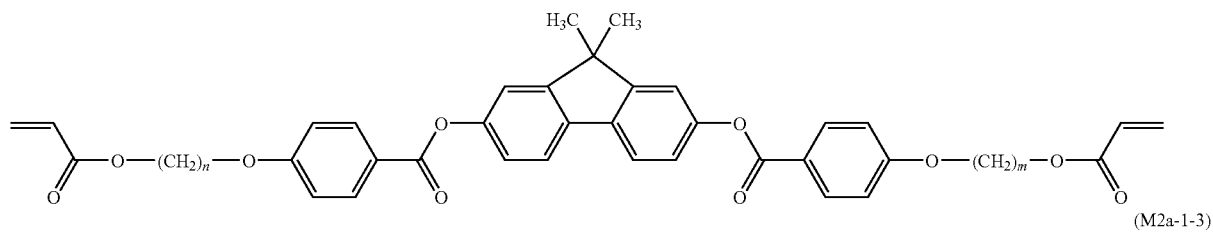

(M2a-1-2)

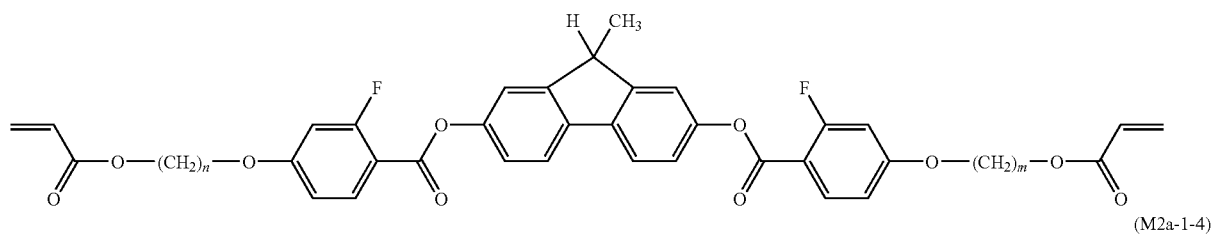

(M2a-1-3)

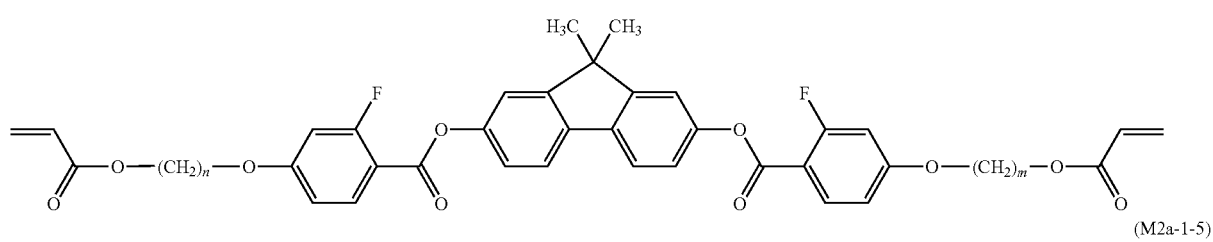

(M2a-1-4)

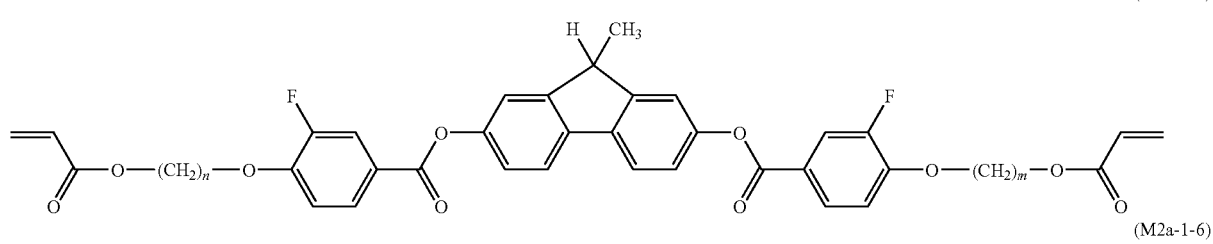

(M2a-1-5)

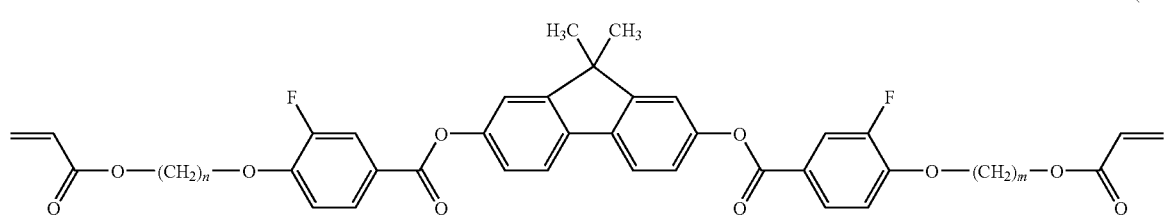

(M2a-1-6)

(M2a-1-7)
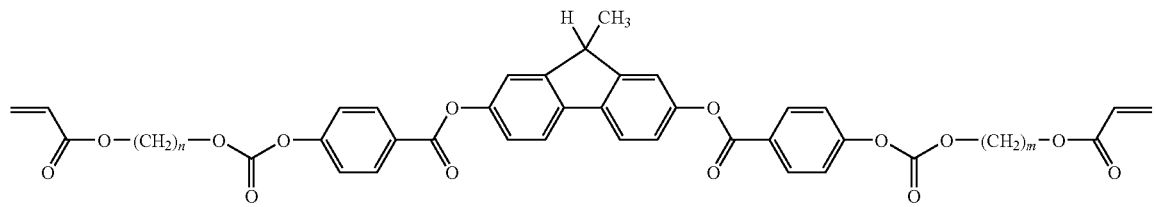
(M2a-1-8)
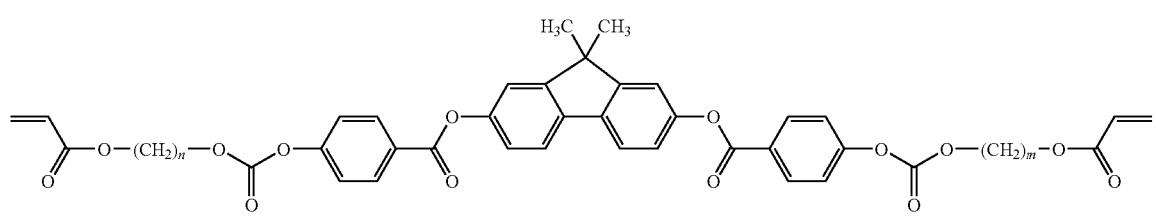
(In these formulas, n and m are each independently an integer of 2 to 11.)
(M2a-2-1)
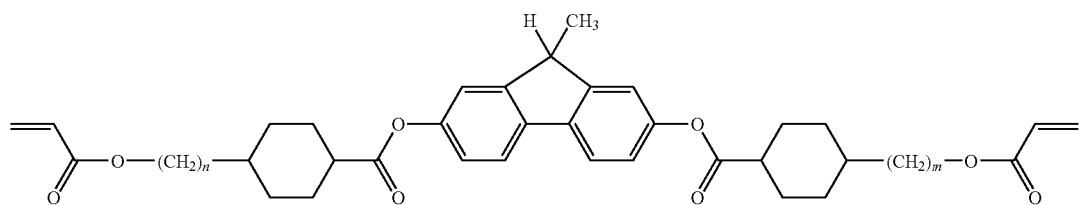
(M2a-2-2)
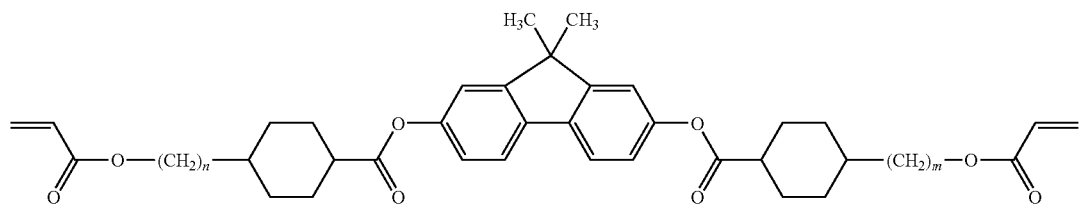
(M2a-3-1)
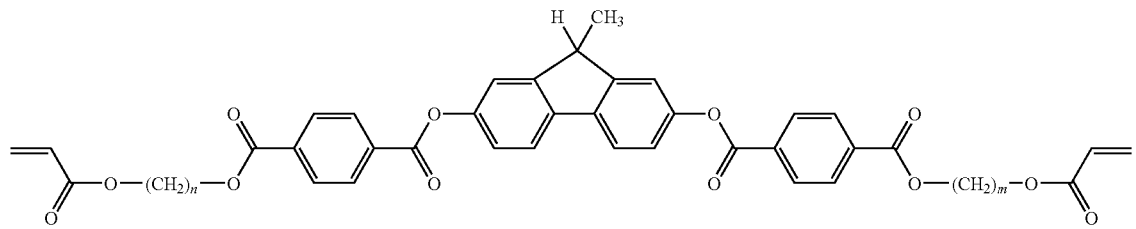
(M2a-3-2)
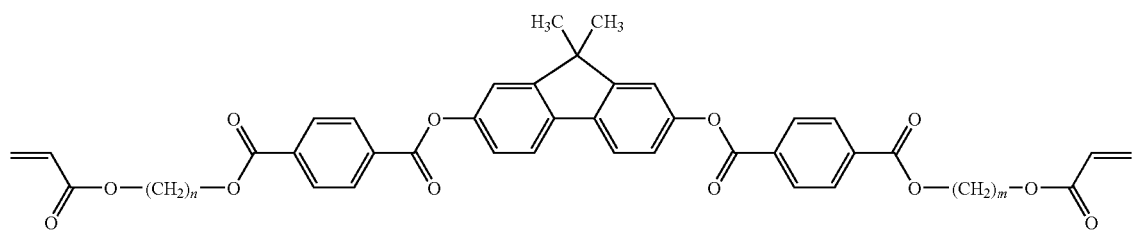

(In these formulas, n and m are each independently an integer of 2 to 12.)
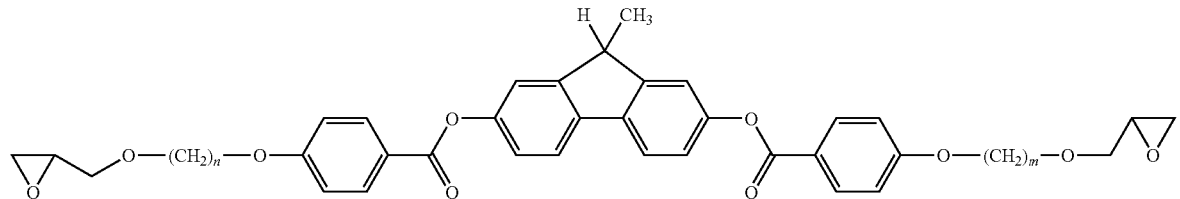
(M2a-1-9)
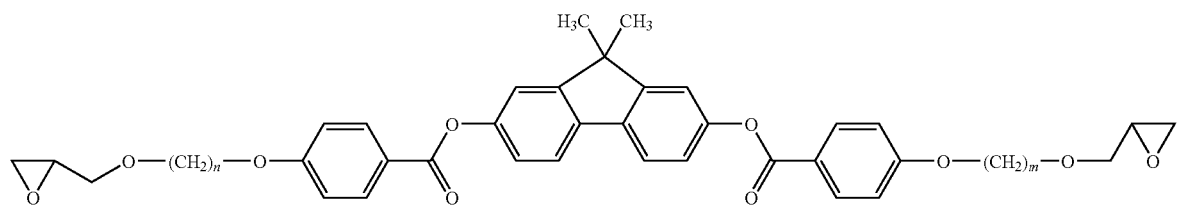
(M2a-1-10)
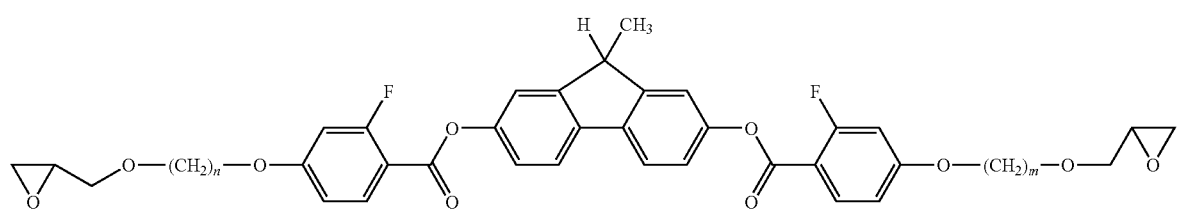
(M2a-1-11)
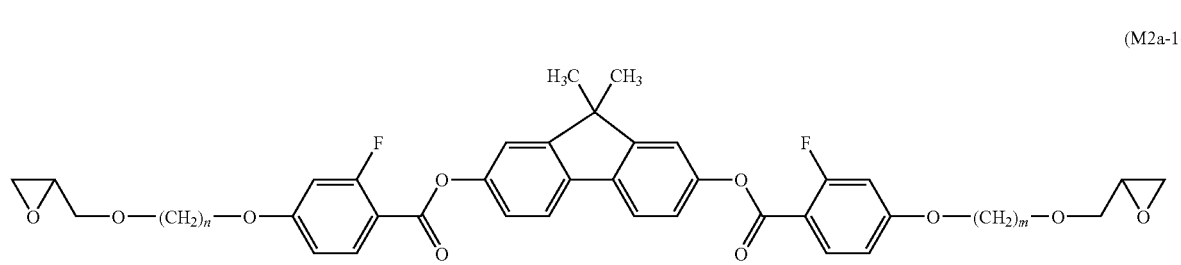
(M2a-1-12)
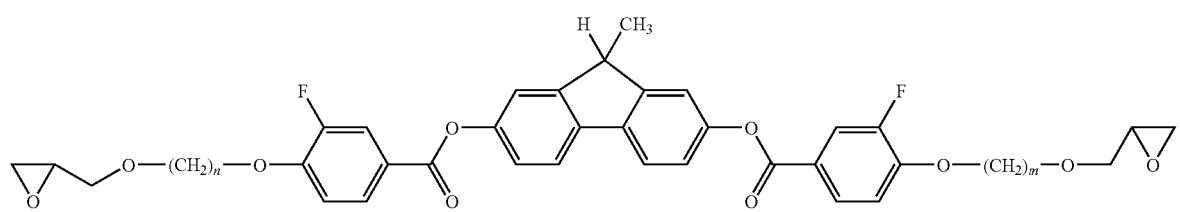
(M2a-1-13)
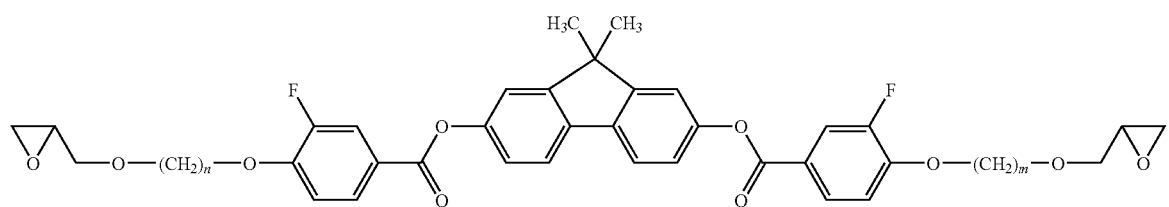
(M2a-1-14)

(In these formulas, n and m are each independently an integer of 2 to 9.)
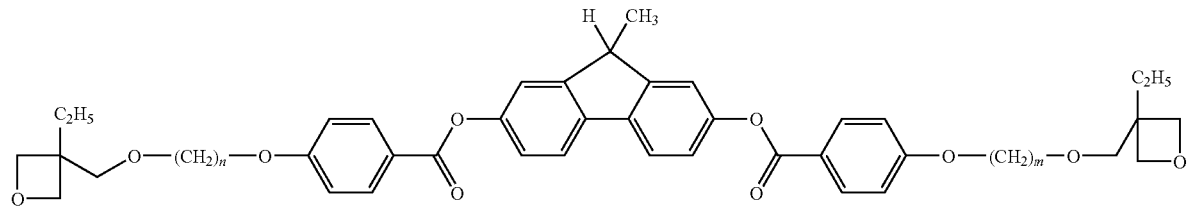
(M2a-1-15)
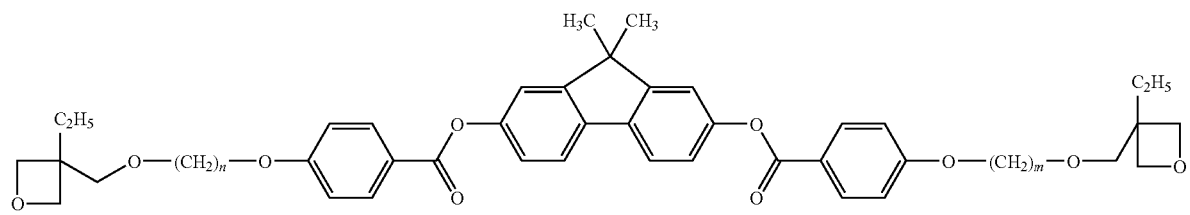
(M2a-1-16)
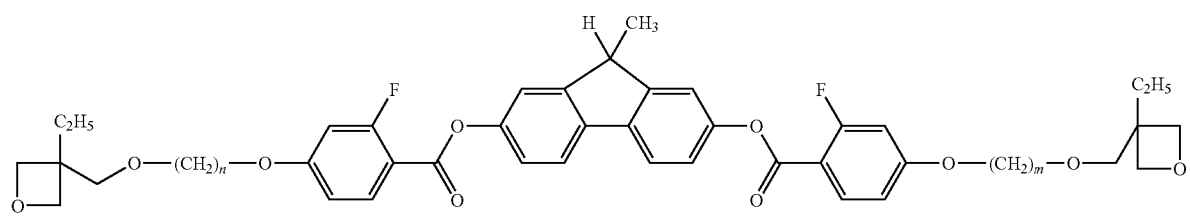
(M2a-1-17)
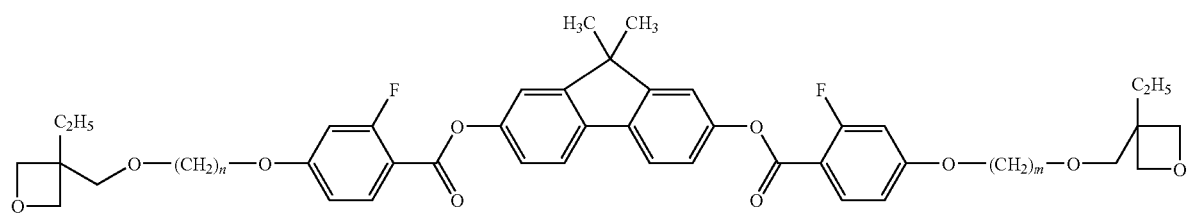
(M2a-1-18)
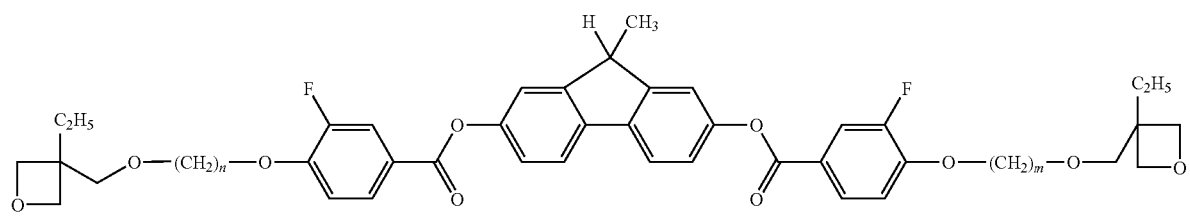
(M2a-1-19)
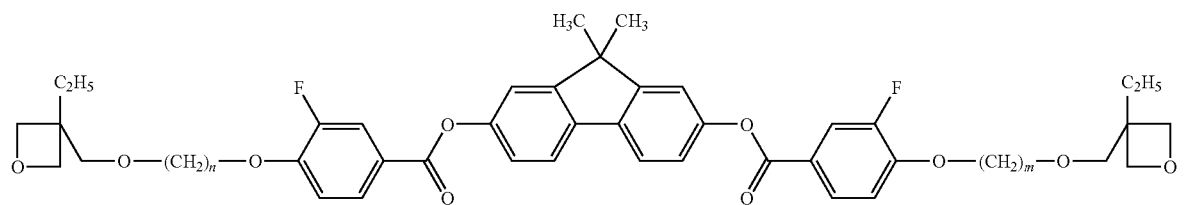
(M2a-1-20)
(In these formulas, n and m are independently an integer of 2 to 9.)

Desirable examples of the expansion of Formula (M2b) are as follows.
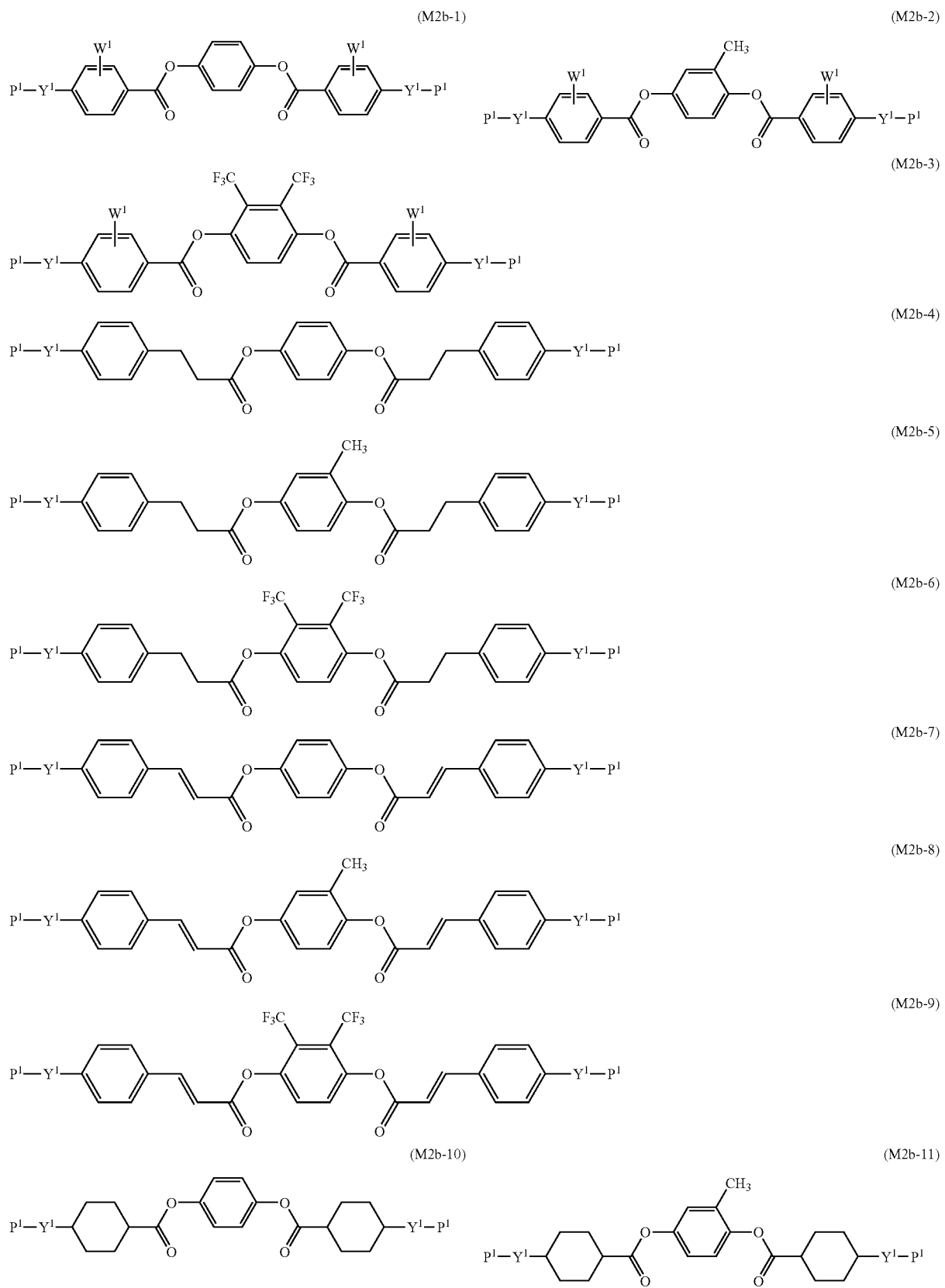

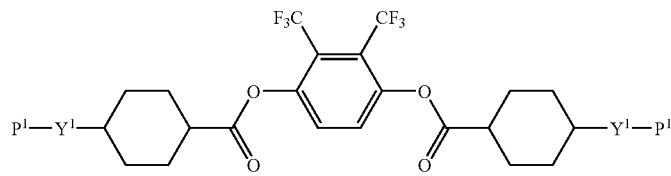
(M2b-12)

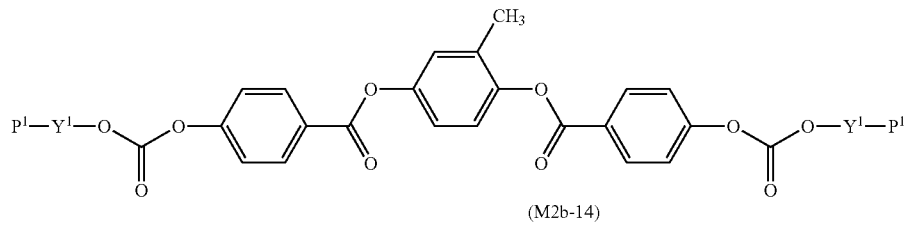
(M2b-13)

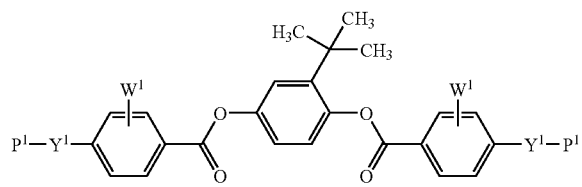
(M2b-14)

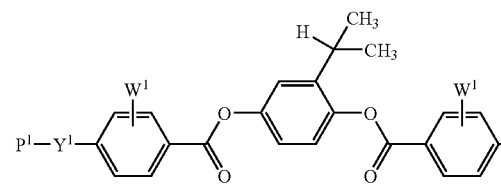
(M2b-15)

In Formula (M2b-1) to Formula (M2b-12), Formula (M2b-14), and Formula (M2b-15) described above, $Y^1$ is independently alkylene having 2 to 12 carbon atoms, alkyleneoxy having 2 to 12 carbon atoms, or oxyalkylene having 2 to 12 carbon atoms. In Formula (M2b-13), $Y^1$ is alkylene having 2 to 12 carbon atoms. $W^1$ is hydrogen or fluorine. Desirable examples of $P^1$ are groups represented by Formula (P9), Formula (P10), and Formula (P11), and W is hydrogen in Formula (P9), W is hydrogen in Formula (P10), and W is ethyl in Formula (P11).

Specific examples of the compound (M2b-1) to the compound (M2b-15) in the case where $P^1$ is a group represented by Formula (P9) are as follows. In the following specific examples, n and m are each independently an integer of 2 to 12.

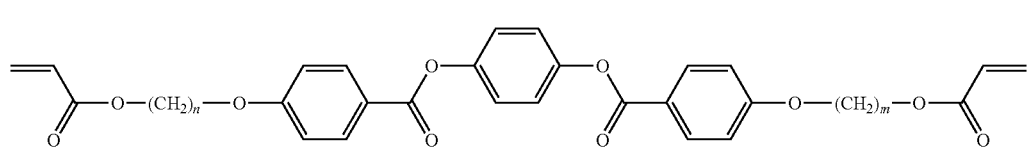
(M2b-1-1)

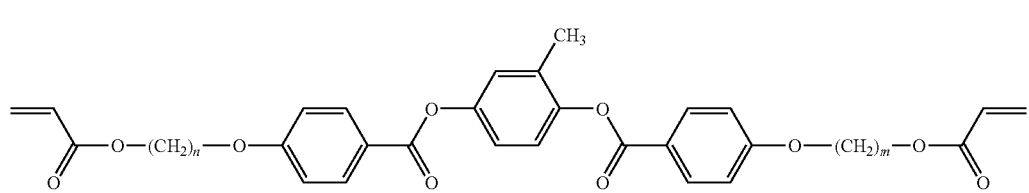
(M2b-2-1)

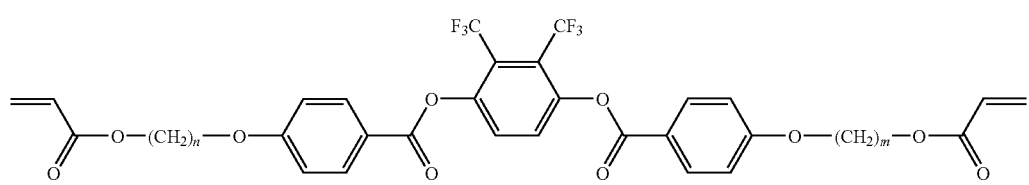
(M2b-3-1)

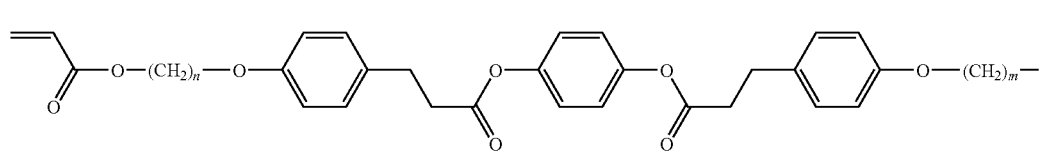
(M2b-4-1)

-continued
(M2b-5-1)
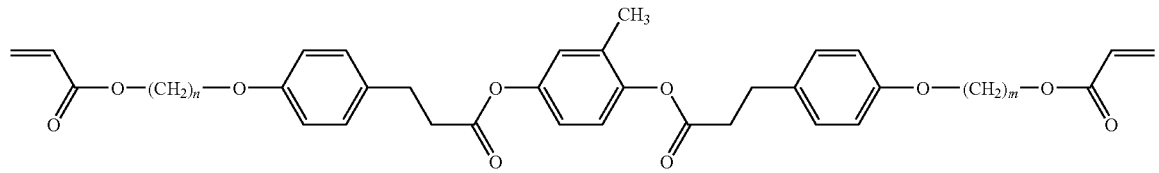
(M2b-6-1)
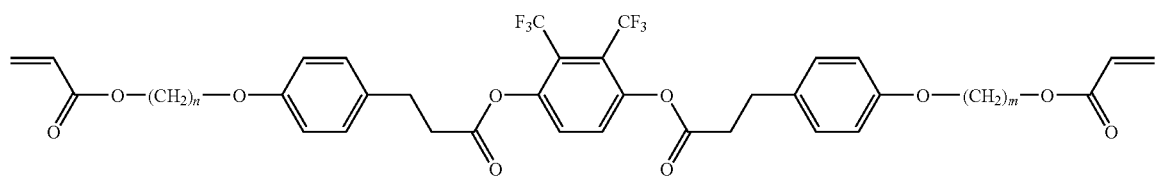
(M2b-7-1)
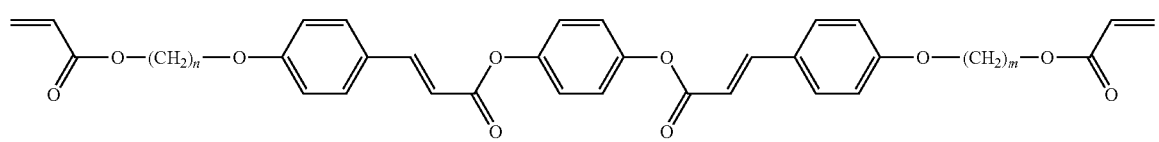
(M2b-8-1)
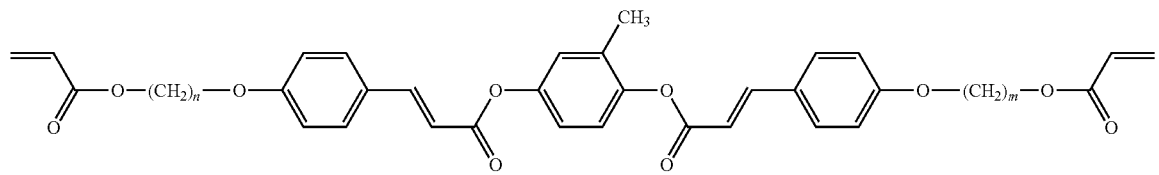
(M2b-9-1)
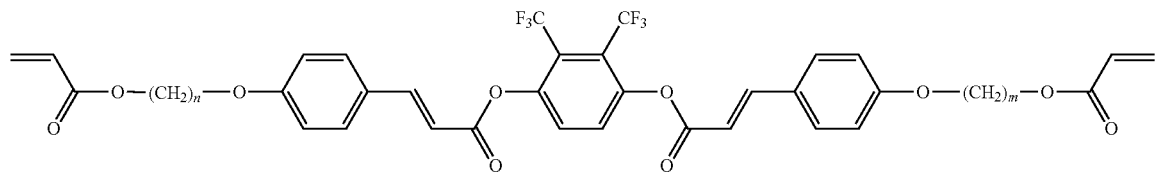
(M2b-10-1)
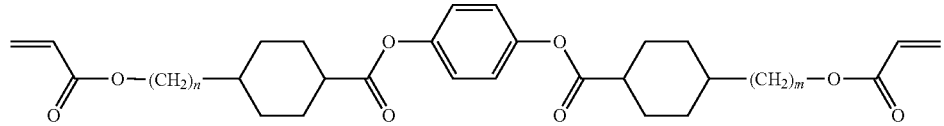
(M2b-11-1)
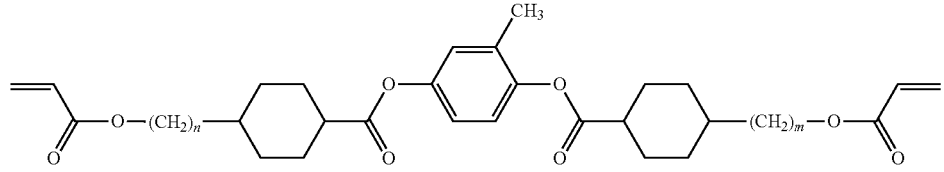
(M2b-12-1)
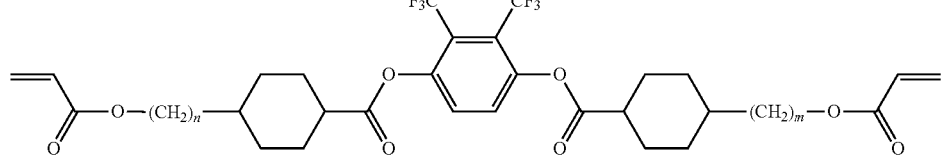

-continued
(M2b-13-1)
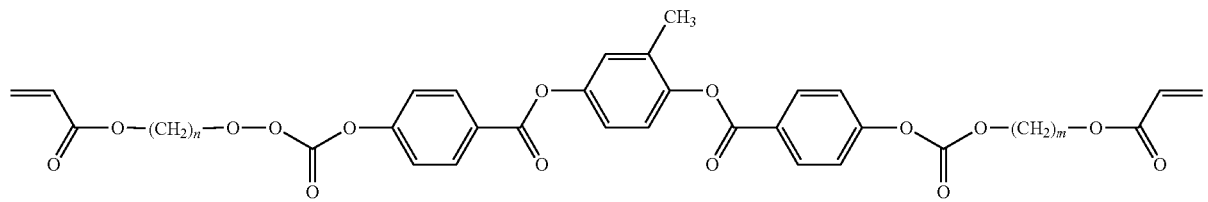
(M2b-14-1)
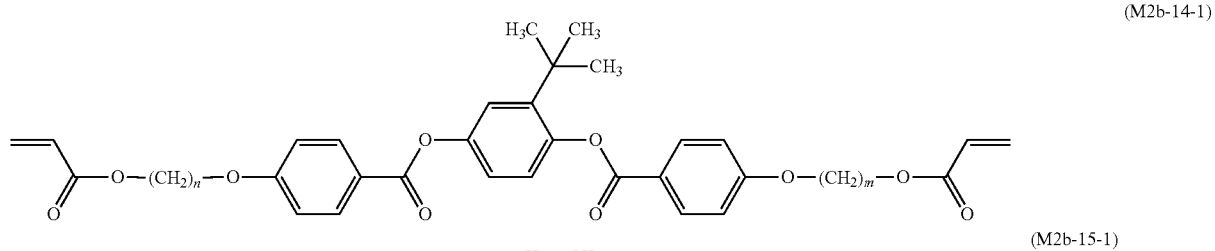
(M2b-15-1)
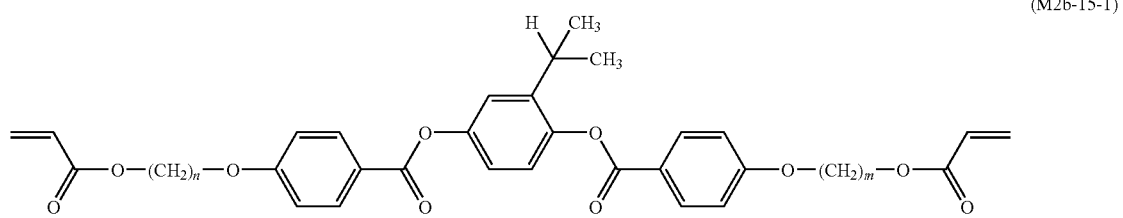
(M2b-1-2)
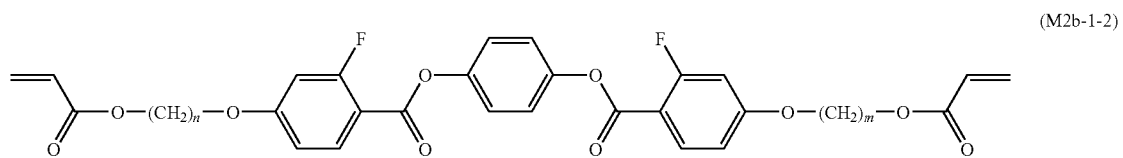
(M2b-2-2)
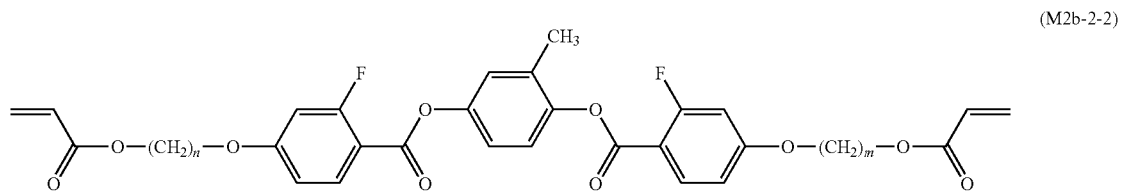
(M2b-3-2)
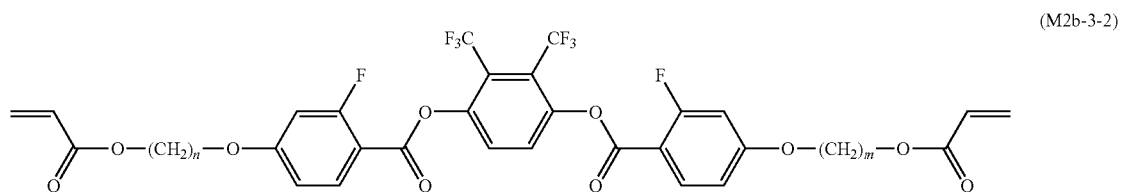
Desirable examples of the expansion of Formula (M2c) are as follows:
(M2c-1)
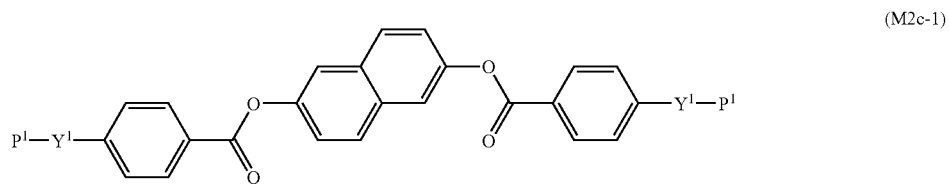

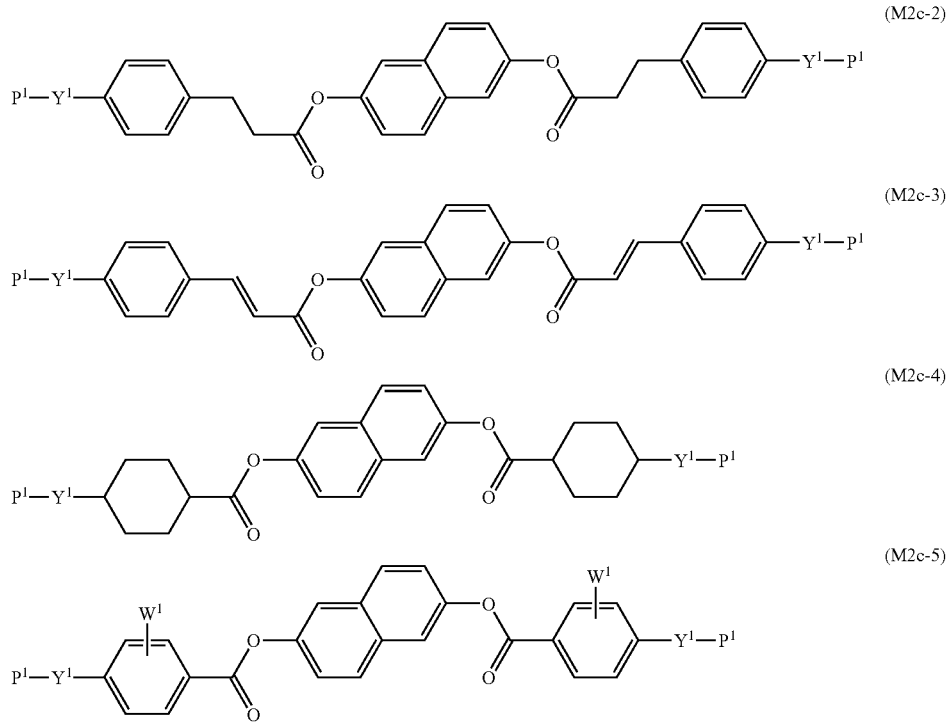

wherein $Y^1$ is independently alkylene having 2 to 12 carbon atoms, oxyalkylene having 2 to 12 carbon atoms, or alkyleneoxy having 2 to 12 carbon atoms, and $W^1$ is hydrogen or fluorine. $P^1$ are preferably groups represented by Formula (P9), Formula (P10), and Formula (P11), wherein W is hydrogen in Formula (P9), W is hydrogen in Formula (P10), and W is ethyl in Formula (P11).

Specific examples of the compound (M2c-1) to the compound (M2c-5) in the case where $P^1$ is a group represented by Formula (P9) are as follows. In the following specific examples, n and m are each independently an integer of 2 to 12.

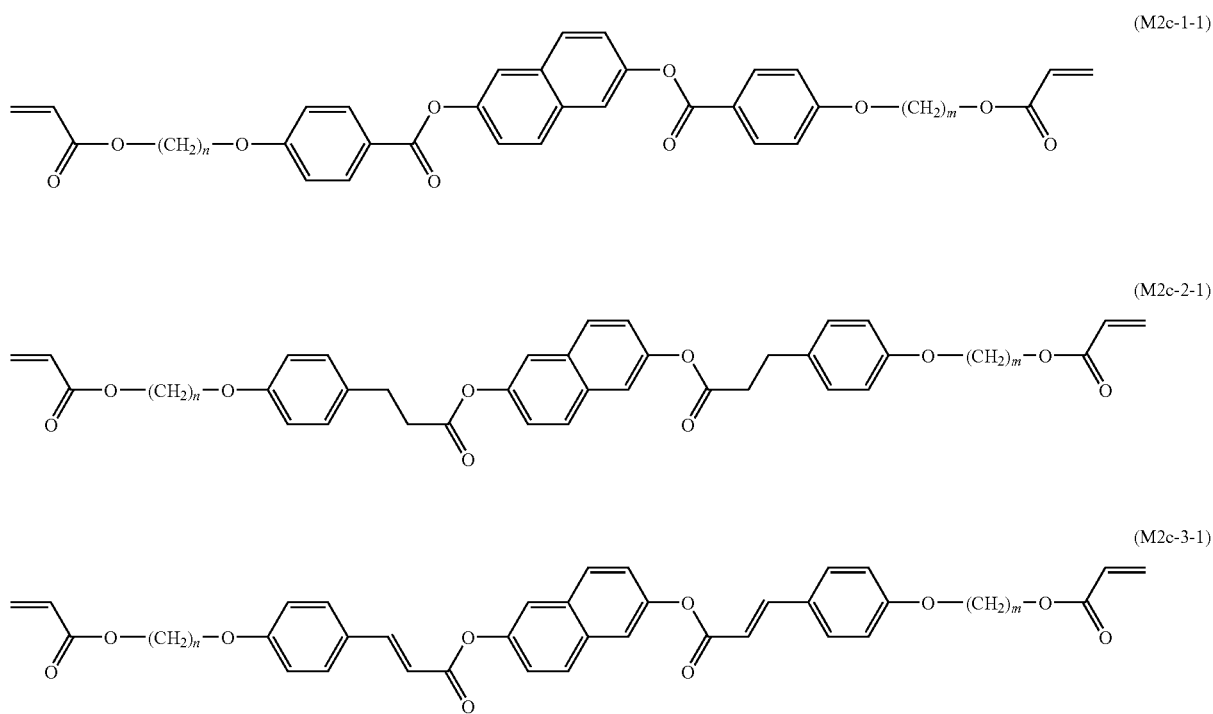

(M2c-4-1)
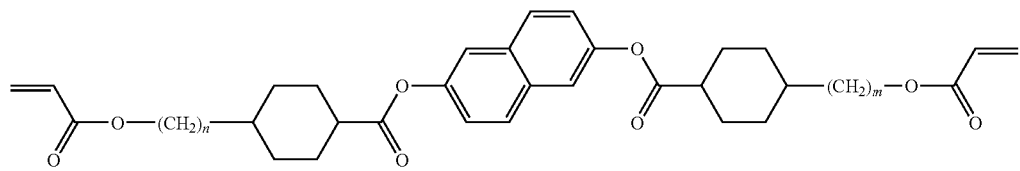
(M2c-5-1)
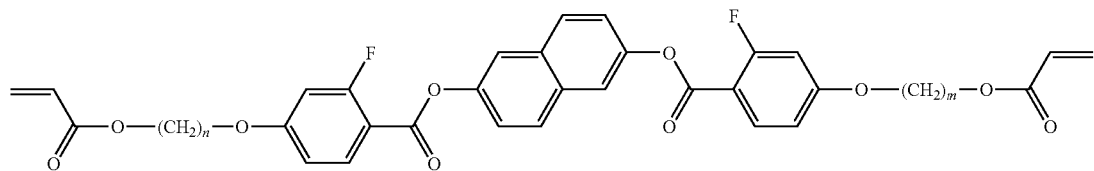
Desirable examples of the expansion of Formula (M2d) are as follows.
(M2d-1)
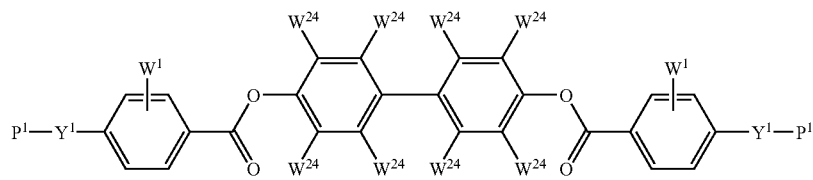
(M2d-2)
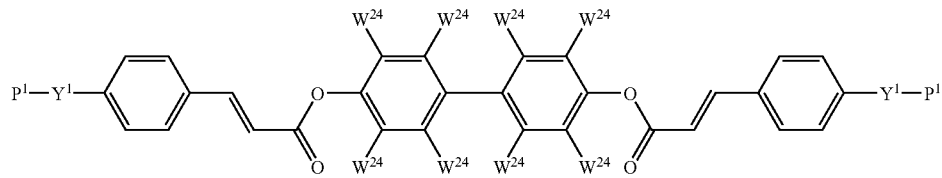
(M2d-3)
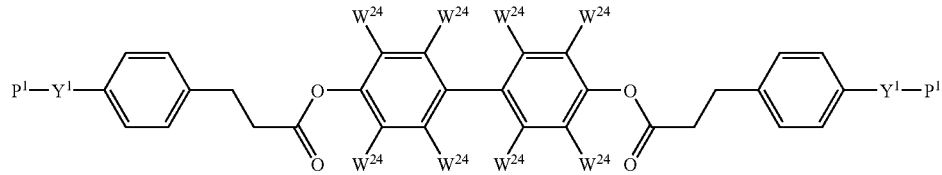
(M2d-4)
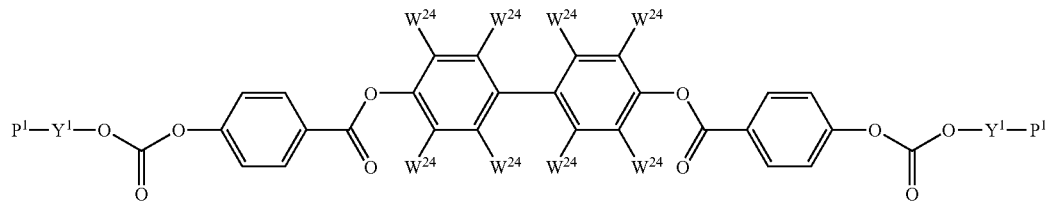
(M2d-5)
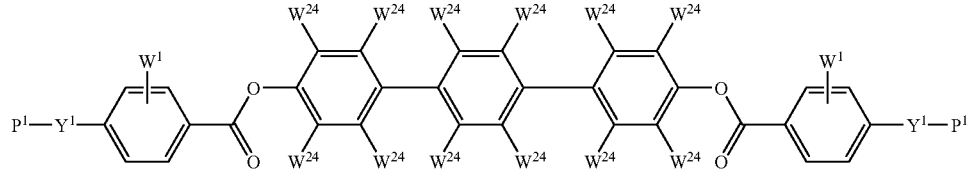
(M2d-6)
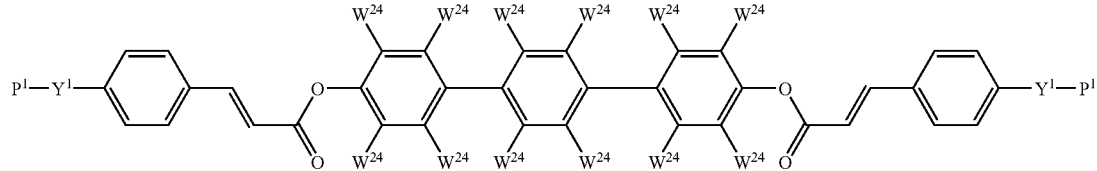

-continued

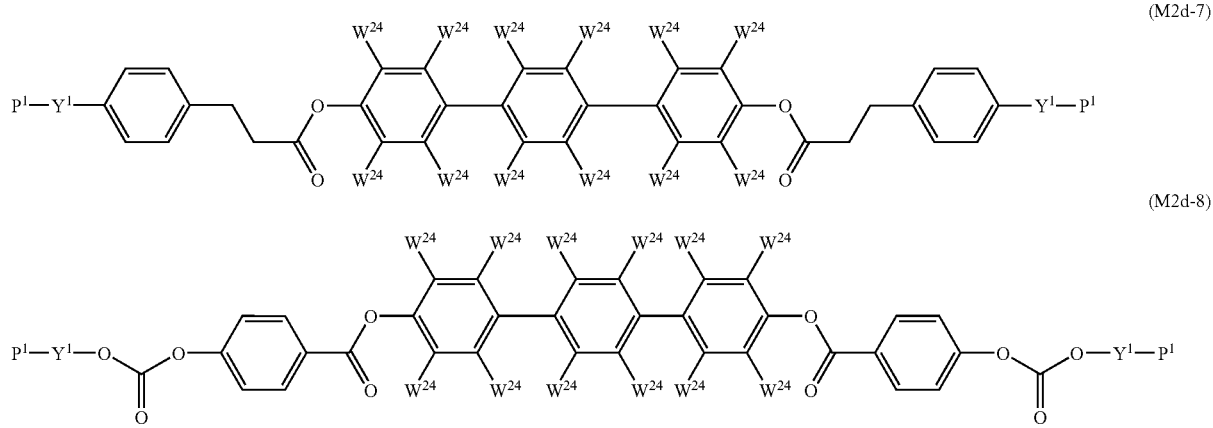

In Formula (M2d-1) to Formula (M2d-3), and Formula (M2d-5) to Formula (M2d-7), $Y^1$ is independently alkylene having 2 to 12 carbon atoms, alkyleneoxy having 2 to 12 carbon atoms, or oxyalkylene having 2 to 12 carbon atoms. In Formula (M2d-4) and Formula (M2d-8), $Y^1$ is independently alkylene having 2 to 12 carbon atoms. $W^1$ is hydrogen or fluorine and $W^{24}$ is hydrogen, fluorine, methyl, or methoxy. $P^1$ are preferably groups represented by Formula (P9), Formula (P10), and Formula (P11), wherein W is hydrogen in Formula (P9), W is hydrogen in Formula (P10), and W is ethyl in Formula (P11).

Specific examples of the compound (M2d-1) to the compound (M2d-8) in the case where $P^1$ is a group represented by Formula (P9) are as follows. In the following specific examples, n and m are each independently an integer of 2 to 12.

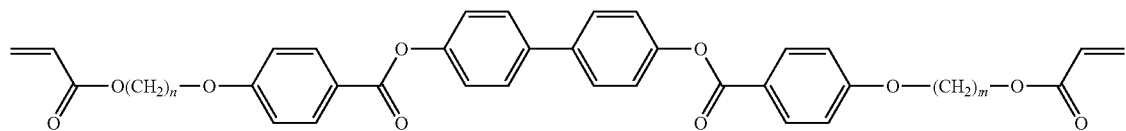

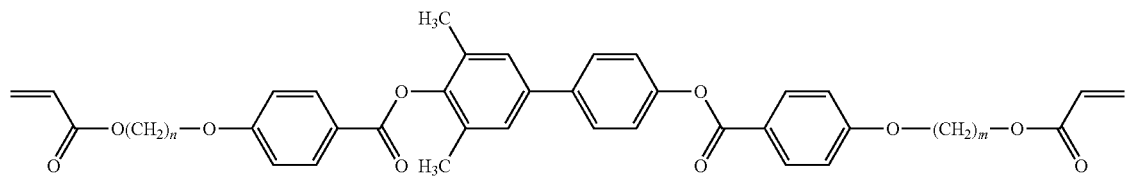

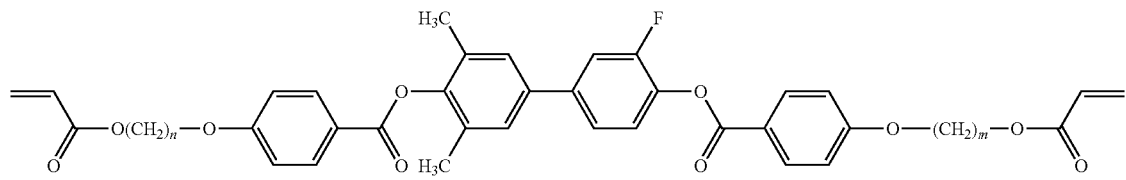

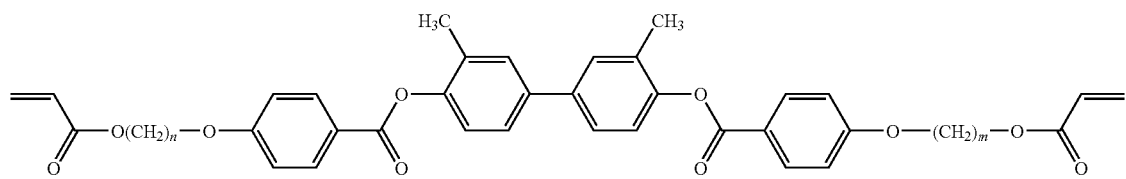

-continued
(M2d-1-5)
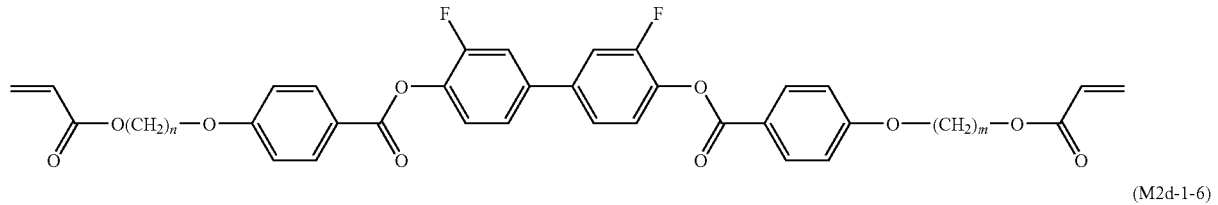
(M2d-1-6)
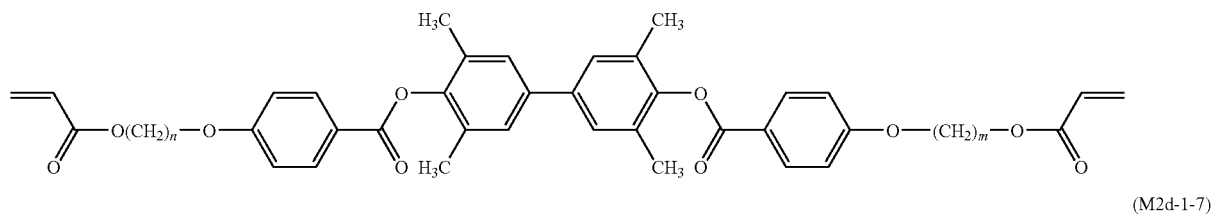
(M2d-1-7)
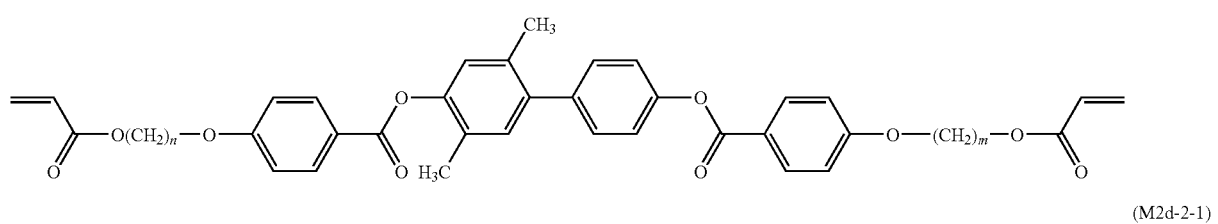
(M2d-2-1)
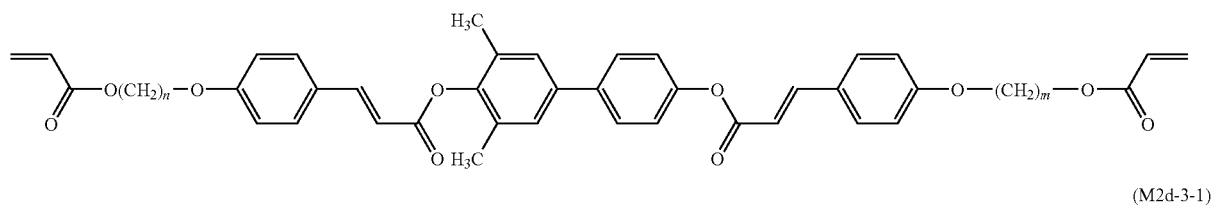
(M2d-3-1)
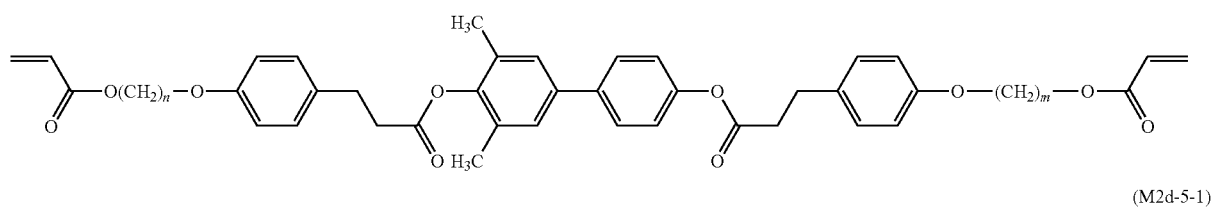
(M2d-5-1)
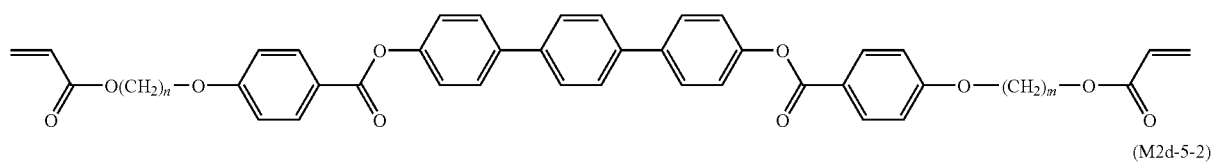
(M2d-5-2)
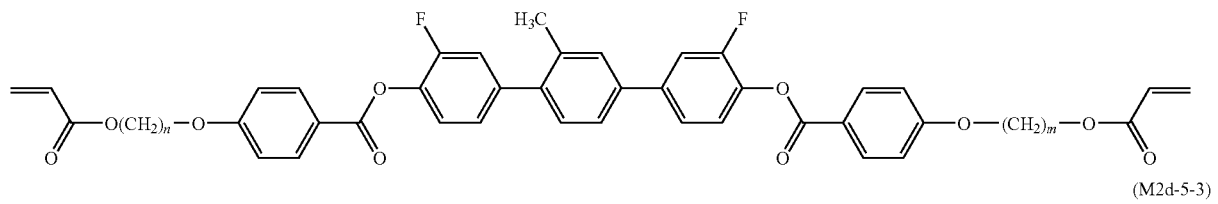
(M2d-5-3)
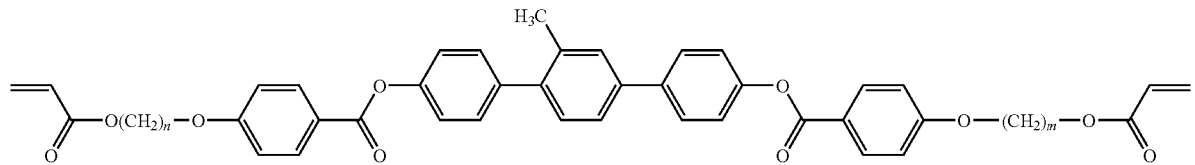

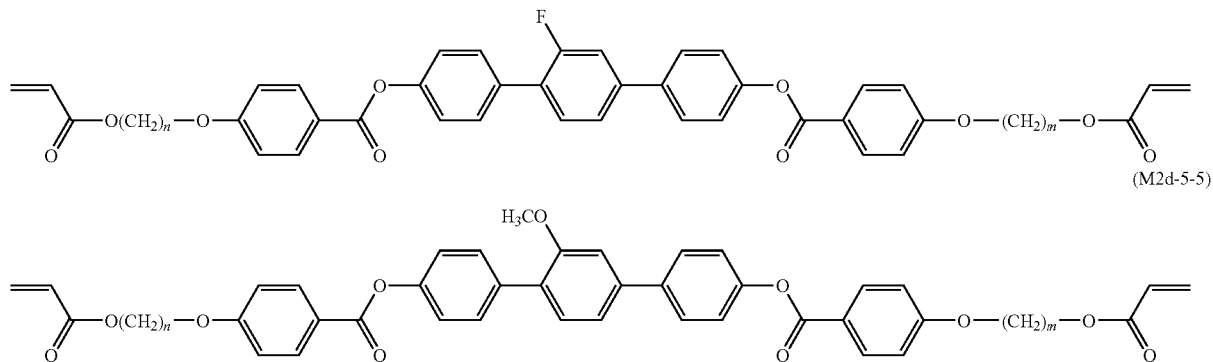

(M2d-5-4)

(M2d-5-5)

Desirable examples of the expansion of Formula (M2e) are as follows:

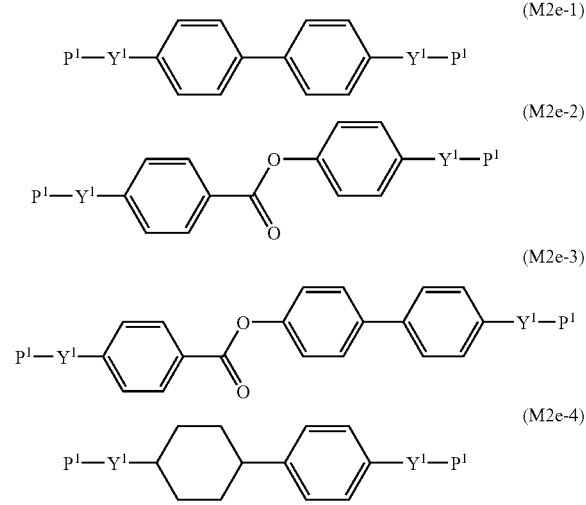

(M2e-1)

(M2e-2)

(M2e-3)

(M2e-4)

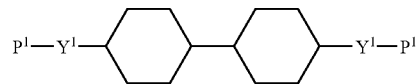

(M2e-5)

wherein $Y^1$ is independently alkylene having 2 to 12 carbon atoms, alkyleneoxy having 2 to 12 carbon atoms, or oxyalkylene having 2 to 12 carbon atoms. $P^1$ are preferably groups represented by Formula (P9), Formula (P10), and Formula (P11), wherein W is hydrogen in Formula (P9), W is hydrogen in Formula (P10), and W is ethyl in Formula (P11). More desirable examples of $P^1$ in Formula (M2e-2) are groups represented by Formula (P9) and Formula (P10) described above, wherein W is hydrogen in Formula (P10).

In the compound (M2e-1) to the compound (M2e-5), specific examples in the case where $P^1$ is represented by Formula (P9) are as follows. In the following specific examples, n and m are each independently an integer of 2 to 12.

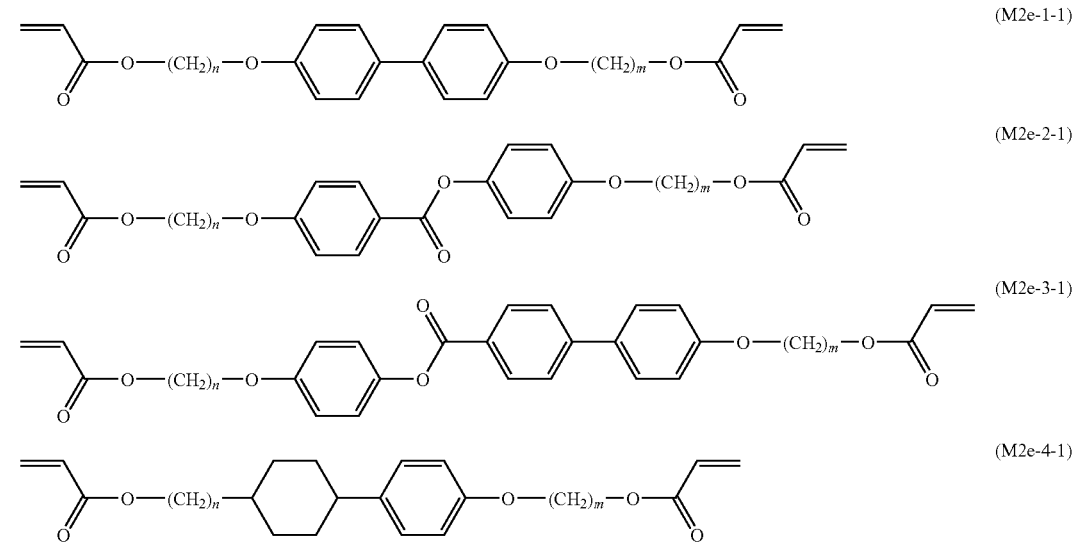

(M2e-1-1)

(M2e-2-1)

(M2e-3-1)

(M2e-4-1)

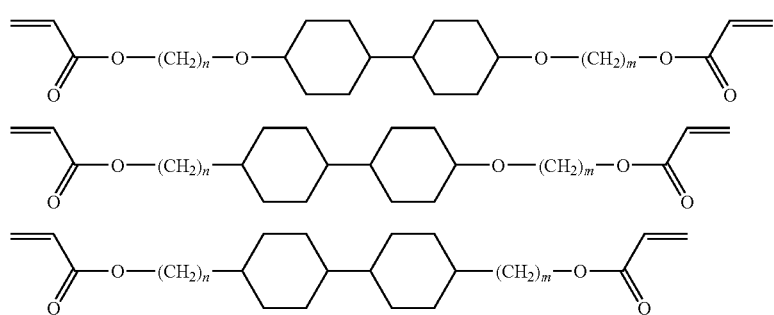

(M2e-5-1)

(M2e-5-2)

(M2e-5-3)

In the compound (M2e-2), specific examples in the case where $P^1$ is represented by Formula (P10) are as follows. In the following specific examples, n and m are each independently an integer of 2 to 12.

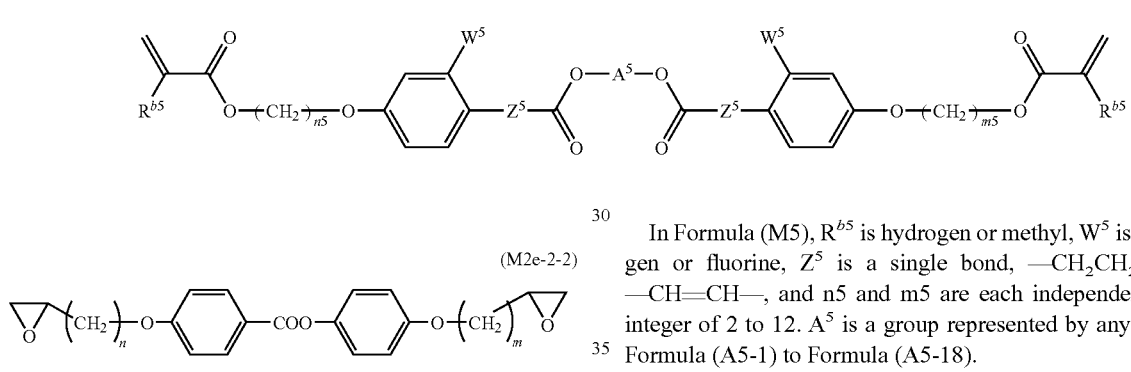

(M2e-2-2)

The compound (M1), and the compound (M2a) to the compound (M2e) can be synthesized by suitably combining techniques in synthetic organic chemistry. Methods for introducing objective terminal groups, rings, and bonding groups into starting materials are described in the books of ORGANIC SYNTHESES (John Wiley & Sons, Inc), ORGANIC REACTIONS (John Wiley & Sons, Inc), COMPREHENSIVE ORGANIC SYNTHESIS (Pergamon Press), NEW EXPERIMENTAL CHEMISTRY COURSE (Shin Jikken Kagaku Kouza, in Japanese title) (Maruzen), and so forth.

References describing specific methods for the synthesis of the compound (M1), and the compound (M2a) to the compound (M2e) are as follows; JP 2005-320317 A for the compound (M1-3-4) to (M1-3-7); JP 2003-238491 A and JP 2006-307150 A for the compound (M2a-1-1) to the compound (M2a-1-6); JP 2005-60373 A for the compound (M2a-1-9) to the compound (M2a-1-20); WO 2008/136265 A for the compound (M2a-1-7) and the compound (M2a-1-8); Makromol. Chem., 190, 3201-3215 (1998) for the compound (M2b-1-1) and the compound (M2b-2-1); JP 2004-231638 A for the compound (M2b-3-1) and the compound (M2b-9-1); JP 2006-337565 A for the compound (M2b-6-1); WO 97/00600 A for the compound (M2b-13-1); JP 2008-239873 A for the compound (M2d); and Macromolecules, 26, 1244-1247 (1993) for the compound (M2e-2-2).

The compound (M5) described below may further be added to a composition comprising a compound having the polymerizable group represented by Formula (P9) described above. The content ratio of the compound (M5) in the case where being added is in the range of 0.001 to 0.20 at the weight rate based on the total amount of the compound (M1) and the compound (M2a) to the compound (M2e).

(M5)

In Formula (M5), $R^{b5}$ is hydrogen or methyl, $W^5$ is hydrogen or fluorine, $Z^5$ is a single bond, —$CH_2CH_2$—, or —CH=CH—, and n5 and m5 are each independently an integer of 2 to 12. $A^5$ is a group represented by any one of Formula (A5-1) to Formula (A5-18).

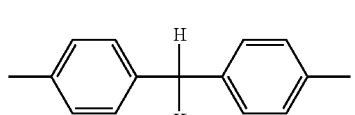

(A5-1)

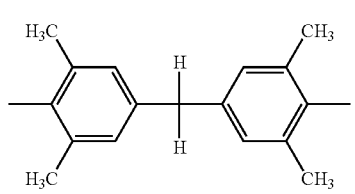

(A5-2)

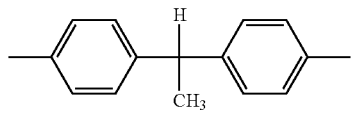

(A5-3)

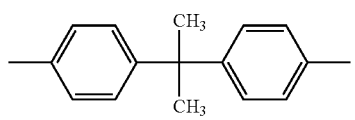

(A5-4)

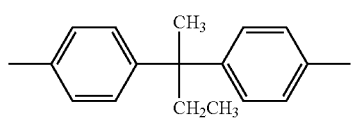

(A5-5)

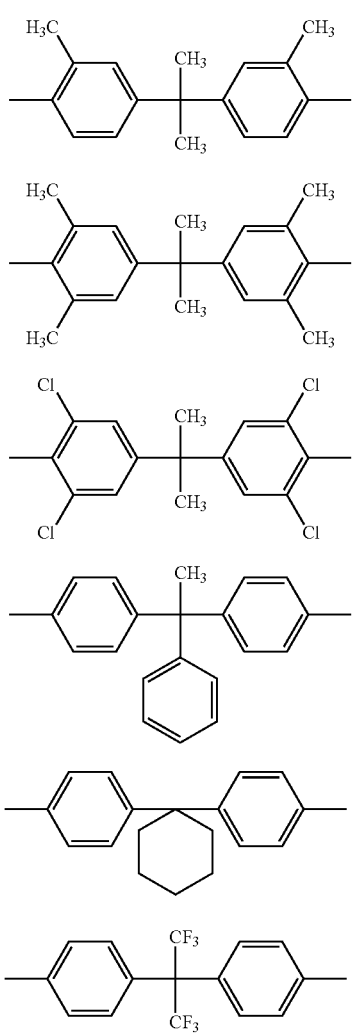
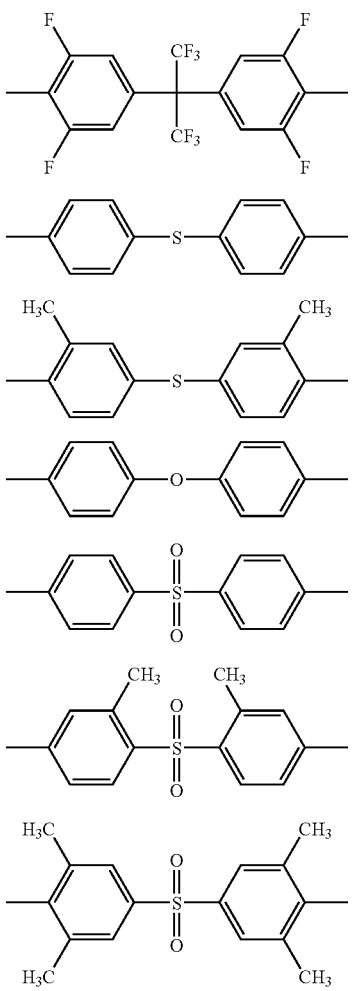
Desirable examples of the compound (M5) are as follows.
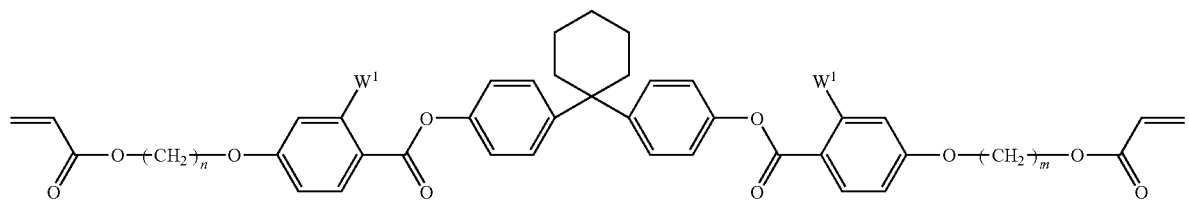
(M5-A5-10-1)
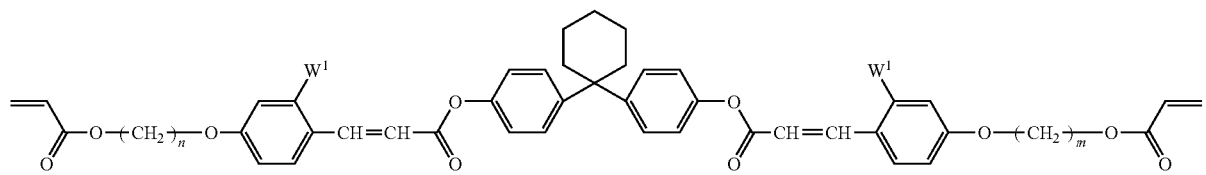
(M5-A5-10-2)

-continued

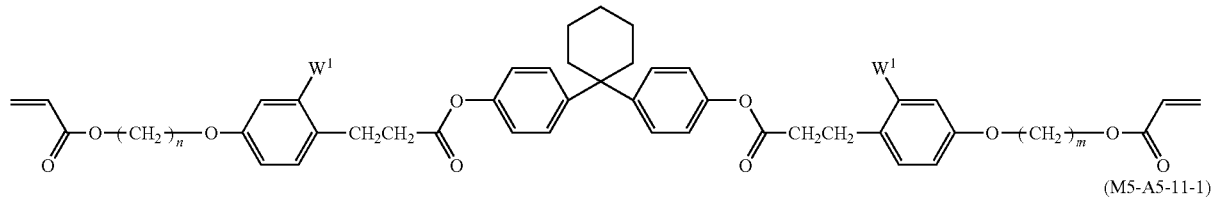
(M5-A5-10-3)

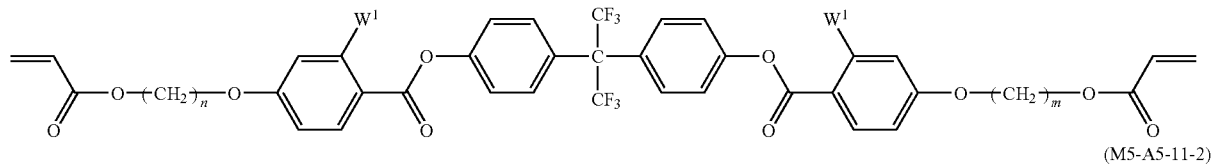
(M5-A5-11-1)

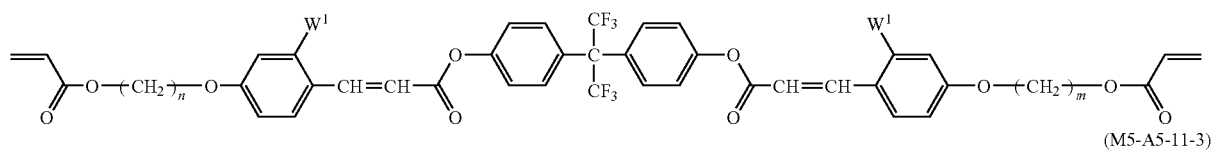
(M5-A5-11-2)

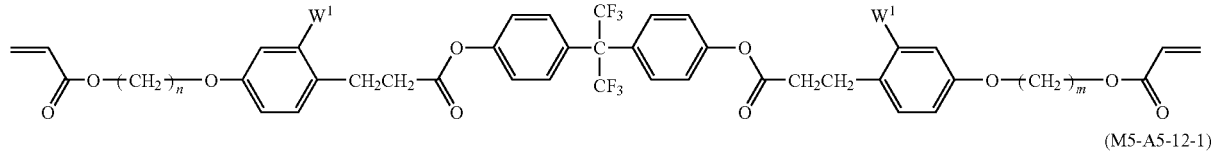
(M5-A5-11-3)

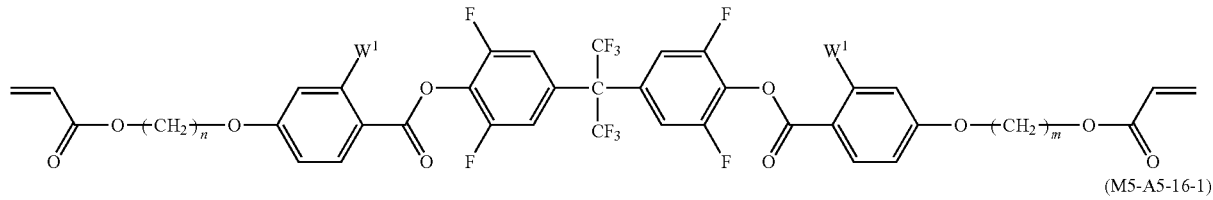
(M5-A5-12-1)

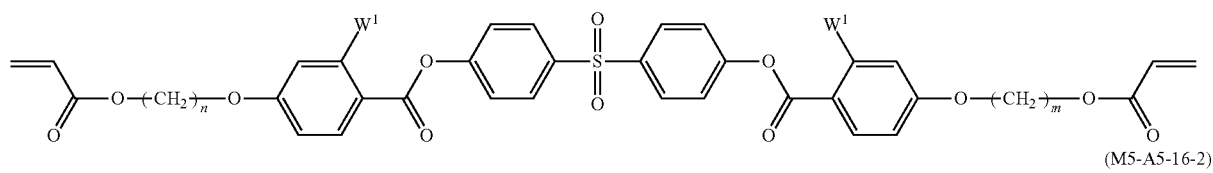
(M5-A5-16-1)

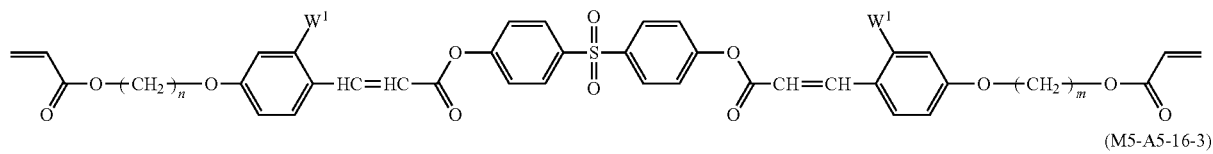
(M5-A5-16-2)

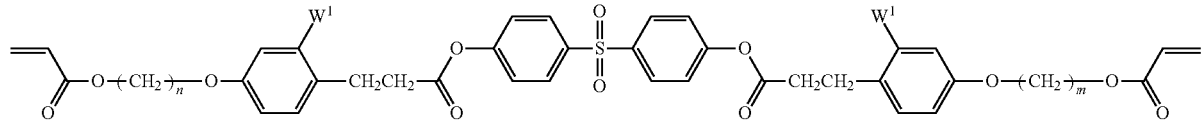
(M5-A5-16-3)

Methods for synthesizing these compounds are described in JP 2007-16213 A and JP 2008-133344 A.

A non-polymerizable liquid crystal compound, a non-liquid crystal polymerizable compound, a polymerization initiator, solvent, surfactant, antioxidant, filler, ultra-violet absorber, sensitizer and so forth may be added to the composition of the invention in order to improve characteristics. The chemical structures and the composition ratios of the additives are not limited. A content of each component is used in such a level that liquid crystallinity is not spoiled. Examples of non-polymerizable liquid crystal compounds are described in the database, LiqCryst, (trademark; LCI Publisher, Hamburg, Germany) and the references cited therein.

An optically active compound may be added to the composition of the invention. Proper examples of the optically active compound are compounds represented by Formula (OP-1) to Formula (OP-25). In these Formulas, the symbol, Ak, means alkyl having 1 to 15 carbon atoms or alkoxy having 1 to 15 carbon atoms, and the symbols, Me, Et, and Ph, mean methyl, ethyl, and phenyl, respectively. The symbol, $P^2$, is a polymerizable group and preferably a group including (meth)acryloyloxy, vinyloxy, oxiranyl, or oxetanyl. The composition of the invention may be used for a starting material of a polymer described below and may also be used directly as liquid crystals for an element in a liquid crystal display device.
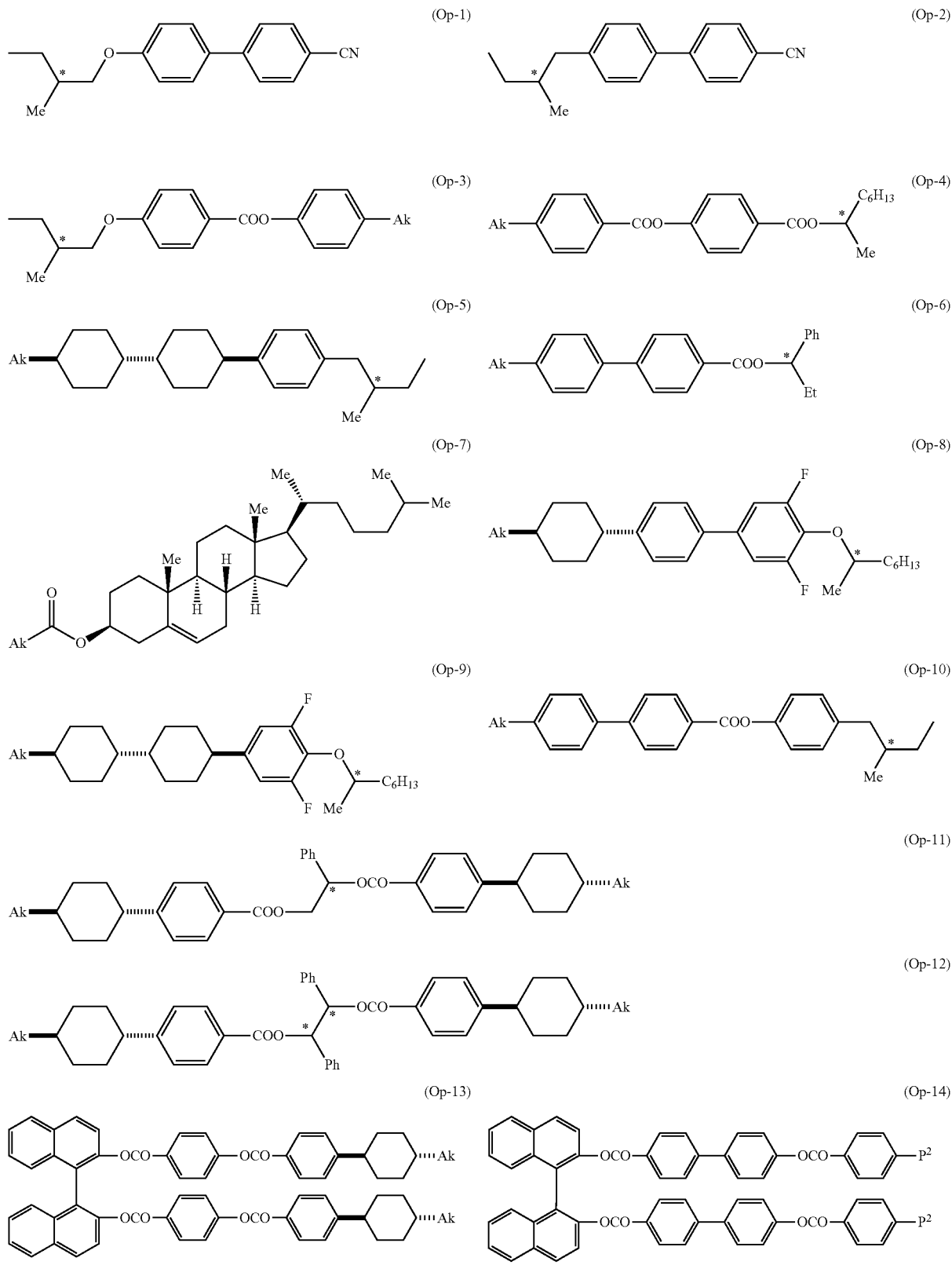

-continued
(Op-15)
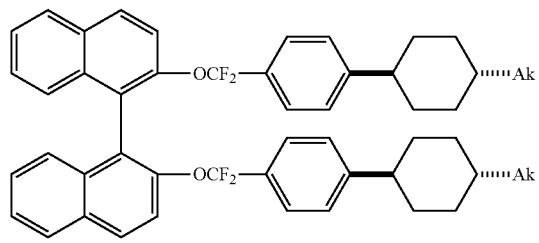
(Op-16)
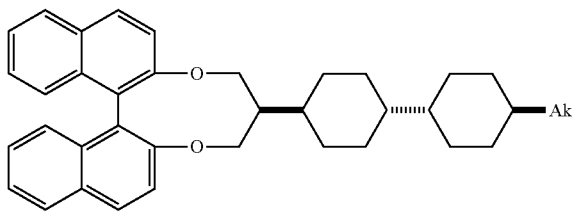
(Op-17)
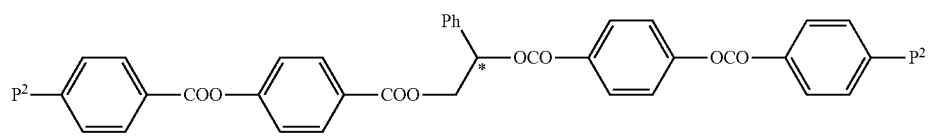
(Op-18)
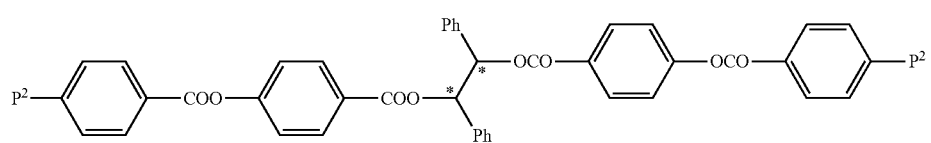
(Op-19)
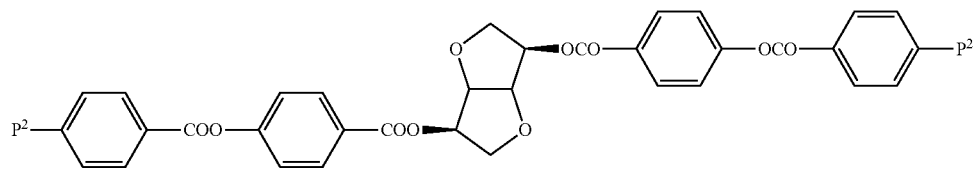
(Op-20)
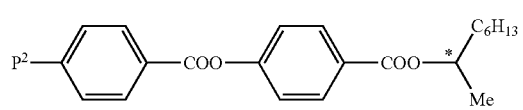
(Op-21)
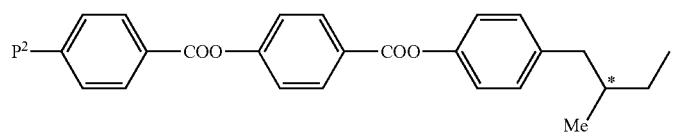
(Op-22)
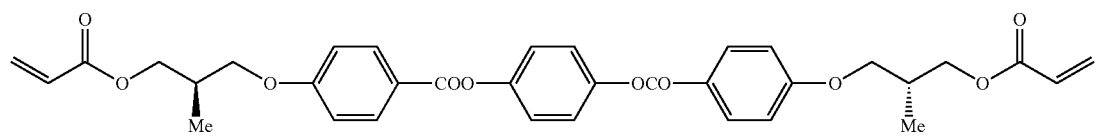
(Op-23)
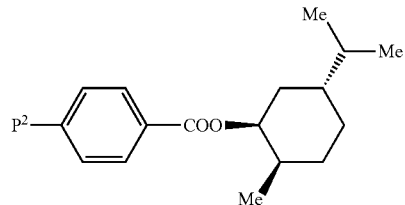
(Op-24)
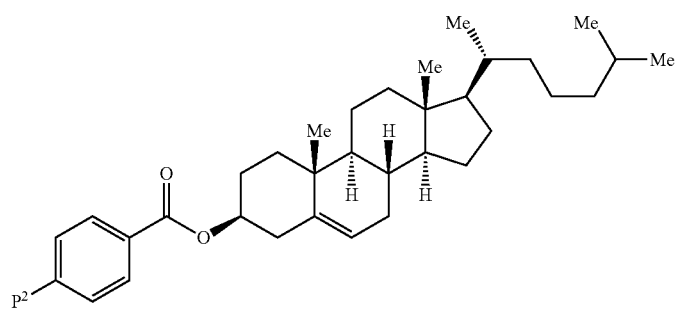

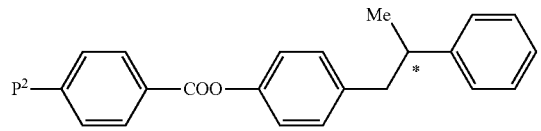

(Op-25)

The polymer of the invention can be produced by radical polymerization or cationic polymerization of the compound (1) or of a liquid crystal composition comprising the compound (1). A homopolymer is obtained by polymerizing only one of the compounds (1). A copolymer is obtained by polymerizing a composition comprising a plurality of polymerizable compounds.

A polymerizable liquid crystal composition comprising the compound (1) has a property of a homeotropic alignment. The homeotropic alignment can be fixed by forming a thin film of the composition on a substrate and then polymerizing the film on irradiation with light. This polymer can be used as a formed body having optical anisotropy. This polymer can improve a viewing-angle property of a polarizing plate, for example, in combination with a film having other optical functions. A polymer having a homeotropic alignment is classified into a positive C-plate because of the direction of an optical axis being present in the $n_z$ direction and of the indecatrix in which the refractive index in the optical axis direction is larger than that in the direction crossing at right angles. The positive C-plate can be applied to an optical compensation of liquid crystal mode, so-called IPS (In-Plane Switching) mode and so forth, such as an improvement of a viewing angle in a polarizing plate, in combination with a film having other optical functions.

Polymerization can be carried out on irradiation with energy (electromagnetic waves). Such electromagnetic waves include ultraviolet radiation, infrared radiation, visible radiation, X-rays, γ-rays and so forth. High energy particles such as ions or electrons may also be used for irradiation.

A polymerizable compound having no liquid crystallinity may be added in order to adjust mechanical strength, thermal strength, applicability, alignment and so forth. Such non-liquid crystal polymerizable compound are desirably (meth)acrylate compounds, vinyl compounds, stylene compounds, vinylether compounds, oxirane compounds, and oxetane compounds. Poly-functional acrylates, vinylethers, oxiranes, and oxetanes may be used to increase mechanical strength and thermal strength of a polymer.

A surfactant may be added to the composition of the invention in order to facilitate an application, or to adjust alignment of liquid crystals. The amount of the surfactant added depends on its kind or the object of its addition, and is in the range of 100 ppm to 10% by weight, and more preferably 100 ppm to 5% by weight based on the liquid crystal composition of the invention.

Examples of initiators used for photo-initiated radical polymerization, as a specific trade name, include products such as TPO, 1173, and 4265 in DAROCUR series, and 184, 369, 500, 651, 784, 819, 907, 1300, 1700, 1800, 1850, 2959 and so forth in IRGACURE series, available from Ciba Japan K.K., and any well-known initiators is usable.

Other examples of initiators used for photo-radical polymerization are 4-methoxyphenyl-2,4-bis(trichloromethyl)triazine, 2-(4-butoxystyryl)-5-trichloromethyl-1,3,4-oxadiazole, 9-phenyl acryzine, 9,10-benzphenazine, a benzophenone/Michler's ketone mixture, a hexaallylbiimidazole/mercaptobenzimidazole mixture, 1-(4-isopropylphenyl)-2-hydroxy-2-methylpropane-1-one, benzyldimethylketal, 2-methyl-1-[4-(methylthio)phenyl]-2-morpholinopropane-1-one, 2,4-diethylxanthone/methyl p-dimethylaminobenzoate mixture, a benzophenone/methyltriethanolamine mixture and so forth, and any well-known initiators are usable.

Desirable examples of initiators used for thermal radical polymerization include benzoyl peroxide, diisopropylperoxydicarbonate, t-butylperoxy-2-ethylhexanoate, tert-butyl peroxypivalate, di-t-butylperoxide, t-butylperoxydiisobutylate, lauroyl peroxide, dimethyl 2,2'-azobis(isobutyrate), azobisisobutyronitrile, azobiscyclohexanecarbonitrile and so forth, and any well-known initiators are usable. Commercially available initiators of azo compounds include, for example, V-70, V-65, V-60, V-59, V-40, V-30, V-501, V-601, VE-073, VA-080, VA-086, VF-096, VAm-110, VAm-111, VA-044, VA-046B, VA-060, VA-061, V-50, VA-057, VA-067, VR-110, VPE-0201, VPE-0401, VPE-0601, VPS-1001 and so forth made by Wako Pure Chemical Industries, Ltd.

Examples of initiators used for photo-cationic polymerization are, as a specific trade name, CYRACURE UVI-6990 and 6974 from U. C. C., ADEKA OPTOMER SP-150, 152, 170, and 172 from Adeka Corporation, Photo-initiator 2074 from Rhodia Japan K.K., IRGACURE 250 from Ciba Japan K.K., DTS-102 from Midori Kagaku Co., LTD. and so forth, and any well-known initiators are also usable.

The formed body of the invention can be produced by applying at least one of the compound (1) or by applying a composition comprising the compound (1) to a substrate, forming a film, and then polymerizing the film on irradiation with electromagnetic waves such as light, wherein alignment of molecules in the compound (1) or the composition is fixed. The substrate is, for example, triacetylcellulose, diacetylcellulose, polyvinyl alcohol, polyimide, polyester, polyarylate, polyetherimide, polyethylene terephthalate, polyethylene naphthalate, polycarbonate and so forth. Specific trade name is "ARTON" from JSR Corporation, ZEONEX and ZEONOR from Zeon Corporation, APEL from Mitsui Chemicals, Inc. and so forth. The substrate may be a uniaxial aligned film or a biaxial aligned film. The substrate may be processed in advance by means of a surface-treatment such as a saponification-treatment, a corona-treatment, a plasma-treatment and so forth.

At least one of the compounds of the invention or the composition of the invention can also be applied by means of dissolving it in solvent. Desirable solvents are hexane, heptane, toluene, xylene, methoxybenzene, ethylene glycol dimethyl ether, ethylene glycol monomethyl ether, ethylene glycol monomethyl ether acetate, propylene glycol monomethylether acetate, propylene glycol monoethyl ether acetate, acetone, methyl ethyl ketone, methyl isobutyl ketone, cyclopentanone, cyclohexanone, methyl acetate, ethyl acetate, methyl 3-methoxypropionate, γ-butyloractone, 2-pyroridone, N-methyl-2-pyroridone, dimethylformamide, chloroform, dichloromethane, dichloroethane, t-butyl alcohol, diacetone alcohol, butyl cellosolve, cyclopentanone, cyclohexane and so forth or combinations thereof.

A stabilizer may be added to at least one of the compounds or to the composition of the invention in order to facilitate a handling in use or to prevent polymerization upon storage. Any well-known stabilizers are usable, and are, for example, 4-ethoxyphenol, hydroquinone, 3,5-di-t-butyl-4-hydroxytoluene (BHT) and so forth.

After the compound or the composition of the invention has been prepared in solution by adding solvent thereto, it can be applied by use of methods such as spin coating, roll coating, curtain coating, flow coating, printing, micro-gravure coating, gravure coating, wire-bar coating, dip coating, spray coating, meniscus coating, dye coating, casting film-forming method and so forth, forming a thin film and then by evaporating the solvent.

At least one of the compounds of the invention or the composition of the invention can be aligned on a substrate by means of the alignment-treatment of the substrate surfaces before application. Methods for the treatment include a rubbing method in which a thin film is made of polyimide, polyamide, polyvinylalcohol or the like and rubbed with a rayon cloth or the like, an oblique-deposition method by use of silicon dioxide, or a rubbing-free alignment method using an aligned film or a photo-aligned film, or ion beams. Alternatively, the substrate itself may be treated directly by means of rubbing with a rayon cloth or the like. Treatment of surfaces of the substrate may not be required in certain cases.

In order to obtain a formed body from a solution of the liquid crystal composition of the invention, the solution is applied to a supporting substrate and then the solvent is removed, forming a homogeneous thickness-layer of the composition. Conditions permitting the removal of the solvent are not limited. The solvent may be removed substantially until the coated film has lost its mobility. The solvent can be removed by methods such as air-drying, drying in an oven, and blowing of warm air or hot air. A nematic alignment of a composition in a coated film may be completed in the process drying the coated film, in certain cases, depending on the kind and the composition ratio of a compound used in the composition. In such cases, after the drying step, the coated film can be provided to a polymerization step without a thermal treatment step described later.

Desirable ranges of time and temperature for a thermal treatment of a coated film, wavelengths of light used for light irradiation, the amount of light arrived from a light source or the like could vary with factors such as the kind and the composition ratio of a compound used for the composition, presence or absence of a photo-polymerization initiator added, and its amount added. Thus, conditions such as time and temperature for a thermal treatment of a coated film, wavelengths of light used for light irradiation, and the amount of light arrived from a light source, which will be explained below, could indicate approximately desirable ranges tentatively.

It is desirable that a thermal treatment of a film is carried out under the condition that a homogeneous alignment in the composition is formed. The treatment may be carried out at a temperature above transition temperature of liquid crystal phases. One of examples on the thermal treatment is a method in which the film is heated until the composition have exhibited a nematic liquid crystal phase, and a nematic alignment is thus formed in the composition of the film. The nematic alignment may be formed by changing the temperature of the film within the temperature range in which the composition exhibits a nematic liquid crystal phase. In this method, the nematic alignment is approximately completed, and next more ordered-alignment is formed by decreasing the temperature. The thermal treatment temperature in either method described above is in the range of room temperature to 120° C. A desirable temperature is in the range of room temperature to 100° C. More desirable temperature is in the range of room temperature to 90° C., and even more desirable temperature is in the range of room temperature to 85° C. Thermal treatment time is in the range of 5 seconds to 2 hours. A desirable time is in the range 10 seconds to 40 minutes, and more desirable time is in the range 20 seconds to 20 minutes. The thermal treatment time is desirably more than 5 seconds in order to increase the temperature of the layer composed of the composition to a designated temperature. The thermal treatment time is desirably within 2 hours in order to avoid a decrease of productivity.

The alignment of at least one of the compound or of the composition of the invention can be fixed by irradiation with electromagnetic waves. The wavelength of the electromagnetic waves is preferably in the range of 150 to 500 nm. It is more preferably in the range of 250 to 450 nm, and most preferably in the range of 300 to 400 nm. Examples of a light source are a low-pressure mercury lamp (a germicidal lamp, a chemical fluorescent lamp, and a black light), a high-intensity discharge lamp (a high-pressure mercury lamp and a metal halide lamp), a short-arc lamp (an ultrahigh-pressure mercury lamp, a xenon lamp, and a mercury-xenon lamp) and so forth. Desirable examples of the light source are a metal halide lamp, a xenon lamp, an ultra high-pressure mercury lamp, and a high-pressure mercury lamp. The wavelength region of an irradiation source may be selected by using a filter or the like arranged between the light source and a layer of a coated film, and by passing through light with a particular wavelength. The amount of light arrived from a light source is in the range of 2 to 5000 mJ/cm$^2$. The amount of light is preferably in the range of 10 to 3000 mJ/cm$^2$, and more preferably in the range of 100 to 2000 mJ/cm$^2$. Conditions of temperature during light irradiation is preferably set up similar to those of the thermal treatment temperature described above. Circumstances on polymerization may be any one of a nitrogen atmosphere, an inert gas atmosphere, and an air atmosphere, and the nitrogen atmosphere or the inert gas atmosphere are desirable in view of increasing hardenability.

Thickness of the formed body of the invention depends on characteristics required and the value of optical anisotropy of the formed body. Thus, the range is not so exact and the thickness is preferably in the range of 0.05 to 50 μm, and more preferably in the range of 0.1 to 20 μm, even more preferably in the range of 5 to 10 μm. Desirable haze values are equal to or less than 1.5%, and more preferably equal to or less than 1.0%. A desirable permeability of the formed body in the visible ray region is equal to or greater than 80%, more preferably equal to or greater than 85%. Haze values equal to or less than 1.5% is desirable to attain a sufficient capability of a polarized light. Permeability equal to or greater than 80% is desirable in order to maintain brightness when this formed body is used for a liquid crystal display device.

EXAMPLES

Hereinafter, the invention will be explained in detail on the basis of examples. Chemical structures of compounds synthesized were confirmed by means of $^1$H-NMR. The symbol, L, stands for "liter", which is a unit of volume.

Example 1

Synthesis of the Compound (A-1)

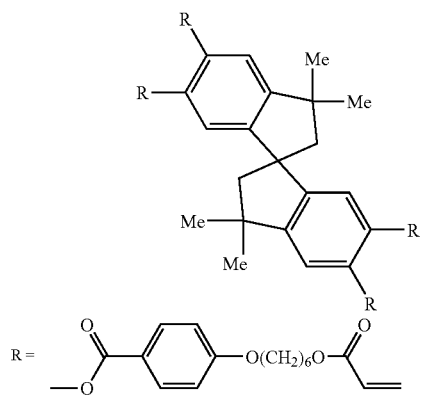

A mixture of 5,5',6,6'-tetrahydroxy-3,3,3',3'-tetramethyl-1,1'-spirobiindan (5.0 g, 15 mmol), 4-(6-acryloyloxyhexyloxy)benzoic acid (19 g, 66 mmol), dicyclohexylcarbodiimide (14 g, 66 mmol), 4-dimethylaminopyridine (0.7 mg, 5.9 mmol), and dichloromethane (100 mL) was stirred at room temperature for 15 hours. Insoluble materials deposited were filtered off. After the filtrate had been washed with 1M-hydrochloric acid, 2M-sodium hydroxide aqueous solution, and then with water, the organic solvent was distilled off under reduced pressure. The residue was purified by means of silica gel chromatography (elute: toluene/ethyl acetate; volume ratio: 9/1), giving 14 g (66% yield) of the compound (A-1) as a viscous material.

Example 2

Preparation of Photo-Polymerizable Liquid Crystal Composition (Mix-1) and Production of the Optical Thin Film (C-1)

Liquid crystal composition (Mix-1) consisting of the compound (A-1) [10% by weight] obtained in Example 1, the compound (M2a-1-1) (n=m=6) [63% by weight], and the compound (M1-1-1) (n=6) [27% by weight] was prepared. The compound (M2a-1-1) was synthesized by the method described in JP 2003-238491 A. The compound (M1-1-1) was synthesized by the method similar to that described in Macromolecules, 26, 6132-6134 (1993).

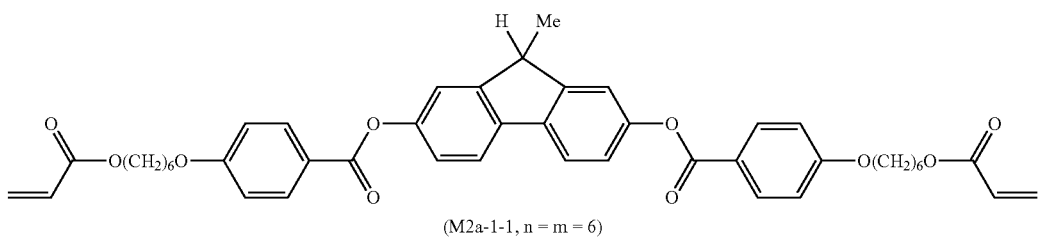

(M2a-1-1, n = m = 6)

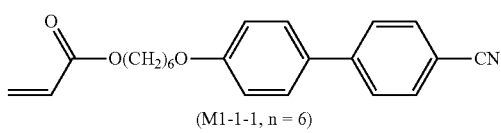

(M1-1-1, n = 6)

Then, a solution prepared by adding toluene (4.0 g) and a polymerization initiator (trade name, IRGACURE 907, made by Ciba Japan K.K.; 0.05 g) to the composition (Mix-1) (1.0 g) was applied to a glass substrate by use of a spin-coater. The solution coated was allowed to stand for 3 minutes on a hot plate at 70° C., removing the solvent and thus a liquid crystal layer was aligned. The optical thin film (C-1) was obtained by irradiation with ultraviolet radiation (20 mW/cm$^2$; 365 nm) for 30 seconds at 25° C. under a nitrogen atmosphere by use of an ultra-high pressure mercury lamp (250 W). It was observed from visual and microscopic tests that the optical thin film (C-1) was transparent and had a uniform alignment. The substrate having the optical thin film was irradiated with light at the wavelength of 550 nm by use of a polarization analyzer Model OPTIPRO made by Shintech Inc. and retardation was measured while the incident angle of light at initial 90 degrees to the film surface was decreased, giving a profile like that shown in FIG. 1, whereby a homeotropic alignment was confirmed.

compound (M2b-2-1) (n=m=6) [60% by weight], and the compound (M1-1-1) (n=6) [32% by weight] was prepared. The optical thin film (C-3) was obtained in a method similar to that in Example 1 except that propyleneglycolmonomethylether acetate/cyclopentanone=1/1 (weight ratio) had been used as a solvent and that a polyimide film on the substrate had been used. The polyimide film was prepared by applying trade name, Lixon Aligner PIA-5370, made by Chisso Corporation, drying the solvent at 80° C. for 3 minutes, and then baking at 210° C. for 30 minutes. The compound (M2b-2-1) was synthesized by the method described in Makromol. Chem., 190, 2255-2268 (1989).

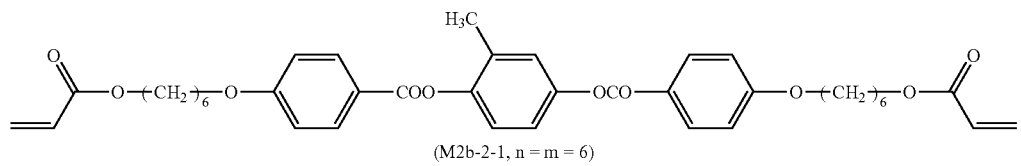

(M2b-2-1, n = m = 6)

It was observed from visual and microscopic tests that the optical thin film (C-3) was transparent and had a uniform alignment. The substrate having the optical thin film was irradiated with light at the wavelength of 550 nm by use of a polarization analyzer Model OPTIPRO made by Shintech Inc. and retardation was measured while the incident angle of light at initial 90 degrees to the film surface was decreased, giving a profile similar to that shown in FIG. 1, whereby a homeotropic alignment was confirmed.

Comparative Example 1

Preparation of Photo-Polymerizable Liquid Crystal Composition (Mix-2) and Production of the Optical Thin Film (C-2)

The liquid crystal composition (Mix-2) consisting of the compound (M2a-1-1) (n=m=6) [70% by weight] and the compound (M1-1-1) (n=6) [30% by weight] was prepared.

Then a solution in which toluene (4.0 g) and a polymerization initiator (trade name, IRGACURE 907, made by Ciba Japan K.K.; 0.05 g) was added to the composition (Mix-2) (1.0 g) was applied to a glass substrate by use of a spin-coater. The solution coated was allowed to stand for 3 minutes on a hot plate at 70° C., removing the solvent and thus a liquid crystal layer was aligned. The optical thin film (C-2) was obtained by irradiation with ultraviolet radiation (20 mW/cm$^2$; 365 nm) for 30 seconds at 25° C. under a nitrogen atmosphere by use of an ultra-high pressure mercury lamp (250 W). It was observed from visual and microscopic tests that the optical thin film (C-2) had a random alignment.

Example 3

Preparation of Photo-Polymerizable Liquid Crystal Composition (Mix-3) and Production of the Optical Thin Film (C-3)

The liquid crystal composition (Mix-3) consisting of the compound (A-1) [8% by weight] obtained in Example 1, the Comparative Example 2

Preparation of Photo-Polymerizable Liquid Crystal Composition (Mix-4) and Production of the Optical Thin Film (C-4)

The optical thin film (C-4) was obtained with a method similar to that in Example 3 except that the liquid crystal composition (Mix-4) consisting of the compound (M2b-2-1) (n=m=6) [65% by weight] and the compound (M1-1-1) (n=6) [35% by weight] had been prepared. It was observed from visual and microscopic tests that the optical thin film (C-4) had a random alignment.

Example 4

Preparation of Photo-Polymerizable Liquid Crystal Composition (Mix-5) and Production of the Optical Thin Film (C-5)

The optical thin film (C-5) was obtained with a method similar to that in Example 3 except that the compound (M2b-2-1) (n=m=6) had been changed to the compound (M2b-13-1) (n=m=4). The compound (M2b-13-1) was synthesized by a method similar to that described in WO 97/00600.

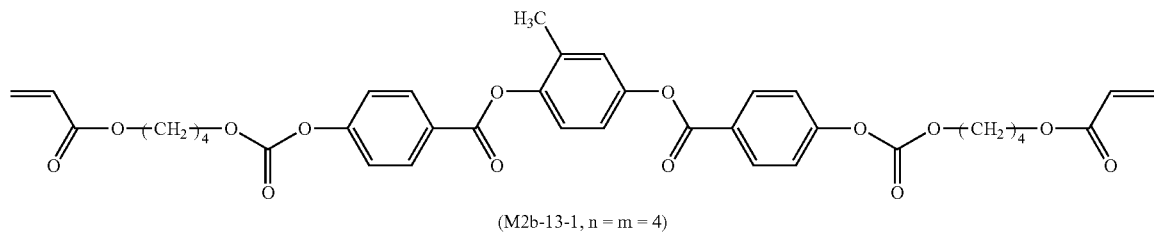

(M2b-13-1, n = m = 4)

It was observed from visual and microscopic tests that the optical thin film (C-5) was transparent and had a uniform alignment. The substrate having the optical thin film was irradiated with light at the wavelength of 550 nm by use of a polarization analyzer Model OPTIPRO made by Shintech Inc. and retardation was measured while the incident angle of light at initial 90 degrees to the film surface was decreased, giving a profile similar to that shown in FIG. 1, whereby a homeotropic alignment was confirmed.

Comparative Example 3

Preparation of Photo-Polymerizable Liquid Crystal Composition (Mix-6) and Production of the Optical Thin Film (C-6)

The optical thin film (C-6) was obtained with a method similar to that in Example 4 except that the liquid crystal composition (Mix-6) consisting of the compound (M2b-13-1) (n=m=4) [65% by weight] and the compound (M1-1-1) (n=6) [35% by weight] had been prepared. It was observed from visual and microscopic tests that the optical thin film (C-6) had a random alignment.

Example 5

Preparation of Photo-Polymerizable Liquid Crystal Composition (Mix-7) and Production of the Optical Thin Film (C-7)

The optical thin film (C-7) was obtained with a method similar to that in Example 3 except that the compound (M1-1-1) (n=6) had been changed to the compound (M1-5-1) (n=6). The compound (M1-5-1) (n=6) was synthesized by the method described in JP 2005-187618.

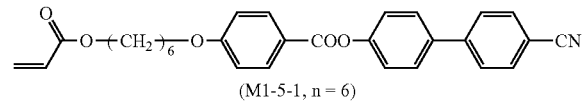

(M1-5-1, n = 6)

It was observed from visual and microscopic tests that the optical thin film (C-7) was transparent and had a uniform alignment. The substrate having the optical thin film was irradiated with light at the wavelength of 550 nm by use of a polarization analyzer Model OPTIPRO made by Shintech Inc. and retardation was measured while the incident angle of light at initial 90 degrees to the film surface was decreased, giving a profile similar to that shown in FIG. 1, whereby a homeotropic alignment was confirmed.

Comparative Example 4

Preparation of Photo-Polymerizable Liquid Crystal Composition (Mix-8) and Production of the Optical Thin Film (C-8)

The optical thin film (C-8) was obtained with a method similar to that in Example 5 except that the liquid crystal composition (Mix-8) consisting of the compound (M2b-2-1) (n=m=6) [65% by weight] and the compound (M1-5-1) (n=6) [35% by weight] had been prepared. It was observed from visual and microscopic tests that the optical thin film (C-8) had a random alignment.

Example 6

Synthesis of the Compound (A-2)

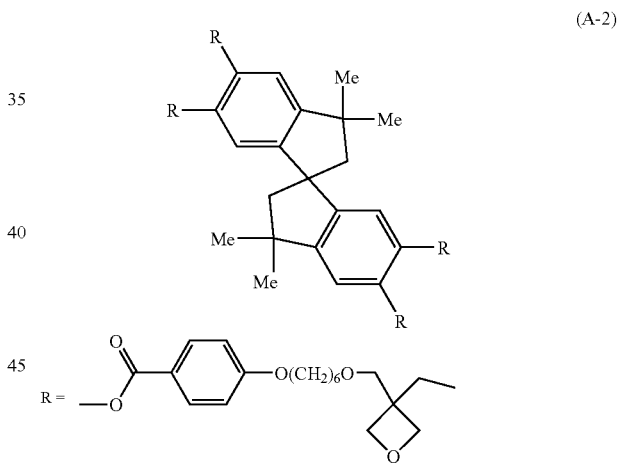

(A-2)

A mixture of 5,5',6,6'-tetrahydroxy-3,3,3',3'-tetramethyl-1,1'-spirobiindan (2.3 g, 6.75 mmol), 4-[6-(3-ethyloxetane-3-ylmethoxy)hexyloxy]benzoic acid (10 g, 29.7 mmol), dicyclohexylcarbodiimide (6.44 g, 31.2 mmol), 4-dimethylaminopyridine (0.36 mg, 2.97 mmol), and dichloromethane (100 mL) was stirred at room temperature for 15 hours. Insoluble materials deposited was filtered off. After the filtrate had been washed with 1M-hydrochloric acid, 2M-sodium hydroxide aqueous solution, and then water, the organic solvent was distilled off under reduced pressure. The residue was purified by means of silica gel chromatography (elute: toluene/ethyl acetate (volume ratio: 4/1)), giving 5.42 g (47.9% yield) of the compound (A-2) as a viscous material.

INDUSTRIAL APPLICABILITY

The polymerizable liquid crystal compound of the invention satisfies many of advantages such as a wide temperature range of a liquid crystal phase, polymerizability on irradiation with electromagnetic waves, a wide temperature range of a liquid crystal phase, and an excellent solubility with other compounds. This compound can be used for controlling alignment of liquid crystal molecules, and is excellent especially for a homeotropic alignment. A polymer obtained from a liquid crystal composition comprising this compound is excellent for many of characteristics such as transparency, mechanical strength, applicability, solubility, degree of crystallinity, shrinkage, water permeability, water absorptivity, gas permeability, melting points, glass transition temperature, clearing points, heat resistance, and chemical resistance. This polymer can be used for many of polarizing plates, optical compensators, alignment films, liquid crystal display devices, non-linear optical devices and so forth.

The invention claimed is:
1. A polymerizable liquid crystal compound represented by Formula (1):

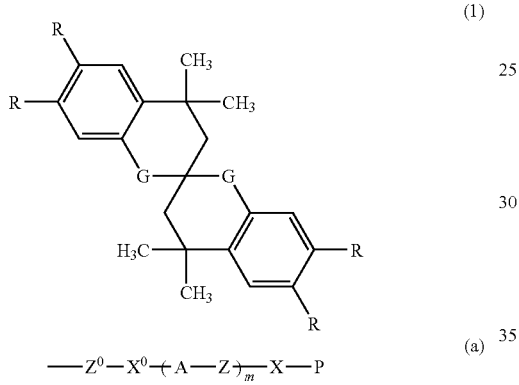

(1)

—$Z^0$—$X^0$—(A—$Z$)$_m$—X—P  (a)

wherein G is a single bond or —O—; and R is independently a group represented by Formula (a);
in Formula (a), A is 1,4-cyclohexylene, 1,4-phenylene, 1,3-phenylene, 1,4-cyclohexenylene, pyridine-2,5-diyl, pyridazine-3,6-diyl, pyrimidine-2,5-diyl, bicyclo[2.2.2]octane-1,4-diyl, naphthalene-2,6-diyl, tetrahydronaphthalene-2,6-diyl, fluorene-2,7-diyl, or 1,3-dioxane-2,5-diyl, and in these rings, arbitrary hydrogen may be replaced by halogen, alkyl having 1 to 3 carbon atoms, or fluoroalkyl having 1 to 3 carbon atoms;
Z is a single bond, —COO—, —OCO—, —OCOO—, —CH$_2$CH$_2$—, —CH$_2$O—, —OCH$_2$—, —CF$_2$CF$_2$—, —CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO—, or —OCOC≡C—;
m is an integer of 1 to 3; when m is 2 or 3, a plurality of A may be all the same rings or may be composed of at least two different rings, and a plurality of Z may be all the same groups or may be composed of at least two different groups;
$Z^0$ is a single bond, —O—, —OCO—, or —OCOO—;
$X^0$ is a single bond or alkylene having 1 to 20 carbon atoms; and in this alkylene, arbitrary —CH$_2$— may be replaced by —O—, —S—, or —CH=CH— and arbitrary hydrogen may be replaced by fluorine;
X is a single bond or alkylene having 1 to 20 carbon atoms; and in this alkylene, arbitrary —CH$_2$— may be replaced by —O—, —S—, —COO—, —OCO—, or —OCOO— and arbitrary hydrogen may be replaced by fluorine; and
P is a polymerizable group represented by any one of Formula (P1) to Formula (P8):

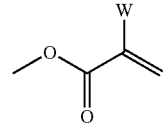

(P1)

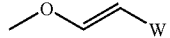

(P2)

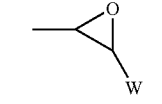

(P3)

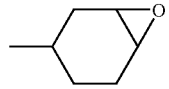

(P4)

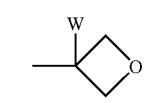

(P5)

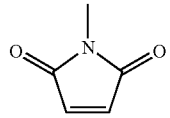

(P6)

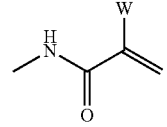

(P7)

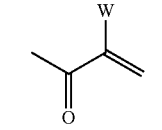

(P8)

wherein W is hydrogen, halogen, alkyl having 1 to 3 carbon atoms, or fluoroalkyl having 1 to 3 carbon atoms.
2. The polymerizable liquid crystal compound according to claim 1, wherein
A is 1,4-cyclohehexylene or 1,4-phenylene, and in these rings, arbitrary hydrogen may be replaced by halogen, alkyl having 1 to 3 carbon atoms, or fluoroalkyl having 1 to 3 carbon atoms;
Z is a single bond, —COO—, —OCO—, —OCOO—, —CH$_2$CH$_2$—, —CH$_2$O—, —OCH$_2$—, —CH=CH—, —C≡C—, —CH$_2$CH$_2$COO—, —OCOCH$_2$CH$_2$—, —CH=CHCOO—, —OCOCH=CH—, —C≡CCOO—, or —OCOC≡C—;
$Z^0$ is —O—, —OCO—, or —OCOO—; and
P is a group represented by Formula (P1), Formula (P6), Formula (P7), or Formula (P8).
3. The polymerizable liquid crystal compound according to claim 1, wherein A is 1,4-cyclohexylene or 1,4-phenylene, and in these rings, arbitrary hydrogen may be replaced by halogen, alkyl having 1 to 3 carbon atoms, or fluoroalkyl having 1 to 3 carbon atoms;

Z is a single bond, —COO—, —OCO—, —OCOO—, —CH$_2$CH$_2$—, —CH$_2$O—, —OCH$_2$—, —CH═CH—, —C≡C—, —CH$_2$CH$_2$COO—, —OCOCH$_2$CH$_2$—, —CH═CHCOO—, —OCOCH═CH—, —C≡CCOO—, or —OCOC≡C—;

$Z^0$ is —O—, —OCO—, or —OCOO—; and

P is a group represented by Formula (P3), Formula (P4), or Formula (P5).

4. The polymerizable liquid crystal compound according to claim 1, wherein

G is a single bond;

R is a group represented by Formula (a);

A is 1,4-cyclohexylene or 1,4-phenylene, and in these rings, arbitrary hydrogen may be replaced by fluorine, chlorine, methyl, or trifluoromethyl;

Z is a single bond, —COO—, —OCO—, —OCOO—, —CH$_2$CH$_2$—, —CH═CH—, —CH$_2$CH$_2$COO—, —OCOCH$_2$CH$_2$—, —CH═CHCOO—, or —OCOCH═CH—;

$X^0$ is a single bond or alkylene having 1 to 10 carbon atoms; and in this alkylene, arbitrary —CH$_2$— may be replaced by —O— and arbitrary hydrogen may be replaced by fluorine;

$Z^0$ is —O— or —OCO—;

X is a single bond or alkylene having 1 to 10 carbon atoms; and in this alkylene, arbitrary —CH$_2$— may be replaced by —O—, —COO—, or —OCO— and arbitrary hydrogen may be replaced by fluorine;

P is a group represented by Formula (P1), Formula (P3), or Formula (P5); and W is hydrogen, fluorine, chlorine, methyl, ethyl, or trifluoromethyl.

5. The polymerizable liquid crystal compound according to claim 1, wherein

G is a single bond;

R is a group represented by Formula (a);

A is 1,4-phenylene, and in this ring, arbitrary hydrogen may be replaced by fluorine;

Z is a single bond or —OCOO—;

$X^0$ is a single bond;

$Z^0$ is —OCO—;

m is 1;

X is a single bond or alkylene having 1 to 10 carbon atoms; and in this alkylene, arbitrary —CH$_2$— may be replaced by —O—; and P is a group represented by Formula (P1), Formula (P3), or Formula (P5), wherein W is hydrogen, methyl, or ethyl.

6. A liquid crystal composition, comprising at least one of compounds represented by Formula (1) according to claim 1, and composed of at least two compounds.

7. The liquid crystal composition according to claim 6, wherein all of the components are polymerizable compounds.

8. A liquid crystal composition comprising at least one compound represented by Formula (1) according to claim 1 and at least one compound selected from the group of compounds represented by Formula (M1), and Formula (M2a) to Formula (M2e), wherein the compound represented by Formula (1) is in the range of 1% to 50% by weight, and the compound selected from the group of compounds represented by Formula (M1), and Formula (M2a) to Formula (M2e) is in the range of 50% to 99% by weight at the rate based on the total amount of the compound selected from the group of compounds represented by Formula (1) and the compound selected from groups of compounds represented by Formula (M1), and Formula (M2a) to Formula (M2e):

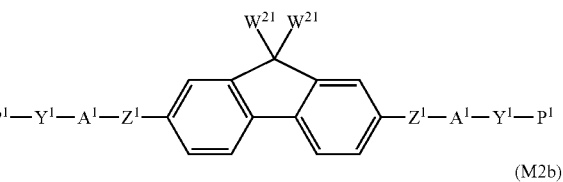

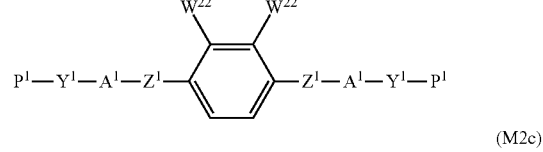

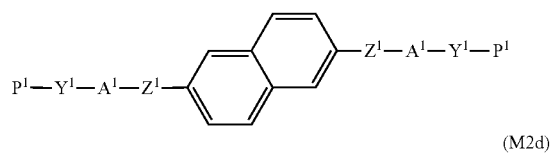

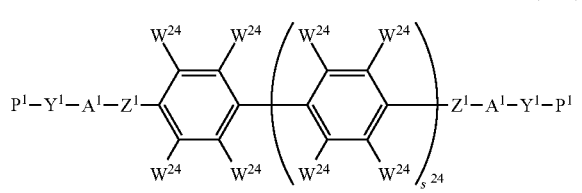

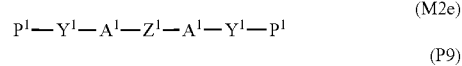

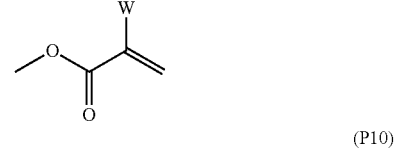

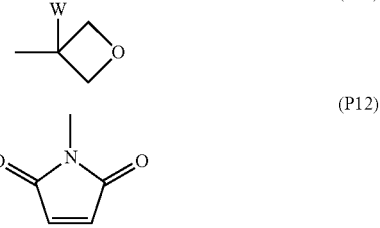

wherein $P^1$ is independently a polymerizable group represented by any one of Formula (P9) to Formula (P12); W is hydrogen, halogen, alkyl having 1 to 3 carbon atoms, or fluoroalkyl having 1 to 3 carbon atoms;

$R^1$ is hydrogen, fluorine, chlorine, cyano, or alkyl having 1 to 20 carbon atoms; and in this alkyl having 1 to 20 carbon atoms, arbitrary —CH$_2$— may be replaced by —O—, —COO—, —OCO—, or —OCOO— and arbitrary hydrogen may be replaced by halogen;

$A^1$ is independently 1,4-cyclohexylene, 1,4-phenylene, 1,3-phenylene, pyridine-2,5-diyl, pyrimidine-2,5-diyl, or naphthalene-2,6-diyl, and in these rings, arbitrary hydrogen may be replaced by halogen;

$Y^1$ is independently a single bond or alkylene having 1 to 20 carbon atoms, and in this alkylene, arbitrary —$CH_2$— may be replaced by —O—, —COO—, —OCO—, or —OCOO—;

$Z^1$ is independently a single bond, —COO—, —OCO—, —OCOO—, —$CH_2CH_2$—, —CH=CH—, —C≡C—, —$CH_2O$—, —$OCH_2$—, —$CF_2O$—, —$OCF_2$—, —CH=CHCOO—, —OCOCH=CH—, —$(CH_2)_2$COO—, or —$OCO(CH_2)_2$—;

$W^{21}$ is independently hydrogen, halogen, or alkyl having 1 to 3 carbon atoms;

$W^{22}$ is independently hydrogen, halogen, cyano, alkyl having 1 to 5 carbon atoms, or halogenated alkyl having 1 to 5 carbon atoms;

$W^{24}$ is independently hydrogen, halogen, alkyl having 1 to 5 carbon atoms, or halogenated alkyl having 1 to 5 carbon atoms;

$s^{11}$ is 1 or 2; when $s^{11}$ is 2, two of $A^1$ may be the same rings or different rings and two of $Z^1$ may also be the same groups or different groups; and $s^{24}$ is 1 or 2; when $s^{24}$ is 2, the substituents of two rings may be the same or different.

9. The liquid crystal composition according to claim 8, wherein $R^1$ is fluorine, cyano, alkyl having 2 to 12 carbon atoms, or alkoxy having 2 to 12 carbon atoms; and in these alkyl and alkoxy, arbitrary hydrogen may be replaced by fluorine;

$A^1$ is independently 1,4-cyclohexylene, 1,4-phenylene, or 1,3-phenylene, and in these rings, arbitrary hydrogen may be replaced by fluorine;

$Y^1$ is independently alkylene having 2 to 12 carbon atoms, alkyleneoxy having 2 to 12 carbon atoms, or oxyalkylene having 2 to 12 carbon atoms;

$Z^1$ is independently a single bond, —COO—, —OCO—, —CH=CHCOO—, —OCOCH=CH—, —$(CH_2)_2$COO—, or —$OCO(CH_2)_2$—;

$W^{21}$ is independently hydrogen, fluorine, or methyl;

$W^{22}$ is independently hydrogen, fluorine, methyl, cyano, isopropyl, tertiary-butyl, or trifluoromethyl; and $W^{24}$ is independently hydrogen, fluorine, methyl, or methoxy.

10. The liquid crystal composition according to claim 8, further comprising a non-liquid crystal polymerizable compound and/or an optically active compound.

11. A polymer obtained by polymerizing the compound according to claim 1.

12. A polymer obtained by polymerizing the composition according to claim 8.

13. A formed body having optical anisotropy, wherein at least one compound according to claim 1 is aligned, and then the alignment of molecules in a liquid crystal phase is fixed by polymerizing the compound on irradiation with electromagnetic waves.

14. A formed body having optical anisotropy, wherein the composition according to claim 8 is aligned, and then the alignment of molecules is fixed by polymerizing the composition on irradiation with electromagnetic waves.

15. The formed body according to claim 13, wherein a fixed alignment of molecules is a homeotropic alignment.

16. The formed body according to claim 14, wherein a fixed alignment of molecules is a homeotropic alignment.

17. An optical device composed of the formed body according to claim 13.

18. An optical device composed of the formed body according to claim 14.

19. An optical device composed of the formed body according to claim 15.

20. An optical device composed of the formed body according to claim 16.

21. A liquid crystal display device comprising the compound according to claim 1.

22. A liquid crystal display device comprising the composition according to claim 8.

23. A film composed of the polymer according to claim 11.

24. A film composed of the polymer according to claim 12.

25. A liquid crystal display device comprising the optical device according to claim 19.

26. A liquid crystal display device comprising the optical device according to claim 20.

* * * * *